(12) United States Patent
Shimizu

(10) Patent No.: US 6,744,430 B1
(45) Date of Patent: Jun. 1, 2004

(54) IMAGE PROCESSING METHOD AND ITS APPARATUS

(75) Inventor: Yusuke Shimizu, Tokyo (JP)

(73) Assignee: Sega Enterprises, Ltd. (JP)

( * ) Notice: Subject to any disclaimer, the term of this patent is extended or adjusted under 35 U.S.C. 154(b) by 216 days.

(21) Appl. No.: 09/620,992

(22) Filed: Jul. 20, 2000

(30) Foreign Application Priority Data

Jul. 21, 1999 (JP) .............................. 11-206532
Jul. 17, 2000 (JP) ........................... 2000-215354

(51) Int. Cl.[7] .............................................. G06T 16/00
(52) U.S. Cl. ........................................................ 345/410
(58) Field of Search ......................... 347/258; 345/419, 345/420, 421, 424, 426, 427, 428, 423, 582, 583, 587, 589, 629, 619, 592, 581, 634; 382/199, 203; 463/31

(56) References Cited

U.S. PATENT DOCUMENTS 5,946,024 A * 8/1999 Nishiwaki ................... 347/258
6,184,891 B1 * 2/2001 Blinn ......................... 345/426
6,219,062 B1 * 4/2001 Matsuo et al. .............. 345/426

FOREIGN PATENT DOCUMENTS

JP  2-73479 A  3/1990

OTHER PUBLICATIONS

Max ("Atmospheric Illumination and Shadows": 1986: ACM–0–89791–196–2/86/008/0117).*

* cited by examiner

Primary Examiner—Almis R. Jankus
(74) Attorney, Agent, or Firm—Dickstein Shapiro Morin & Oshinsky LLP

(57) ABSTRACT

An image processing method, and apparatus therefor, for implementing volume representation in real time are disclosed. The image processing method is one wherein a volume is defined by volume polygon, the depth difference between the volume polygon and a delineation subject polygon is detected, and the attributes of the volume polygon are modulated from the depth difference. Image data are also generated for each pixel from the modulated volume polygon and the delineation subject polygon. Thus volume representation can be realized by real time polygon delineation.

16 Claims, 61 Drawing Sheets

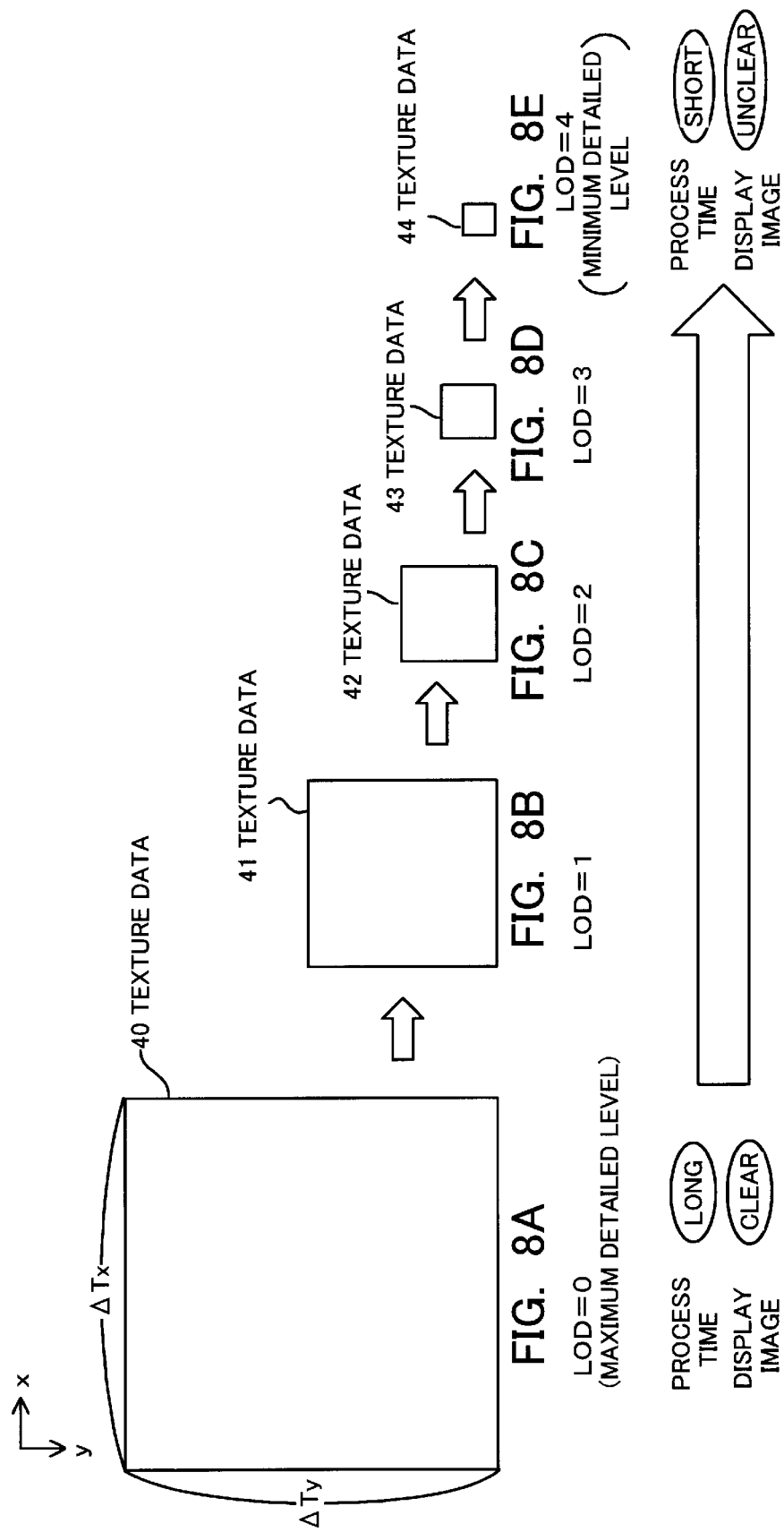

FIG. 27

```
Create_Volume(VolumeID_0,Type_Shadow,LightID_1,...);        //VOLUME 0 DEFINITION
Create_Volume(VolumeID_1,Type_Modifire,ModifyData_1,...);   //VOLUME 1 DEFINITION
Create_Light(LightID_0,Paralell,L0x,L0y,L0z,...);           //LIGHT 0 DEFINITION
Create_Light(LightID_1,Paralell,L1x,L1y,L1z,...);           //LIGHT 1 DEFINITION
Create_Material(MaterialID_0,amb_col0,dif_col0,spe_col0,shi0,TexID0,...);//MATERIAL 0 DEFINITION
Create_Material(MaterialID_1,amb_col0,dif_col1,spe_col1,shi1,TexID1,...);//MATERIAL 1 DEFINITION
SetMatrix(Object_a);                                        //CONVERT MATRIX OF OBJECT a
Put_Polygon(Triangle,VolumeID_0,DoubleSide,CCW,P_a0,P_a1,P_a2); //POLYGON a1 DEFINITION
Put_Polygon(Triangle,VolumeID_0,DoubleSide,CW,P_a3,P_a4,P_a5);  //POLYGON a2 DEFINITION
Put_Polygon(Quadrangle,VolumeID_0,DoubleSide,CW,P_a0,P_a1,P_a4,P_a3);//POLYGON a3 DEFINITION
Put_Polygon(Quadrangle,VolumeID_0,DoubleSide,CCW,P_a0,P_a2,P_a5,P_a3);//POLYGON a5 DEFINITION
Put_Polygon(Quadrangle,VolumeID_0,DoubleSide,CW,P_a1,P_a2,P_a5,P_a4);//POLYGON a4 DEFINITION
SetMatrix(Object_b);                                        //CONVERT MATRIX OF OBJECT b
Put_Polygon(Quadrangle,VolumeID_1,DoubleSide,CCW,P_b0,P_b1,P_b2,P_b3);//POLYGON b1 DEFINITION
Put_Polygon(Quadrangle,VolumeID_1,DoubleSide,CW,P_b4,P_b5,P_b6,P_b7);//POLYGON b2 DEFINITION
Put_Polygon(Quadrangle,VolumeID_1,DoubleSide,CW,P_b0,P_b1,P_b5,P_b4);//POLYGON b3 DEFINITION
Put_Polygon(Quadrangle,VolumeID_1,DoubleSide,CCW,P_b3,P_b2,P_b6,P_b7);//POLYGON b4 DEFINITION
Put_Polygon(Quadrangle,VolumeID_1,DoubleSide,CW,P_b3,P_b0,P_b4,P_b7);//POLYGON b5 DEFINITION
Put_Polygon(Quadrangle,VolumeID_1,DoubleSide,CCW,P_b2,P_b1,P_b5,P_b6);//POLYGON b6 DEFINITION
Select_Light(LightID_0,LightID_1);                          //LIGHT OF OBJECT c
Select_MaterialMaterialID_0);                               //MATERIAL OF OBJECT c
SetMatrix(Object_c);                                        //CONVERT MATRIX OF OBJECT c
Put_Polygon(Quadrangle,Opaque,SingleSide,CW,P_c0,P_c1,P_c2,P_c3);//POLYGON c DEFINITION
End();
```

(P_nm) = Apex CO-OR (X,Y,Z)、Texture CO-OR(Tx,Ty,Tz)、Apex color($\alpha$,R,G,B)

FIG. 29A

|   |   |   |    |    |    |    |    |    |   |
|---|---|---|----|----|----|----|----|----|---|
|   |   |   | a1 |    |    |    |    |    |   |
|   |   | a1| a1 | a1 | c  |    |    |    |   |
|   |   | a1| a1 | a1 | c  | c  |    |    |   |
|   | a1| a1| a1 | a1 | a1 | b1 | b1 | b1 |   |
|   | a1| a1| a1 | a1 | a1 | b1 | b1 | b1 |   |
|   |   |   |    | b1 | b1 | b1 | b1 | b1 |   |
|   |   |   |    | b1 | b1 | b1 | b1 | b1 |   |
|   |   |   |    | b1 | b1 | b1 | b1 | b1 |   |
|   |   |   |    |    |    |    |    |    |   |

FIRST LAYER

FIG. 29B

|   |   |   |    |    |    |    |    |    |   |
|---|---|---|----|----|----|----|----|----|---|
|   |   |   | a2 |    |    |    |    |    |   |
|   |   | a2| a2 | a2 |    |    |    |    |   |
|   |   | a2| a2 | c  |    |    |    |    |   |
|   | a2| a2| c  | b1 | b1 | c  | c  | b2 |   |
|   | a2| a2| a2 | b1 | b1 | c  | b2 | b2 |   |
|   |   |   |    | b2 | c  | b2 | b2 | b2 |   |
|   |   |   |    | b2 | b2 | b2 | b2 | b2 |   |
|   |   |   |    | b2 | b2 | b2 | b2 | b2 |   |
|   |   |   |    |    |    |    |    |    |   |

SECOND LAYER

FIG. 30A

|   |   |   |   |   |   |   |   |   |   |   |
|---|---|---|---|---|---|---|---|---|---|---|
|   |   |   |   |   |   |   |   |   |   |   |
|   |   |   |   |   |   |   |   |   |   |   |
|   |   |   |   |   | a2 |   |   |   |   |   |
|   |   |   | a2 | c | c | b2 | b2 |   |   |   |
|   |   |   |   | c | c | b2 |   |   |   |   |
|   |   |   |   |   | b2 |   |   |   |   |   |
|   |   |   |   |   |   |   |   |   |   |   |
|   |   |   |   |   |   |   |   |   |   |   |
|   |   |   |   |   |   |   |   |   |   |   |

THIRD LAYER

FIG. 30B

|   |   |   |   |   |   |   |   |   |   |   |
|---|---|---|---|---|---|---|---|---|---|---|
|   |   |   |   |   |   |   |   |   |   |   |
|   |   |   |   |   |   |   |   |   |   |   |
|   |   |   |   |   | a2 | a2 |   |   |   |   |
|   |   |   |   |   | a2 | a2 |   |   |   |   |
|   |   |   |   |   |   |   |   |   |   |   |
|   |   |   |   |   |   |   |   |   |   |   |
|   |   |   |   |   |   |   |   |   |   |   |
|   |   |   |   |   |   |   |   |   |   |   |
|   |   |   |   |   |   |   |   |   |   |   |

FOURTH LAYER

FIG. 30C

|   |   |   |   |   |   |   |   |   |   |   |
|---|---|---|---|---|---|---|---|---|---|---|
|   |   |   |   |   |   |   |   |   |   |   |
|   |   |   |   |   |   |   |   |   |   |   |
|   |   |   |   |   |   | b2 | b2 |   |   |   |
|   |   |   |   |   |   | b2 | b2 |   |   |   |
|   |   |   |   |   |   |   |   |   |   |   |
|   |   |   |   |   |   |   |   |   |   |   |
|   |   |   |   |   |   |   |   |   |   |   |
|   |   |   |   |   |   |   |   |   |   |   |
|   |   |   |   |   |   |   |   |   |   |   |

FIFTH LAYER

FIG. 33

|   |   |   | a1 |   |   |   |   |   |   |
|---|---|---|----|---|---|---|---|---|---|
|   |   | a1 | a1 | a1 |   |   |   |   |   |
|   |   | a1 | a1 | a1 |   |   |   |   |   |
|   | a1 | a1 | a1 | a1 | a1 |   |   |   |   |
|   | a1 | a1 | a1 | a1 | a1 |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |

FIRST LAYER-a1

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   |   |   |   |   |   |   |
|   |   |   |   |   |   | b1 | b1 | b1 |   |
|   |   |   |   |   |   | b1 | b1 | b1 |   |
|   |   |   |   |   | b1 | b1 | b1 | b1 | b1 |
|   |   |   |   |   | b1 | b1 | b1 | b1 | b1 |
|   |   |   |   |   | b1 | b1 | b1 | b1 | b1 |
|   |   |   |   |   |   |   |   |   |   |

FIRST LAYER-b1

|   |   |   |   |   |   |   |   |   |   |
|---|---|---|---|---|---|---|---|---|---|
|   |   |   |   |   |   |   |   |   |   |
|   |   |   |   |   |   | c |   |   |   |
|   |   |   |   |   | c | c |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |

FIRST LAYER-c

FIG. 34

|  |  |  | a2 |  |  |  |  |  |  |
|---|---|---|---|---|---|---|---|---|---|
|  |  | a2 | a2 | a2 |  |  |  |  |  |
|  |  | a2 | a2 |  |  |  |  |  |  |
|  | a2 | a2 |  |  |  |  |  |  |  |
|  | a2 | a2 | a2 |  |  |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |

SECOND LAYER-a2

|  |  |  |  |  |  |  |  |  |  |
|---|---|---|---|---|---|---|---|---|---|
|  |  |  |  |  |  |  |  |  |  |
|  |  |  |  |  |  |  |  |  |  |
|  |  |  |  | c |  |  |  |  |  |
|  |  |  | c |  |  | c | c |  |  |
|  |  |  |  |  |  | c |  |  |  |
|  |  |  |  | c |  |  |  |  |  |
|  |  |  |  |  |  |  |  |  |  |
|  |  |  |  |  |  |  |  |  |  |
|  |  |  |  |  |  |  |  |  |  |

SECOND LAYER-c

|  |  |  |  |  |  |  |  |  |  |
|---|---|---|---|---|---|---|---|---|---|
|  |  |  |  |  |  |  |  |  |  |
|  |  |  |  |  |  |  |  |  |  |
|  |  |  |  |  |  |  |  |  |  |
|  |  |  |  | b1 | b1 |  |  |  |  |
|  |  |  |  | b1 | b1 |  |  |  |  |
|  |  |  |  |  |  |  |  |  |  |
|  |  |  |  |  |  |  |  |  |  |
|  |  |  |  |  |  |  |  |  |  |
|  |  |  |  |  |  |  |  |  |  |

SECOND LAYER-b1

FIG. 35

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   |   |   |   |   |   |   |
|   |   |   |   |   |   |   |   | b2 |   |
|   |   |   |   |   |   |   | b2 | b2 |   |
|   |   |   |   |   | b2 |   | b2 | b2 | b2 |
|   |   |   |   |   | b2 | b2 | b2 | b2 | b2 |
|   |   |   |   |   | b2 | b2 | b2 | b2 | b2 |
|   |   |   |   |   |   |   |   |   |   |

SECOND LAYER-b2

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   | a2 |   |   |   |   |   |
|   |   |   | a2 |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |

THIRD LAYER-a2

|   |   |   |   |   |   |   |   |   |   |
|---|---|---|---|---|---|---|---|---|---|
|   |   |   |   |   |   |   |   |   |   |
|   |   |   |   |   |   |   |   |   |   |
|   |   |   |   |   |   |   |   |   |   |
|   |   |   |   |   | c | c |   |   |   |
|   |   |   |   |   | c | c |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |

THIRD LAYER-c

FIG. 36
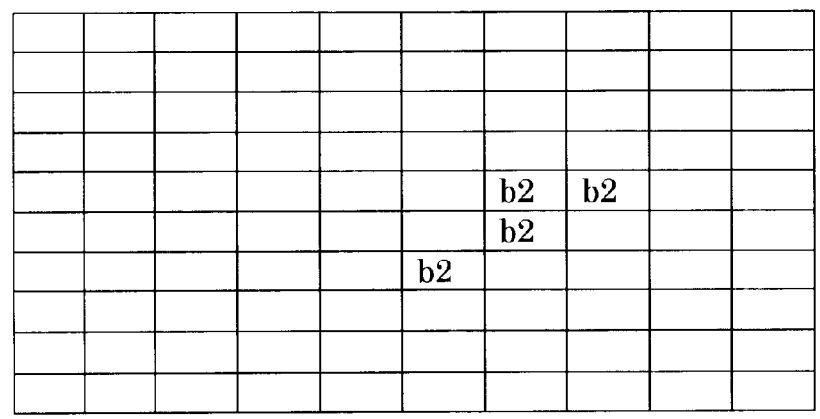
THIRD LAYER-b2
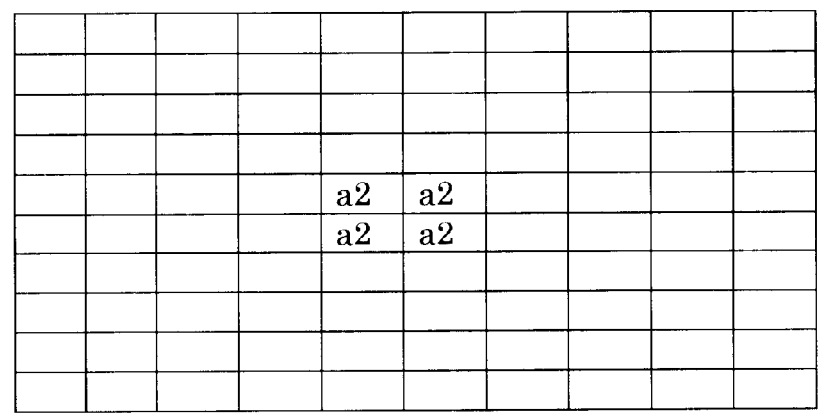
FOURTH LAYER-a2
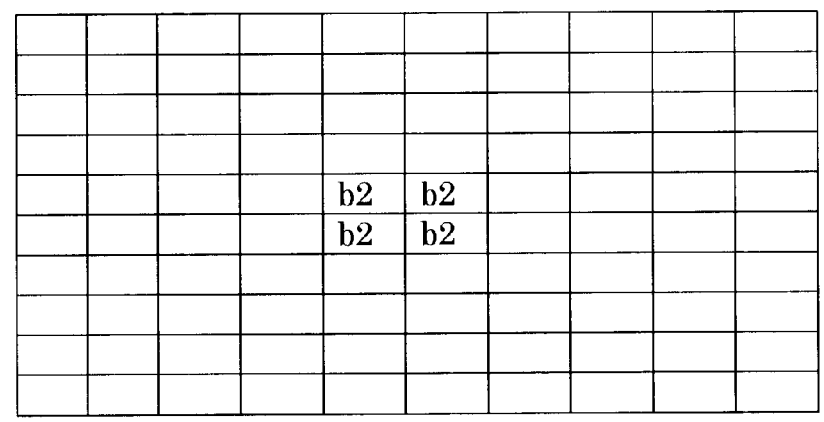
FIFTH LAYER-b2

FIG. 37A
RECEIVE 1st LAYER-a1(Volume ID_0:FRONT), UPDATE REGION BUFFER A1

| 0 | 0 | 0 | 0 | 0 | 0 | 0 | 0 | 0 | 0 |
|---|---|---|---|---|---|---|---|---|---|
| 0 | 0 | 0 | 1 | 0 | 0 | 0 | 0 | 0 | 0 |
| 0 | 0 | 1 | 1 | 1 | 0 | 0 | 0 | 0 | 0 |
| 0 | 0 | 1 | 1 | 1 | 0 | 0 | 0 | 0 | 0 |
| 0 | 1 | 1 | 1 | 1 | 1 | 0 | 0 | 0 | 0 |
| 0 | 1 | 1 | 1 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A2

FIG. 37B
RECEIVE 1st LAYER-b1(Volume ID_1:FRONT), UPDATE REGION BUFFER A2

| 0 | 0 | 0 | 0 | 0 | 0 | 0 | 0 | 0 | 0 |
|---|---|---|---|---|---|---|---|---|---|
| 0 | 0 | 0 | 1 | 0 | 0 | 0 | 0 | 0 | 0 |
| 0 | 0 | 1 | 1 | 1 | 0 | 0 | 0 | 0 | 0 |
| 0 | 0 | 1 | 1 | 1 | 0 | 0 | 0 | 0 | 0 |
| 0 | 1 | 1 | 1 | 1 | 1 | 0 | 0 | 0 | 0 |
| 0 | 1 | 1 | 1 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 1 | 0 |
| 0 | 0 | 0 | 0 | 0 | 0 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 0 | 0 | 0 | 0 | 0 | 0 |

REGION BUFFER A2 (VolumeID_1)

FIG. 37C
RECEIVE 1st LAYER-c(Opaque), OUTPUT REGION JUDGEMENT RESULT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 1 | 1 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION JUDGEMENT RESULT
(No corresponding region)

FIG. 38A

RECEIVE 2nd LAYER-a2(Volume ID_0:BACK), UPDATE REGION BUFFER A1

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 1 | 0 |
| 0 | 0 | 0 | 0 | 0 | 0 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 0 | 0 | 0 | 0 | 0 | 0 |

REGION BUFFER A2 (VolumeID_1)

FIG. 38B

RECEIVE 2nd LAYER –c(Opaque), OUTPUT REGION JUDGEMENT RESULT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION JUDGEMENT RESURT
(VolumeID_0 INSIDE)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION JUDGEMENT RESURT
(VolumeID_1 INSIDE)

FIG. 39A

RECEIVE 2nd LAYER-b1(Volume ID_1:FRONT), UPDATE REGION BUFFER A2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 0 | 0 | 0 | 0 | 0 | 0 |

REGION BUFFER A2 (VolumeID_1)

FIG. 39B

RECEIVE 2nd LAYER-b2(Volume ID_1:BACK), UPDATE REGION BUFFER A2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 1 | 0 | 0 | 0 |
| 0 | 0 | 0 | 0 | 1 | 1 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A2 (VolumeID_1)

FIG. 39C

RECEIVE 3rd LAYER-a2(Volume ID_0:BACK), UPDATE REGION BUFFER A1

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 1 | 0 | 0 | 0 |
| 0 | 0 | 0 | 0 | 1 | 1 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A2 (VolumeID_1)

FIG. 40A

RECEIVE 3rd LAYER-c(Opaque), OUTPUT REGION JUDGEMENT RESULT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION JUDGEMENT RESULT
(VolumeID_0 & VolumeID_1 INSIDE)

FIG. 40B

RECEIVE 3rd LAYER-b2(Volume ID_1:BACK), UPDATE REGION BUFFER A2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A2 (VolumeID_1)

FIG. 40C

RECEIVE 4th LAYER-a2(Volume ID_0:BACK), UPDATE REGION BUFFER A1

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A2 (VolumeID_1)

FIG. 41

RECEIVE 5th LAYER-b2(Volume ID_1:BACK), UPDATE REGION BUFFER A2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER A2 (VolumeID_1)

FIG. 42A

RECEIVE 1st LAYER −c(Opaque) REGION JUDGEMENT, OUTPUT RESULT (As no corresponding region, not alter attribute)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 1 | 1 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

(not alter attribute)

(Polygon_c)

FIG. 42B

RECEIVE 2nd LAYER −c(Opaque) REGION JUDGEMENT, OUTPUT RESULT

· As inside Volume ID_0, invalid Light ID_1 based on Type-Shadow of Volume Data

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

LightID_1 INVALID (Polygon_c)

FIG. 42C

· Alter to Material ID_1 by XOR Material ID_0 designated to Polygon and Modify Data based on Type_Modifire of Volume Data, as inside Volume ID_1

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

ALTER TO MaterialID_1

(Polygon_c)

RECIEVE 3rd LAYER-c(Opaque), OUTPUT REGION JUDGEMENT RESULT

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

Light ID_1INVALID
ALTER TO Material ID_1
(Polygon _c)

FIG. 45

PIXEL RENDER ACCORDING TO OUTPUT OF ATTRIBUTE MODULATOR

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | c | 0 | 0 | 0 | 0 |
| 0 | 0 | 0 | 0 | c' | c | c | 0 | 0 | 0 |
| 0 | 0 | 0 | c' | C' | C' | C | C | 0 | 0 |
| 0 | 0 | 0 | 0 | C' | C' | C | 0 | 0 | 0 |
| 0 | 0 | 0 | 0 | 0 | C | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 | c:Polygon_c (NO MODULATION)

c':Polygon_c(LightID_1 INVALID)

C:Polygon_c(ALTER TO MaterialID_1)

C':Polygon_c(LightID_1 INVALID & ALTER TO MaterialID_1)

FIG. 46

Create_Volume(VolumeID_0,Type_Fog,FVol_Col,DensityF0,...);   //VOLUME 0 DEFINITION
Create_Volume(VolumeID_1,Type_Light,LVol_Col,DensityL1,...);   //VOLUME 1 DEFINITION
Create_Light(LightID_0,Paralell,L0x,L0y,L0z,...);   //LIGHT 0 DEFINITION
Create_Light(LightID_1,Paralell,L1x,L1y,L1z,...);   //LIGHT 1 DEFINITION
Create_Material(MaterialID_0,amb_col0,dif_col0,spe_col0,shi0,TexID0,...);//MATERIAL 0 DEFINITION
SetMatrix(Object_a);   //CONVERT MATRIX OF OBJECT a
Put_Polygon(Triangle,VolumeID_0,DoubleSide,CCW,P_a0,P_a1,P_a2); //POLYGON a1 DEFINITION
Put_Polygon(Triangle,VolumeID_0,DoubleSide,CW,P_a3,P_a4,P_a5);   //POLYGON a2 DEFINITION
Put_Polygon(Quadrangle,VolumeID_0,DoubleSide,CW,P_a0,P_a1,P_a4,P_a3);//POLYGON a3 DEFINITION
Put_Polygon(Quadrangle,VolumeID_0,DoubleSide,CCW,P_a0,P_a2,P_a5,P_a3);//POLYGON a5 DEFINITION
Put_Polygon(Quadrangle,VolumeID_0,DoubleSide,CW,P_a1,P_a2,P_a5,P_a4);//POLYGON a4 DEFINITION
SetMatrix(Object_b);   //CONVERT MATRIX OF OBJECT b
Put_Polygon(Quadrangle,VolumeID_1,DoubleSide,CCW,P_b0,P_b1,P_b2,P_b3);//POLYGON b1 DEFINITION
Put_Polygon(Quadrangle,VolumeID_1,DoubleSide,CW,P_b4,P_b5,P_b6,P_b7);//POLYGON b2 DEFINITION
Put_Polygon(Quadrangle,VolumeID_1,DoubleSide,CW,P_b0,P_b1,P_b5,P_b4);//POLYGON b3 DEFINITION
Put_Polygon(Quadrangle,VolumeID_1,DoubleSide,CCW,P_b3,P_b2,P_b6,P_b7);//POLYGON b4 DEFINITION
Put_Polygon(Quadrangle,VolumeID_1,DoubleSide,CW,P_b3,P_b0,P_b4,P_b7);//POLYGON b5 DEFINITION
Put_Polygon(Quadrangle,VolumeID_1,DoubleSide,CCW,P_b2,P_b1,P_b5,P_b6);//POLYGON b6 DEFINITION
Select_Light(LightID_0,LightID_1);   //LIGHT OF OBJECT c
Select_Material(MaterialID_0);   //MATERIAL OF OBJECT c
SetMatrix(Object_c);   //CONVERT MATRIX OF OBJECT c
Put_Polygon(Quadrangle,Opaque,SingleSide,CW,P_c0,P_c1,P_c2,P_c3);//POLYGON c DEFINITION
End();

(P_nm) = Apex CO-OR(X,Y,Z), Texture CO-OR (Tx,Ty,Tz), Apex color ($\alpha$,R,G,B)

FIG. 48A

RECEIVE 1st LAYER-a1(Volume ID_0:FRONT), UPDATE REGION BUFFER B1

| 0 | 0 | 0 | 0 | 0 | 0 | 0 | 0 | 0 | 0 |
|---|---|---|---|---|---|---|---|---|---|
| 0 | 0 | 0 | 1 | 0 | 0 | 0 | 0 | 0 | 0 |
| 0 | 0 | 1 | 1 | 1 | 0 | 0 | 0 | 0 | 0 |
| 0 | 0 | 1 | 1 | 1 | 0 | 0 | 0 | 0 | 0 |
| 0 | 1 | 1 | 1 | 1 | 1 | 0 | 0 | 0 | 0 |
| 0 | 1 | 1 | 1 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2

FIG. 48B

RECEIVE 1st LAYER-b1(Volume ID_1:FRONT), UPDATE REGION BUFFER B2

| 0 | 0 | 0 | 0 | 0 | 0 | 0 | 0 | 0 | 0 |
|---|---|---|---|---|---|---|---|---|---|
| 0 | 0 | 0 | 1 | 0 | 0 | 0 | 0 | 0 | 0 |
| 0 | 0 | 1 | 1 | 1 | 0 | 0 | 0 | 0 | 0 |
| 0 | 0 | 1 | 1 | 1 | 0 | 0 | 0 | 0 | 0 |
| 0 | 1 | 1 | 1 | 1 | 1 | 0 | 0 | 0 | 0 |
| 0 | 1 | 1 | 1 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 1 | 0 |
| 0 | 0 | 0 | 0 | 0 | 0 | 1 | 1 | 1 | 0 |
| 0 | 0 | 0 | 0 | 0 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 0 | 0 | 0 | 0 | 0 | 0 |

REGION BUFFER B2 (VolumeID_1)

FIG. 49A

RECEIVE 1st LAYER-c(Opaque), THROUGH OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 1 | 0 | 0 | 0 | 0 |
| 0 | 0 | 0 | 0 | 0 | 1 | 1 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

THROUGH OUTPUT(Polygon_c)

FIG. 49B

OUTPUT REGION JUDGEMENT RESULT BEFORE RECEIVING 2nd LAYER PIXEL DATA

| 0 | 0 | 0 | 0 | 0 | 0 | 0 | 0 | 0 | 0 |
|---|---|---|---|---|---|---|---|---|---|
| 0 | 0 | 0 | 1 | 0 | 0 | 0 | 0 | 0 | 0 |
| 0 | 0 | 1 | 1 | 1 | 0 | 0 | 0 | 0 | 0 |
| 0 | 0 | 1 | 1 | 1 | 0 | 0 | 0 | 0 | 0 |
| 0 | 1 | 1 | 1 | 1 | 1 | 0 | 0 | 0 | 0 |
| 0 | 1 | 1 | 1 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0) OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 1 | 0 |
| 0 | 0 | 0 | 0 | 0 | 0 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 0 | 0 | 0 | 0 | 0 | 0 |

REGION BUFFER B2 (VolumeID_1) OUTPUT

FIG. 50A

RECEIVE 2nd LAYER-a2(Volume ID_0:BACK), UPDATE REGION BUFFER B1

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 1 | 0 |
| 0 | 0 | 0 | 0 | 0 | 0 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 0 | 0 | 0 | 0 | 0 | 0 |

REGION BUFFER B2 (VolumeID_1)

FIG. 50B

RECEIVE 2nd LAYER-c(Opaque), THROUGH OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 0 | 0 | 1 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

THROUGH OUTPUT(Polygon_c)

FIG. 50C

RECEIVE 2nd LAYER-b1(Volume ID_1:FRONT), UPDATE REGION BUFFER B2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 1 | 1 | 1 | 1 | 1 | 0 |
| 0 | 0 | 0 | 0 | 0 | 0 | 0 | 0 | 0 | 0 |

REGION BUFFER B2 (VolumeID_1)

FIG. 51A

RECEIVE 2nd LAYER-b2(Volume ID_1:BACK), UPDATE REGION BUFFER B2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 1 | 1 | 0 | 0 |
| 0 | 0 | 0 | 0 | 1 | 1 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2 (VolumeID_1)

FIG. 51B

OUTPUT REGION JUDGEMENT RESULT BEFORE 3rd LAYER PIXEL DATA

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)
OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 1 | 1 | 0 | 0 |
| 0 | 0 | 0 | 0 | 1 | 1 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2 (VolumeID_1)
OUTPUT

FIG. 52A

RECEIVE 3rd LAYER-a2(Volume ID_0:BACK), UPDATE REGION BUFFER B1

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 1 | 1 | 0 | 0 |
| 0 | 0 | 0 | 0 | 1 | 1 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2 (VolumeID_1)

FIG. 52B

RECEIVE 3rd LAYER-c(Opaque), THROUGH OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

THROUGH OUTPUT (Polygon_c)

FIG. 52C

RECEIVE 3rd LAYER-b2(Volume ID_1:BACK), UPDATE REGION BUFFER B2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2 (VolumeID_1)

FIG. 53A

OUTPUT REGION JUDGEMENT RESULT BEFORE RECEIVING 4th LAYER PIXEL DATA

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)
OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2 (VolumeID_1)
OUTPUT

FIG. 53B

RECEIVE 4th LAYER-a2(Volume ID_0:BACK), UPDATE REGION BUFFER B1

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

REGION BUFFER B2 (VolumeID_1)

FIG. 54A

OUTPUT REGION JUDGEMENT RESULT BEFORE RECEIVING 5th LAYER PIXEL DATA

The region buffer B1 does not hold any valid data, and therefore does not output

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2 (VolumeID_1)
OUTPUT

FIG. 54B

RECEIVE 5th LAYER-b2(Volume ID_1:BACK), UPDATE REGION BUFFER B2

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B1 (VolumeID_0)

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

REGION BUFFER B2 (VolumeID_1)

FIG. 55A

RECEIVE PIXEL Z VALUE BEFORE RECEIVING (As no front surface, Z difference invalid)

|   |   | 2 |   |   |   |   |   |
|---|---|---|---|---|---|---|---|
|   | 2 | 2 | 2 | 4 |   |   |   |
|   | 2 | 2 | 2 | 4 | 4 |   |   |
| 2 | 2 | 2 | 2 | 2 | 3 | 3 | 3 |
| 2 | 2 | 2 | 2 | 2 | 3 | 3 | 3 |
|   |   |   | 3 | 3 | 3 | 3 | 3 |
|   |   |   | 3 | 3 | 3 | 3 | 3 |
|   |   |   | 3 | 3 | 3 | 3 | 3 |

RECEIVED Z VALUE

|   |   | X |   |   |   |   |   |
|---|---|---|---|---|---|---|---|
|   | X | X | X | X |   |   |   |
|   | X | X | X | X | X |   |   |
| X | X | X | X | X | X | X |   |
| X | X | X | X | X | X | X |   |
|   |   |   | X | X | X | X | X |
|   |   |   | X | X | X | X | X |
|   |   |   | X | X | X | X | X |

Z DIFFERENCE

FIG. 55B

RECEIVE 1st LAYER-c(Opaque), THROUGH OUTPUT

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 1 | 0 | 0 | 0 |
| 0 | 0 | 0 | 0 | 0 | 1 | 1 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

THROUGH OUTPUT (Polygon_c)

FIG. 55C

RECEIVE PIXEL Z VALUE AND CALCULATE Z DIFFERENCE BEFORE RECEIVING 2nd LAYER

|   |   | 5 |   |   |   |   |   |
|---|---|---|---|---|---|---|---|
|   | 5 | 5 | 5 |   |   |   |   |
|   | 5 | 5 | 4 |   |   |   |   |
| 5 | 5 | 4 | 3 | 3 | 4 | 4 | 6 |
| 5 | 5 | 5 | 3 | 3 | 4 | 6 | 6 |
|   |   |   | 6 | 4 | 6 | 6 | 6 |
|   |   |   | 6 | 6 | 6 | 6 | 6 |
|   |   |   | 6 | 6 | 6 | 6 | 6 |

RECEIVED Z VALUE

|   |   | 3 |   |   |   |   |   |
|---|---|---|---|---|---|---|---|
|   | 3 | 3 | 3 |   |   |   |   |
|   | 3 | 3 | 2 |   |   |   |   |
| 3 | 3 | 2 | 1 | 1 | 1 | 1 | 3 |
| 3 | 3 | 3 | 1 | 1 | 1 | 3 | 3 |
|   |   |   | 3 | 1 | 3 | 3 | 3 |
|   |   |   | 3 | 3 | 3 | 3 | 3 |
|   |   |   | 3 | 3 | 3 | 3 | 3 |

Z DIFFERENCE

FIG. 56A

OUTPUT Fog Volume PIXEL BASED ON 2nd LAYER JUDGEMENT RESULT OF REGION BUFFER B1 AND Z DIFFERENCE

| 0 | 0 | 0 | 0 | 0 | 0 | 0 | 0 | 0 | 0 |
|---|---|---|---|---|---|---|---|---|---|
| 0 | 0 | 0 | 3 | 0 | 0 | 0 | 0 | 0 | 0 |
| 0 | 0 | 3 | 3 | 3 | 0 | 0 | 0 | 0 | 0 |
| 0 | 0 | 3 | 3 | 3 | 0 | 0 | 0 | 0 | 0 |
| 0 | 3 | 3 | 3 | 1 | 1 | 0 | 0 | 0 | 0 |
| 0 | 3 | 3 | 3 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

VolumeID_0(FogVolume)OUTPUT

FIG. 56B

OUTPUT Light Volume PIXEL BASED ON 2nd LAYER JUDGEMENT RESULT OF REGION BUFFER B2 AND Z DIFFERENCE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 1 | 1 | 3 | 0 |
| 0 | 0 | 0 | 0 | 0 | 0 | 1 | 3 | 3 | 0 |
| 0 | 0 | 0 | 0 | 3 | 1 | 3 | 3 | 3 | 0 |
| 0 | 0 | 0 | 0 | 3 | 3 | 3 | 3 | 3 | 0 |
| 0 | 0 | 0 | 0 | 3 | 3 | 3 | 3 | 3 | 0 |
| 0 | 0 | 0 | 0 | 0 | 0 | 0 | 0 | 0 | 0 |

VolumeID_1(LightVolume)OUTPUT

FIG. 56C

RECEIVE 2nd LAYER-c(Opaque), THROUGH OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 0 | 0 | 0 | 0 | 0 |
| 0 | 0 | 0 | 1 | 0 | 0 | 1 | 1 | 0 | 0 |
| 0 | 0 | 0 | 0 | 0 | 0 | 1 | 0 | 0 | 0 |
| 0 | 0 | 0 | 0 | 0 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

THROUGH OUTPUT (Polygon_c)

FIG. 57A

RECEIVE PIXEL Z VALUE AND CALCULATE Z DIFFERENCE BEFORE RECEIVING 3rd LAYER

|   |   |   |   |   |   |   |   |   |
|---|---|---|---|---|---|---|---|---|
|   |   |   |   |   |   |   |   |   |
|   |   |   |   |   |   |   |   |   |
|   |   |   | 5 |   |   |   |   |   |
|   |   | 5 | 4 | 4 | 6 | 6 |   |   |
|   |   |   | 4 | 4 | 6 |   |   |   |
|   |   |   |   | 6 |   |   |   |   |
|   |   |   |   |   |   |   |   |   |
|   |   |   |   |   |   |   |   |   |
|   |   |   |   |   |   |   |   |   |
|   |   |   |   |   |   |   |   |   |

RECEIVED Z VALUE

|   |   |   |   |   |   |   |   |   |
|---|---|---|---|---|---|---|---|---|
|   |   |   |   |   |   |   |   |   |
|   |   |   |   |   |   |   |   |   |
|   |   |   | 1 |   |   |   |   |   |
|   |   | 1 | 1 | 1 | 2 | 2 |   |   |
|   |   |   | 1 | 1 | 2 |   |   |   |
|   |   |   |   | 2 |   |   |   |   |
|   |   |   |   |   |   |   |   |   |
|   |   |   |   |   |   |   |   |   |
|   |   |   |   |   |   |   |   |   |
|   |   |   |   |   |   |   |   |   |

Z DIFFERENCE

FIG. 57B

OUTPUT Fog Volume PIXEL BASED ON 3rd LAYER JUDGEMENT RESULT OF REGION BUFFER B1 AND Z DIFFERENCE

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 1 | 0 | 0 | 0 | 0 |
| 0 | 0 | 0 | 1 | 1 | 1 | 0 | 0 | 0 |
| 0 | 0 | 0 | 0 | 1 | 1 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

VolumeID_0(FogVolume)OUTPUT

FIG. 57C

OUTPUT Light Volume PIXEL BASED ON 3rd LAYER JUDGEMENT RESULT OF REGION BUFFER B2 AND Z DIFFERENCE

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 1 | 1 | 2 | 2 | 0 | 0 |
| 0 | 0 | 0 | 0 | 1 | 1 | 2 | 0 | 0 |
| 0 | 0 | 0 | 0 | 0 | 2 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

VolumeID_1(LightVolume)OUTPUT

FIG. 58A

RECEIVE 3rd LAYER-c(Opaque), THROUGH OUTPUT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

THROUGH OUTPUT(Polygon_c)

FIG. 58B

RECEIVE PIXEL Z VALUE AND CALCULATE Z DIFFERENCE BEFORE RECEIVING 4th LAYER

RECEIVED Z VALUE (grid with values 5 5 / 5 5)

Z DIFFERENCE (grid with values 1 1 / 1 1)

FIG. 58C

OUTPUT Fog Volume PIXEL BASED ON 4th LAYER JUDGEMENT RESULT OF REGION BUFFER B1 AND Z DIFFERENCE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

VolumeID_0(FogVolume)OUTPUT

FIG. 59A
OUTPUT Light Volume PIXEL BASED ON 4th-LAYER JUDGEMENT RESULT OF REGION
BUFFER B2 AND Z DIFFERENCE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

VolumeID_1(LightVolume)OUTPUT

FIG. 59B
RECEIVE PIXEL Z VALUE AND CALCULATE Z DIFFERENCE BEFORE RECEIVING 5th
LAYER

| | | | | | | | | |
|---|---|---|---|---|---|---|---|---|
| | | | | | | | | |
| | | | | | | | | |
| | | | | | | | | |
| | | | | 6 | 6 | | | |
| | | | | 6 | 6 | | | |
| | | | | | | | | |
| | | | | | | | | |
| | | | | | | | | |
| | | | | | | | | |

RECEIVED Z VALUE

| | | | | | | | | |
|---|---|---|---|---|---|---|---|---|
| | | | | | | | | |
| | | | | | | | | |
| | | | | | | | | |
| | | | | 1 | 1 | | | |
| | | | | 1 | 1 | | | |
| | | | | | | | | |
| | | | | | | | | |
| | | | | | | | | |
| | | | | | | | | |

Z DIFFERENCE

FIG. 59C
OUTPUT Light Volume PIXEL BASED ON 5th LAYER JUDGEMENT RESULT OF REGION
BUFFER B2 AND Z DIFFERENCE

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 1 | 1 | 0 | 0 | 0 | 0 |
| 0 | 0 | 0 | 0 | 1 | 1 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

VolumeID_1(LightVolume)OUTPUT

SECOND LAYER

THIRD LAYER

IMAGE PROCESSING METHOD AND ITS APPARATUS

BACKGROUND OF THE INVENTION

1. Field of the Invention

This invention relates to an image processing method and apparatus that make possible volume representation, and particularly to an image processing method that implements the effects of fog or dust deployed in space, and such volume rendering as objects seen through a lens, and frosted glass, etc., by polygons, and to an image processing apparatus for embodying that method.

2. Description of the Related Art

When real scenery is observed carefully, as the scene becomes increasingly distant, terrain and structures therein sometimes appear to be hazy, blending together with the atmosphere. This effect is particularly pronounced in places like cities where smog and the like have been produced. When thick fog develops, moreover, even nearby scenery sometimes cannot be seen well. These effects are produced because light reflected from objects is blocked by such fine particles as dust and water vapor present in the air so that that light is attenuated by the time it reaches the observer. There are also times when street lights and search lights or the like at night describe the path of the light from the light source as they illuminate an object. That happens because the light source path can be seen by the eye as it is diffused and reflected by fine particles and the like in the air. The representation of such phenomena as these, because the condition of the space affects the scene, requires delineation for that space, that is, requires volume rendering.

In general, in real time three-dimensional computer graphics (3DCG) today, predominate use is made of surface rendering wherein planar models called polygons are delineated. With volume rendering, because of the necessity of delineating volume area interiors, in real time CG, the delineation of volumes in real time requires innovative measures. The following techniques have been proposed in the past.

(1) Ray Casting Method:

Delineated space is partitioned into very small cuboid unit spaces, as seen from the direction of the field of view, called voxels, and attributes such as volume density are calculated for each voxel. During delineation, lines of sight that are cast in the delineated space correspond to the voxels on the screen, and the sums resulting from the addition of density data for a volume existing in the voxels sampled are made pixel data.

(2) Marching Cubes Method:

As in the ray casting method, volume data are made density data for each voxel, and those densities are converted to a polygon mesh in line with established threshold values.

(3) Scene Fog Method:

This is a light beam attenuation representation method. For the objects delineated, a single color called the fog color is blended by finding mixture ratios by Z values from the view point.

With the conventional methods (1) and (2) described above, however, at the point in time when an object is divided into volumes, an enormous volume of data and an enormous volume of computations are required. There is a problem with these methods in that they cannot be applied to image processing wherewith the delineated regions are wide, and are continually changing, as in games or the like.

With the conventional method (3), moreover, in order for fog effects to be uniformly processed for an entire scene, it is not possible to represent places where the density varies from thick to thin, as in thick fog, or to represent fog in one or more portions of a scene, wherefore realism is compromised, which is a problem.

SUMMARY OF THE INVENTION

Accordingly, an object of the present invention is to provide an image processing method and apparatus for effecting volume representation in real time.

Another object of the present invention is to provide an image processing method and apparatus for making volume representation in necessary regions and enhancing image realism.

Yet another object of the present invention is to provide an image processing method and apparatus for simply implementing complex volume representation.

Yet another object of the present invention is to provide an image processing method and apparatus for processing a plurality of volumes at high speed.

Yet another object of the present invention is to provide an image processing method and apparatus for simply effecting volume representation such as fog or dust deployed in space or objects viewed through a lens or frosted glass and the like.

In order to attain the objects noted above, the present invention is an image processing method for generating image data, from pluralities of polygon data, for each pixel on a display screen, having a step for receiving volume polygons and delineation subject polygons for representing volumes and detecting depth differences between those volume polygons and those delineation subject polygons, a step for modulating the attributes of the volume polygons according to those depth differences, and a step for generating image data for each pixel from those modulated polygons and those delineation subject polygons. Because volume representation is done with polygons and the polygons are modulated with the depth differences, volume representation can be done by real time polygon delineation.

The modulation step noted above is able to effect volume representation using blend processing by comprising a step for modulating the depth differences detected to blend values using a conversion table.

Further, the modulation step noted above is able to effect volume representation using texture processing by comprising a step for modulating texture coordinates with the detected depth differences.

Further, the step for detecting depth differences noted above is able to effect partial volume representation by comprising a step for determining regions where the volume polygons and the delineation subject polygons overlap, and a step for detecting depth differences between the volume polygons and the delineation subject polygons in such overlapping regions.

Further, the determination step noted able is able to process a plurality of polygons by comprising a step for detecting regions where a plurality of volume polygons and the delineation subject polygons overlap.

Further, based on depth differences between light volume polygons existing between the delineation subject polygons and the view point, the transparency of the light volume polygons is altered, and the delineation subject polygons are subjected to blending processing according to light volume polygon color data and the altered transparency. As a result, such special effects as fog or dust deployed in space can be represented.

In another aspect of the present invention, texture coordinates for lens volume polygons are altered on the basis of depth differences between lens volume polygons existing between the delineation subject polygons and the view point, the texture data for the lens volume polygons are fetched according to the altered texture coordinates, and lens volume polygon delineation is performed. By so doing, special effects such as the effect of an object viewed through a lens can be represented.

In another aspect of the present invention, the level of detail of the texture data in the delineation subject polygons is altered on the basis of depth differences between delineation subject polygons and semitransparent polygons, and the delineation subject polygons are delineated according to texture data corresponding to the altered level of detail. In another aspect of the present invention, the transparency of semitransparent polygons is altered on the basis of depth differences between delineation subject polygons and semi-transparent polygons, and the delineation subject polygons are subjected to blending processing according to color data for the semitransparent polygons and the altered transparency. By so doing, such special effects as a frosted glass effect can be represented, for example.

BRIEF DESCRIPTION OF THE DRAWINGS

FIGS. 8A to 8E are diagrams for describing MIPMAP texture data recording modes in the aspect diagrammed in FIG. 6;

FIG. 27 is an explanatory diagram for delineation commands for describing Dijon volume in FIG. 22;

FIGS. 29A and 29B are first explanatory diagrams for describing preprocessing operations of the sort processor in FIG. 23;

FIGS. 30A to 30C are second explanatory diagrams for describing preprocessing operations of the sort processor in FIG. 23;

FIG. 33 is a first explanatory diagram for describing post-processing operations of the sort processor in FIG. 23;

FIG. 34 is a second explanatory diagram for describing post-processing operations of the sort processor in FIG. 23;

FIG. 35 is a third explanatory diagram for describing post-processing operations of the sort processor in FIG. 23;

FIG. 36 is a fourth explanatory diagram for describing post-processing operations of the sort processor in FIG. 23;

FIGS. 37A to 37C are first explanatory diagrams for describing the processing operations of the attribute modulator in FIG. 24;

FIGS. 38A and 38B are second explanatory diagrams for describing the processing operations of the attribute modulator in FIG. 24;

FIGS. 39A to 39C are third explanatory diagrams for describing the processing operations of the attribute modulator in FIG. 24;

FIGS. 40A to 40C are fourth explanatory diagrams for describing the processing operations of the attribute modulator in FIG. 24;

FIG. 41 is a fifth explanatory diagram for describing the processing operations of the attribute modulator in FIG. 24;

FIGS. 42A to 42C are first explanatory diagrams for describing modulation processing operations of the attribute modulator in FIG. 24;

FIG. 45 is an explanatory diagram for delineation results for describing the processing operations of the attribute modulator in FIG. 24;

FIG. 46 is an explanatory diagram for delineation commands for describing render volume in FIG. 22;

FIGS. 48A and 48B are first explanatory diagrams for describing the processing operations of the attribute modulator in FIG. 25;

FIGS. 49A to 49C are second explanatory diagrams for describing the processing operations of the attribute modulator in FIG. 25;

FIGS. 50A to 50C are third explanatory diagrams for describing the processing operations of the attribute modulator in FIG. 25;

FIGS. 51A and 51B are fourth explanatory diagrams for describing the processing operations of the attribute modulator in FIG. 25;

FIGS. 52A to 52C are fifth explanatory diagrams for describing the processing operations of the attribute modulator in FIG. 25;

FIGS. 53A and 53B are sixth explanatory diagrams for describing the processing operations of the attribute modulator in FIG. 25;

FIGS. 54A and 54B are seventh explanatory diagrams for describing the processing operations of the attribute modulator in FIG. 25;

FIGS. 55A to 55C are first explanatory diagrams for describing the modulation processing operations of the attribute modulator in FIG. 25;

FIGS. 56A to 56C are second explanatory diagrams for describing the modulation processing operations of the attribute modulator in FIG. 25;

FIGS. 57A to 57C are third explanatory diagrams for describing the modulation processing operations of the attribute modulator in FIG. 25;

FIGS. 58A to 58C are fourth explanatory diagrams for describing the modulation processing operations of the attribute modulator in FIG. 25;

FIGS. 59A to 59C are 12th explanatory diagrams for describing the modulation processing operations of the attribute modulator in FIG. 25;

DESCRIPTION OF THE PREFERRED EMBODIMENTS

Embodiment aspects of the present invention are hereinafter described, with reference to the drawings, in the order of volume representation processing, an image processing apparatus, another image processing apparatus, decision volume processing and render volume processing. These embodiment aspects, however, do not limit the technological scope of the present invention.

Volume Representation Processing

Figure 1:
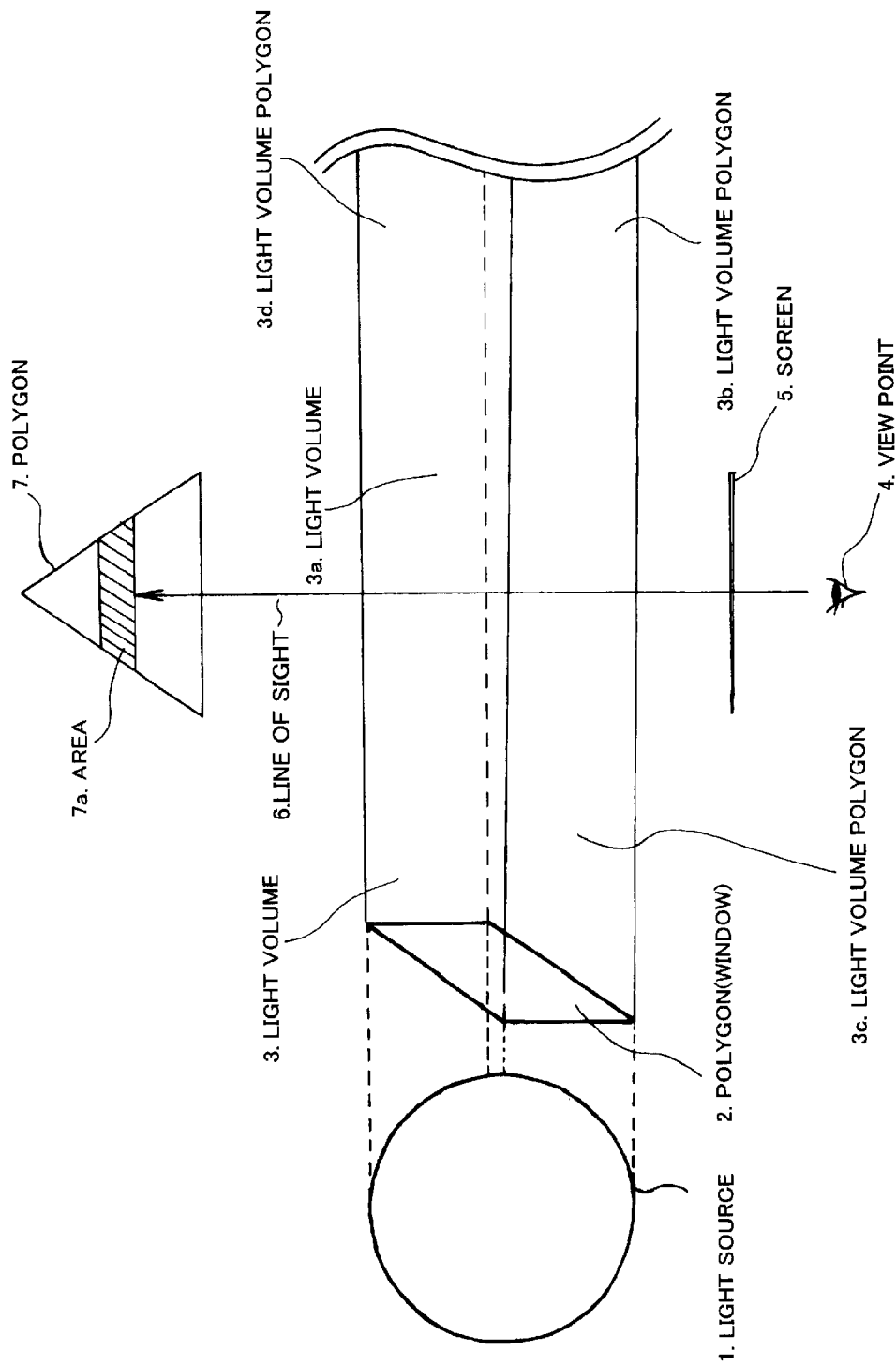
FIG. 1 is a diagram for describing a first embodiment aspect of the present invention.
Figure 2:
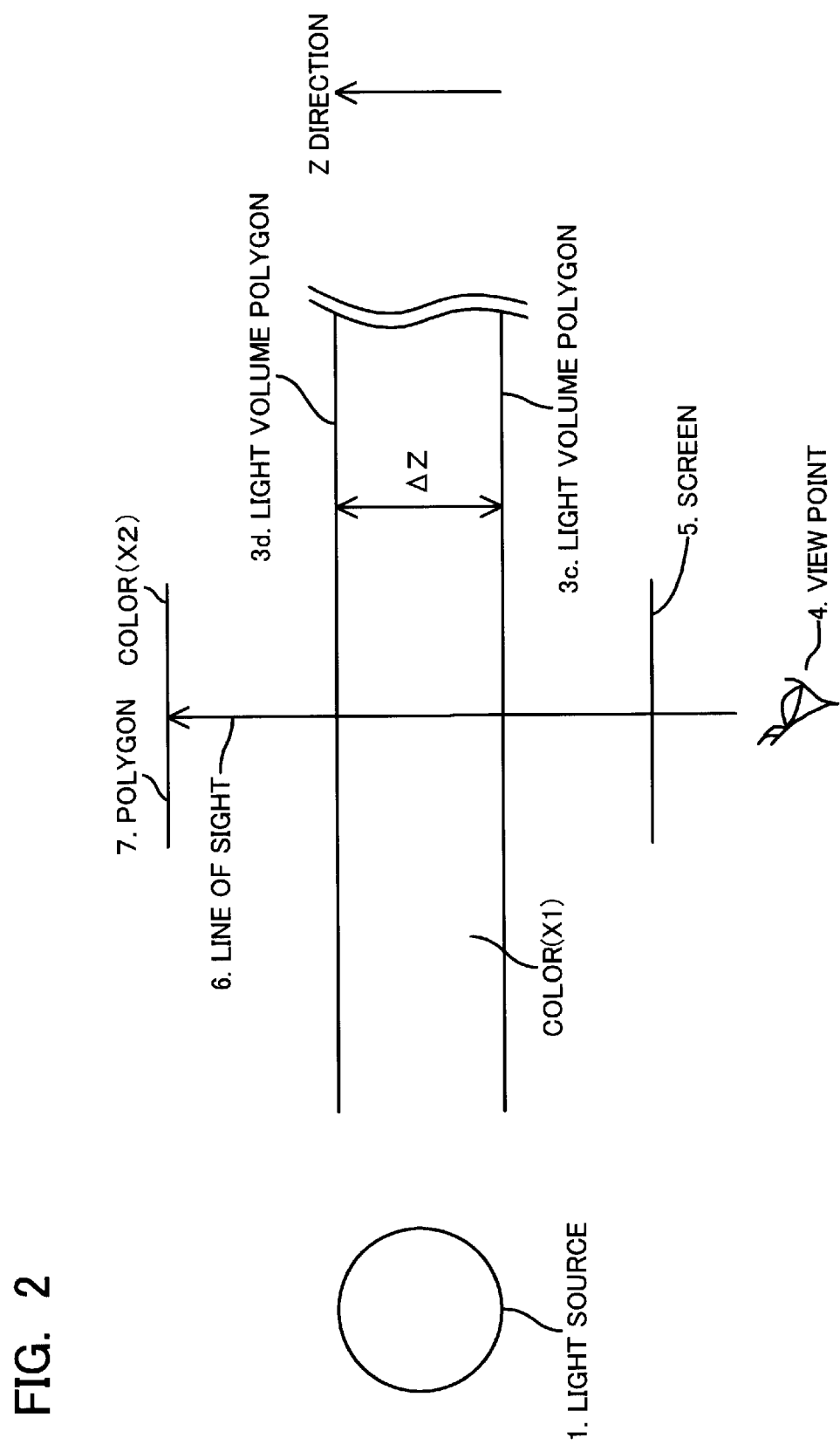
FIG. 2 is a top view corresponding to FIG. 1.

FIG. 1 and FIG. 2 are diagrams for explaining light volume representation such as fog volumes and dust in a first embodiment aspect of the present invention. In the example diagrammed in FIG. 1, light shown from a light source 1 transits a polygon 2 such as a window and forms a semi-unlimited light volume 3. This light volume 3 is a virtual light space that is produced by the light source 1 and the polygon (object) 2. In this polygon delineation system, the light volume 3 is configured by four polygons, namely a light volume polygon (upper surface) 3a, light volume polygon (lower surface) 3b, light volume polygon (side surface) 3c, and light volume polygon (side surface) 3d. When fog or dust is present in the light volume 3, the light is diffused, wherefore the region of that light volume 3 becomes a whitish transparent region.

Now, when a polygon 7 that is a delineation subject is viewed from the view point 4 through a screen 5, the polygon 7 that is the delineation subject (hereinafter called the delineation subject polygon 7 for convenience) is assumed to be positioned on the back side of the light volume 3. At such time, when the delineation subject polygon 7 is viewed from the view point 4 in the direction of the line of sight 6, a region 7a (indicated by cross hatching in FIG. 1) of the polygon 7 that is a region which is blocked by the light volume 3 should appear to be whitish. That whitishness, moreover, should become stronger as the thickness of the light volume 3 becomes greater.

In order to effect this volume representation, in this embodiment aspect, the transparency ($\alpha$ value) that is an attribute of the light volume polygon 3c and the light volume polygon 3d is altered on the basis of the depth difference (Z differential) between the light volume polygon 3c and the light volume polygon 3d that exist between the view point 4 and the delineation subject polygon 7. Then, when the delineation subject polygon 7 is delineated, blending processing is performed according to color data for the light volume polygon 3c and the light volume polygon 3d and to the altered transparency ($\alpha$ value). More specifically, the thickness of the light volume is detected by the Z value differential, and caused to be reflected in the light volume polygon transparencies ($\alpha$ values) that are attribute data, whereupon fog and dust effects can be realized with ordinary blending processing using the $\alpha$ values.

This blending processing is now described with reference to FIG. 2. FIG. 2 is a top view of FIG. 1. In the example diagrammed in FIG. 2, the upper direction is the Z dimension (depth dimension). The transparency ($\alpha$ value) for the light volume polygon 3c and the light volume polygon 3d is altered on the bases of the depth differential ($\Delta Z$) between the light volume polygon 3c and the light volume polygon 3d. If the color data for the light volume polygon 3c and the light volume polygon 3d are made X1 and the color data for the delineation subject polygon 7 made X2, then the blending color for the delineation subject polygon 7 is calculated by formula 1 below.

Delineation subject polygon 7 blending color $$=\alpha X_1 + (1-\alpha)X_2 \qquad (1)$$

Formula 1 above should be such that when the light volume is thin and there is little whitishness, the $\alpha$ value will approach 0, and when the light volume is thick and there is much whitishness, the $\alpha$ value approaches 1. Accordingly, the value of the α value will be between 0 and 1, based on the depth difference (ΔZ) between the light volume polygon 3c and the light volume polygon 3d.

Figure 3:
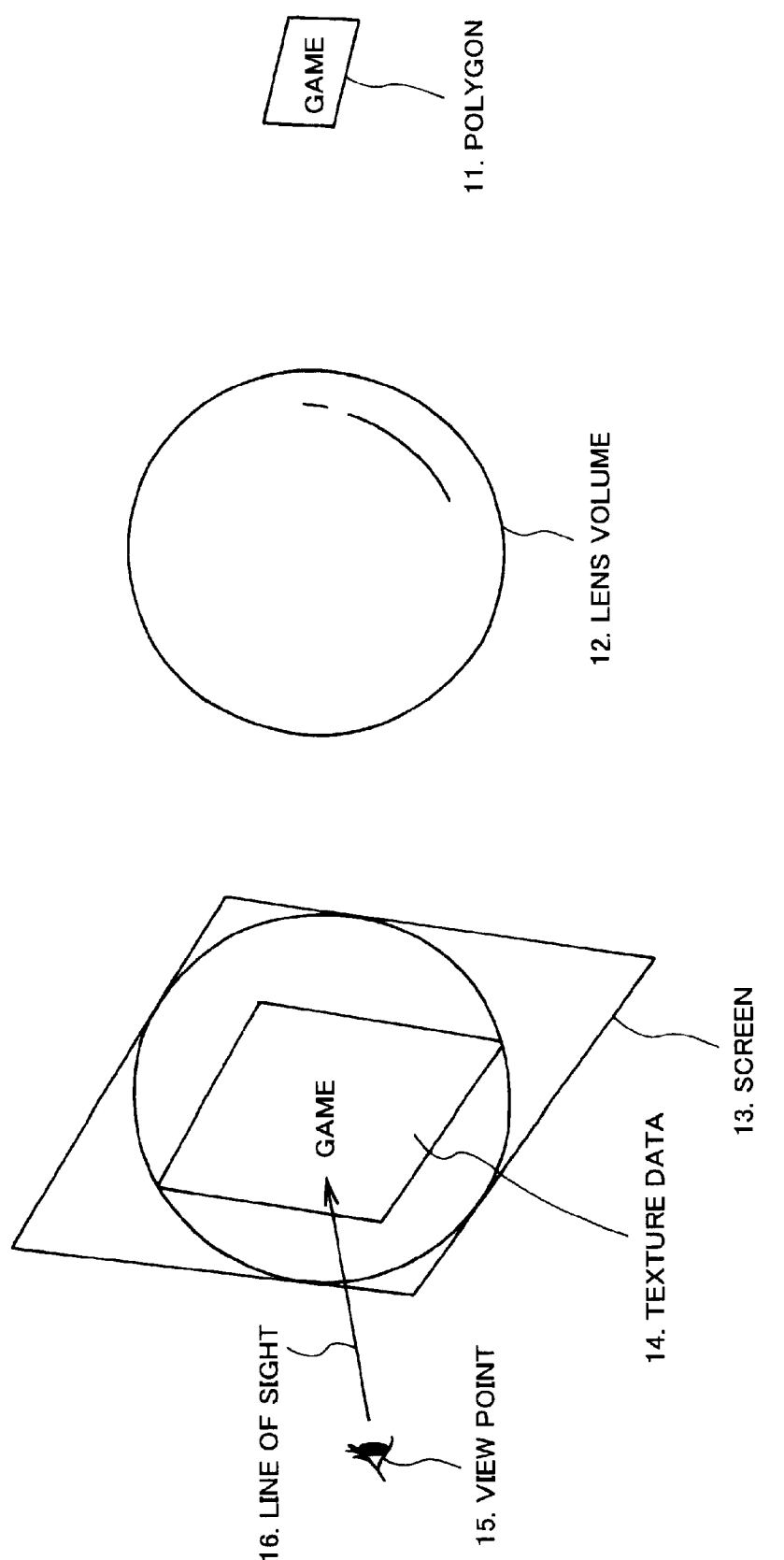
FIG. 3 is a diagram for describing a second embodiment aspect of the present invention.
Figure 4A:
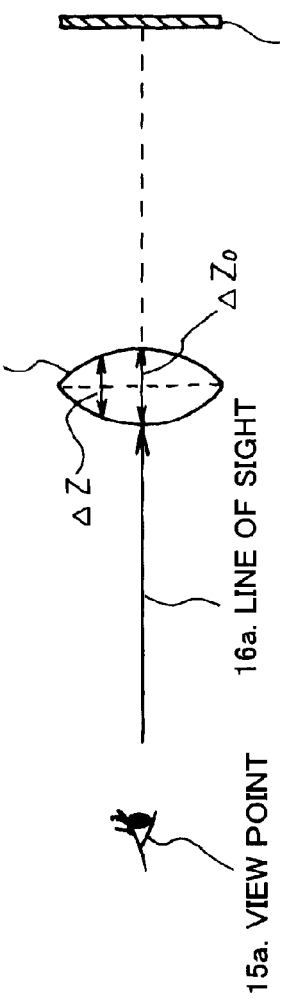
FIGS. 4A and 4B are side views corresponding to FIG. 3.
Figure 4B:
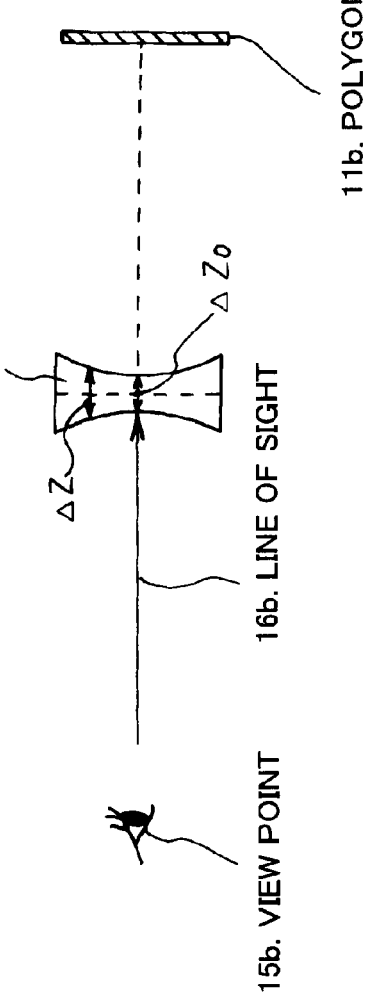
Figure 5:
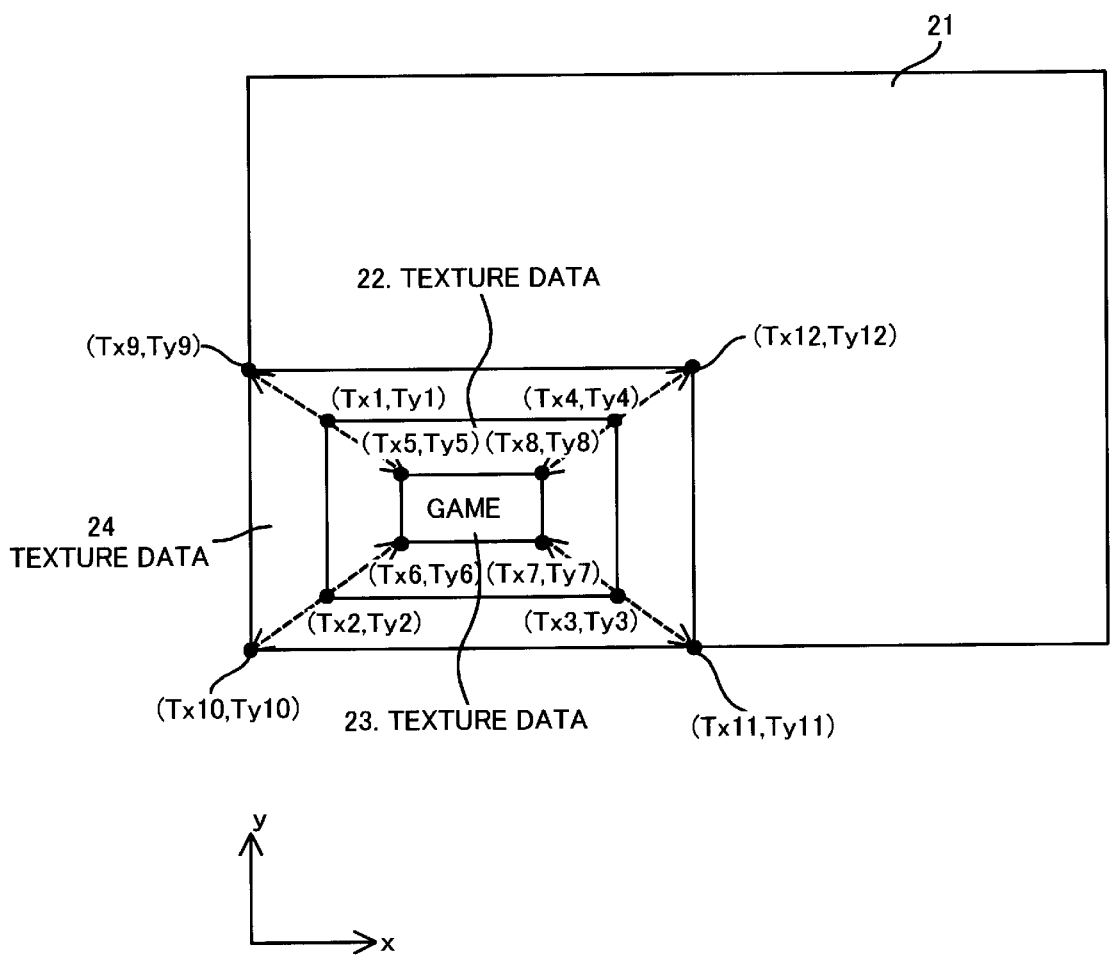
FIG. 5 is a diagram for describing texture data 22 enlargement and reduction in the aspect diagrammed in FIG. 3.

FIGS. 3, 4, and 5 are diagrams for describing lens volume representation in a second embodiment aspect of the present invention. In the example diagrammed in FIG. 3, a lens volume 12 exists between the view point 15 and a polygon 11 (having the text characters (texture) "game" affixed to the surface) that is a delineation subject. This lens polygon 12 is configured by (a) lens volume polygon(s), and functions as a convex lens or as a concave lens. Accordingly, when the lens volume polygon 12 is a convex lens, when the screen 13 is viewed from the view point 15 in the direction of the line of sight 16 indicated by the arrow, the pattern (texture) consisting of the text characters "game" on the surface of the delineation subject polygon 11 should appear enlarged on the screen 13. Conversely, if the lens volume polygon 12 is a concave lens, when the screen 13 is viewed from the view point 15 in the direction of the line of sight 16 indicated by the arrow, the pattern (texture) consisting of the text characters "game" on the surface of the delineation subject polygon 11 should appear reduced on the screen 13.

In order to implement this volume representation, in this embodiment aspect, texture coordinates that are attributes of the lens volume polygon 12 are altered on the basis of the depth difference (Z differential) for the lens volume polygon 12 existing between the view point 15 and the delineation subject polygon 11. Then the texture data for the lens volume polygon 12 is fetched according to the altered texture coordinates, and either an enlarged pattern or reduced pattern is delineated on the lens volume polygon 12.

The alteration of the texture coordinates described above is now described in greater detail with reference to FIG. 4 and FIG. 5. FIG. 4A is a diagram wherein FIG. 3 is seen from the side, representing the case where the lens volume polygon 12 is a convex lens. FIG. 4B is a diagram wherein FIG. 3 is seen from the side, representing the case where the lens volume polygon 12 is a concave lens. In FIG. 4, the lateral direction is the Z dimension (depth dimension). FIG. 5 diagrams one example of the texture data 22 stored in a texture memory 21. In FIG. 5, the horizontal axis represents the x axis, and the vertical axis the y axis.

As diagrammed in FIG. 4A, when the lens volume polygon 12a is a convex lens, the texture coordinates (Tx1, Ty1), (Tx2, Ty2), (Tx3, Ty3), and (Tx4, Ty4) of the texture data 22 are shifted to the texture coordinates (Tx5, Ty5), (Tx6, Ty6), (Tx7, Ty7), and (Tx8, Ty8) toward the center of the lens as the depth difference (ΔZ) for the lens volume polygon 12a becomes smaller in comparison with a reference value $\Delta Z_0$ at the center of the lens. Thus the proportion occupied by the text characters "game" in the texture data 22 becomes relatively larger, and those characters "game" can be made to appear as an enlarged pattern.

As diagrammed in FIG. 4B, on the other hand, when the lens volume polygon 12b is a concave lens, the texture coordinates (Tx1, Ty1), (Tx2, Ty2), (Tx3, Ty3), and (Tx4, Ty4) of the texture data 22 are shifted to the texture coordinates (Tx9, Ty9), (Tx10, Ty10), (Tx11, Ty11), and (Tx12, Ty12) toward the periphery of the lens as the depth difference (ΔZ) for the lens volume polygon 12b becomes larger in comparison with the reference value $\Delta Z_0$ at the center of the lens. Thus the proportion occupied by the text characters "game" in the texture data 22 becomes relatively smaller, and those characters "game" can be made to appear as a reduced pattern.

With the second embodiment aspect, patterns on a lens can be enlarged or reduced using an ordinary rendering method by altering the texture coordinates which are attribute data (attributes), according to depth differences for lens volume polygons configuring a lens.

FIGS. 6, 7, and 8A to 8E are diagrams for describing frosted glass volume representation in a third embodiment aspect of the present invention. In the example diagrammed in FIG. 6, on a screen 31, there area semitransparent polygon 32 corresponding to a frosted glass, a delineation subject polygon 33, and a delineation subject polygon 34, in that order from the front. When the screen 31 is viewed from the view point 35, due to the influence of the semitransparent polygon (frosted glass) 32, the delineation subject polygon 33 near the semitransparent polygon 32 should appear to be comparatively sharp, while the delineation subject polygon 34 far from the semitransparent polygon 32 should appear to be fuzzy and indistinct.

In order to implement this representation effect, in this embodiment aspect, the level of detail (hereinafter called LOD (level of detail) for convenience) of the texture data in the delineation subject polygons 33 and 34 is altered on the basis of the depth difference (Z differential) between the delineation subject polygons 33 and 34, on the one hand, and the semitransparent polygon 32, on the other, and the delineation subject polygons 33 and 34 are delineated according to the texture data corresponding to the level of detail. Also, the transparency (α value) of the semitransparent polygon 32 is altered on the basis of the depth difference (Z differential) between the delineation subject polygons 33 and 34, on the one hand, and the semitransparent polygon 32, on the other, and the delineation subject polygons 33 and 34 are subjected to blending processing according to the altered transparency (α value) and color data for the semitransparent polygon 32.

The alteration of the level of detail described in the foregoing is now described with reference to FIG. 7 and FIG. 8. FIG. 7 depicts the semitransparent polygon 32, delineation subject polygon 33, and delineation subject polygon 34 of FIG. 6 lined up from left to right in the order of nearness to the view point 35. The lateral direction in FIG. 7 represents the Z dimension (depth dimension).

FIGS. 8A to 8E represent MIPMAP texture data recording modes. In the example diagrammed in FIG. 8, texture data of five different levels of detail are diagrammed. The horizontal axis represents the x axis and the vertical axis the y axis. FIG. 8A represents texture data 40 having the highest level of detail at LOD=0. These are data of the highest definition. The size of this data region is ΔTx on the x axis and ΔTy on they axis. FIG. 8B represents texture data 41 at the next level of detail at LOD=1, FIG. 8C represents texture data 42 at the next level of detail after that at LOD=2, FIG. 8D represents texture data 43 at the 4th level of detail at LOD=3, and FIG. 8E represents texture data 44 at the lowest level of detail at LOD=4.

The texture data 40 which has the highest level of detail has the largest data volume, whereupon the time required for updating processing becomes long, but the images displayed therewith are the sharpest. Continuing therefrom, as the subject of updating is progressively shifted to texture data 41, texture data 42, texture data 43, and texture data 44, the data volume becomes less and less, with the data volume for texture data 44 being the smallest. Accordingly, the time required for the updating processing of texture data 44 at the lowest level of detail is the shortest, but the images displayed therewith are the least well defined.

Texture data having an LOD of from 1 to 4 can be obtained by reducing the texture data 40 having LOD=0. More specifically, the sizes of the texture data having an LOD of 1 to 4, on the x and y axes, are computed by the formulas 2 and 3 given below, respectively. As the level of detail declines, and the LOD value increases, the data volume is reduced to ¼, ¹⁄₁₆, ¹⁄₆₄, and ¹⁄₂₅₆ respectively.

$$x = \Delta Tx/2^{LOD} \quad (2)$$

$$y = \Delta Ty/2^{LOD} \quad (3)$$

Accordingly, the higher the level of detail the smaller will be the LOD value, and the greater the data volume, whereas the lower the level of detail the larger will be the LOD value, and the less the data volume. Texture data of different levels of detail, having LOD of from 0 to 4, are used according to the distance (Z value) from the view point. That is, to optimize the image processing, when the distance from the view point is shorter, texture data of a higher level of detail are used, whereas when the distance from the view point is longer, texture data of a lower level of detail are used.

In FIG. 7, based on the depth difference ($\Delta Z$) between the delineation subject polygon 33 and the semitransparent polygon 32, the level of detail of the texture data in the delineation subject polygon 33 is made lower, changing the LOD from 0 to 1, for example, and the delineation subject polygon 33 is delineated according to the texture data 41 corresponding to that altered LOD=1. Moreover, based on the depth difference ($\Delta Z$) between the delineation subject polygon 34 and the semitransparent polygon 32, the level of detail of the texture data in the delineation subject polygon 34 is made lower, changing the LOD from 2 to 4, for example, and the delineation subject polygon 34 is delineated according to the texture data 44 corresponding to that altered LOD=4. Thus the delineation subject polygon 33 is displayed comparatively sharply, while the delineation subject polygon 34 is displayed indistinctly. As a consequence, it is possible to simulate a frosted glass effect.

The blending process described above is now described in greater detail. Based on the depth difference ($\Delta Z$) between the delineation subject polygons 33 and 34, on the one hand, and the semitransparent polygon 32, on the other, the transparency ($\alpha$ value) for the semitransparent polygon 32 is altered, and the delineation subject polygons 33 and 34 are subjected to blending processing using formulas 4 and 5 given below, according to the altered transparency ($\alpha$ value) and color data for the semitransparent polygon 32. The transparency ($\alpha$ value) is made to approach opaque at 1 the larger the depth difference $\Delta Z$ noted above is, for example, and the transparency ($\alpha$ value) is made to approach transparent at 0 the smaller the depth difference $\Delta Z$ is. Thus it is possible to simulate a frosted glass effect.

$$XN = \alpha X1 + (1-\alpha)X2 \quad (4)$$

$$XN = \alpha X1 + (1-\alpha)X3 \quad (5)$$

In formulas 4 and 5 above, X1 represents the color data for the semitransparent polygon 32, X2 the color data for the delineation subject polygon 33, and X3 the color data for the delineation subject polygon 34.

Figure 9B:
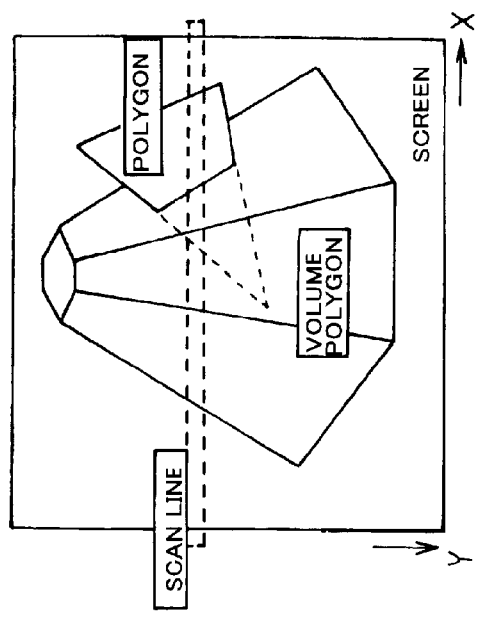
FIGS. 9A to 9D are explanatory diagrams for a fourth embodiment aspect of the present invention.
Figure 9D:
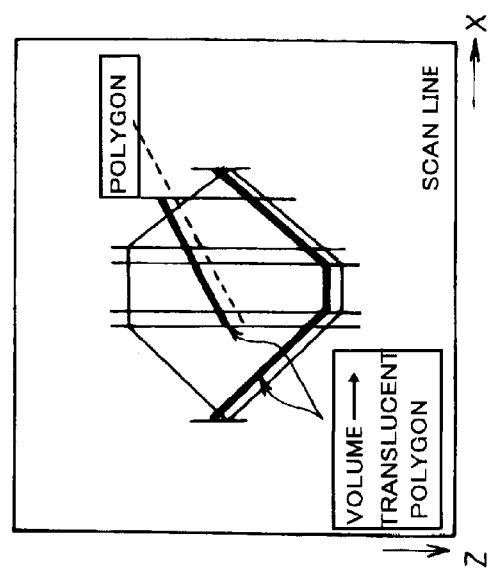
Figure 9A:
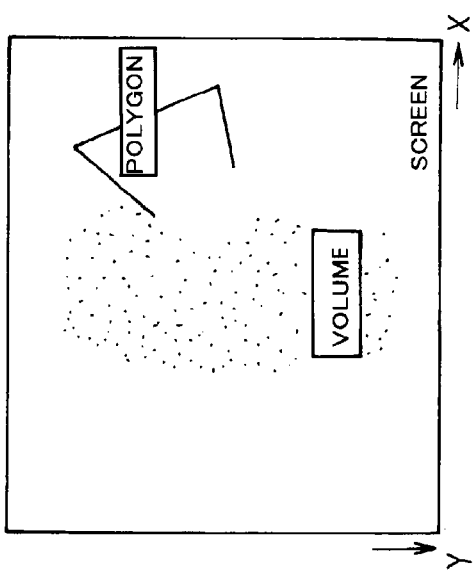

FIGS. 9A to 9D are diagrams for describing render volume in a fourth embodiment aspect of volume representation in the present invention. These figures are specific examples of FIG. 1 and FIG. 2, describing fog volume and light volume more concretely. FIG. 9A diagrams volume representation wherein a fog or light volume falls across part of a triangular polygon. As diagrammed in FIG. 9B, a polygon batch (volume polygons) is prepared for forming the outline of the volume.

Figure 9C:
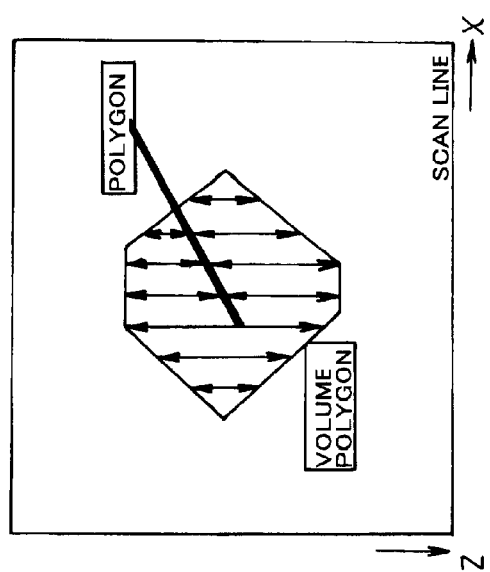

As indicated in the Z-X axis cross-section of the scan line of FIG. 9B in FIG. 9C, the thickness of the volume in the view point direction is used in a density element determination function. That is, the Z value differential that is the thickness between a volume polygon and another polygon, between the volume polygons, is computed, and density data are produced. Then, as diagrammed in FIG. 9D, the volume polygon is made semitransparent to match that density, that is, blending is done by modulating the polygon attributes. Thus volume rendering for that portion can be concluded in one process.

The attributes (texture coordinates, color, normal(s), etc.) belonging to the volume polygon on the front surface are inherited by such polygons made semitransparent. When generated polygons are subjected to $\alpha$-blending, a fog volume effect is obtained, and when they are added, a light volume effect is obtained.

Thus, by representing the volume outline by polygons, and using the thickness of the volume in the view point direction in the density element determination function, the data volume and computation volume are reduced, and volume representation is made possible. For this reason, in real time computer graphics, volume representation in real time becomes possible.

Figure 6:
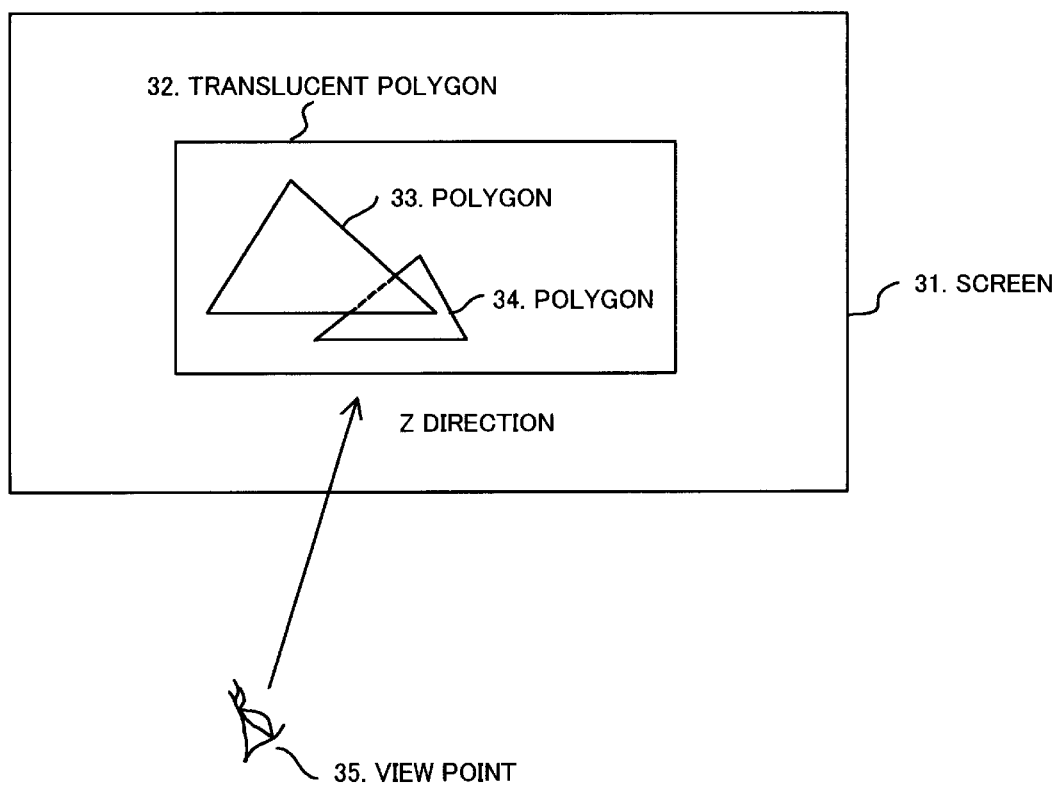
FIG. 6 is a diagram for describing a third embodiment aspect of the present invention.
Figure 7:
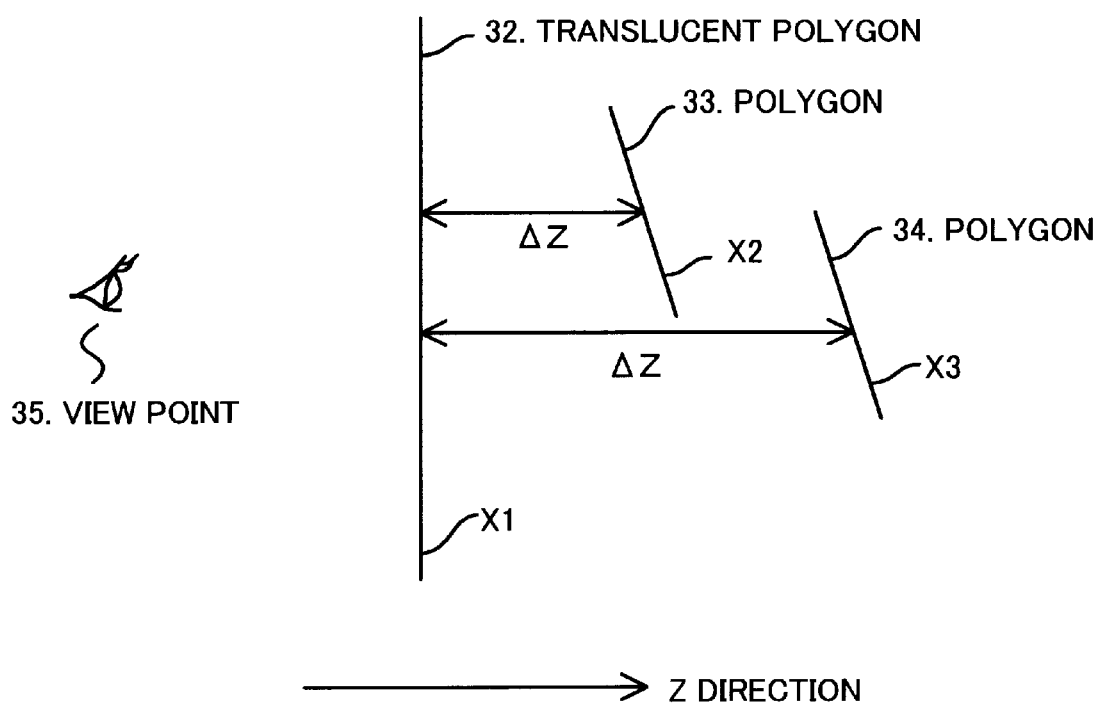
FIG. 7 is a side view corresponding to FIG. 6.

Moreover, when the texture data are modulated with the thickness of the volume in the view point direction, the lens volume diagrammed in FIGS. 3 to 5 can be represented, and the frosted glass volume representation diagrammed in FIGS. 6 to 8 can be represented.

Image Processing Apparatus

Figure 10:
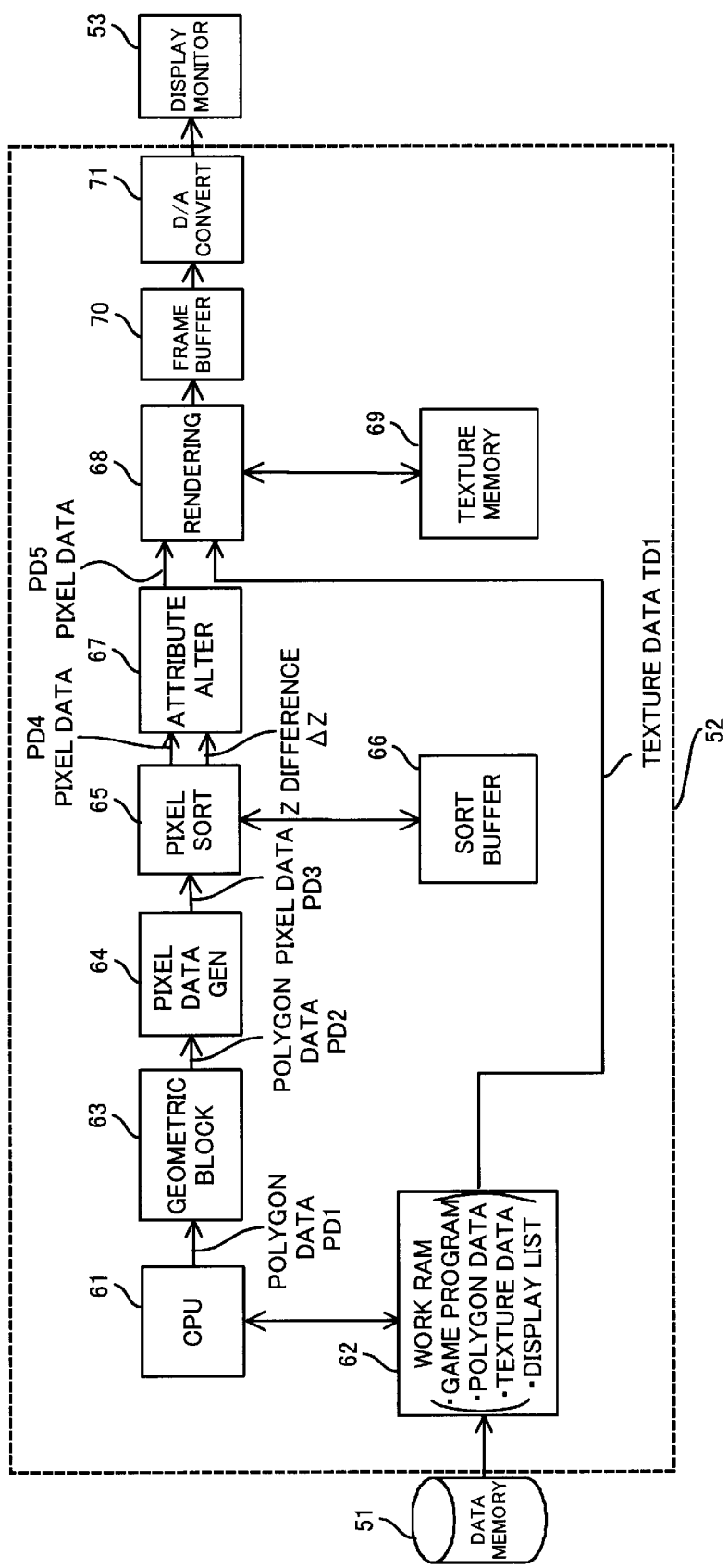
FIG. 10 is a block diagram of the configuration of one embodiment aspect of an image processing apparatus 52 wherein the present invention is applied.

FIG. 10 is a block diagram of the configuration of one embodiment aspect of an image processing apparatus 52 wherein the present invention is applied. A CPU 61 executes a game program stored beforehand in a work RAM 62, and generates polygon data that configure objects or line of sight information and the like for the display screen. The polygon data and display list (information corresponding to all pixels on the screen) generated by the CPU 61 are stored in the work RAM 62, and read out therefrom, as appropriate. As necessary, texture data read out from an external data memory 51 (a hard disk, for example) are temporarily stored in the work RAM 62. The CPU 61 supplies polygon data PD1 defined in an object coordinate system that are polygon data generated according to control inputs and the game program to a geometry block 63.

The geometry block 63 converts the polygon data PD1 in the object coordinate system so supplied to data in a three-dimensional world coordinate system. The geometry block 63 next performs transparent conversion to convert the polygon converted to the three-dimensional world coordinate system to a two-dimensional screen coordinate system. In this way, polygon data PD2 defined in the screen coordinate system generated by the geometry block 63 are supplied to a pixel data generator 64.

Figure 11:
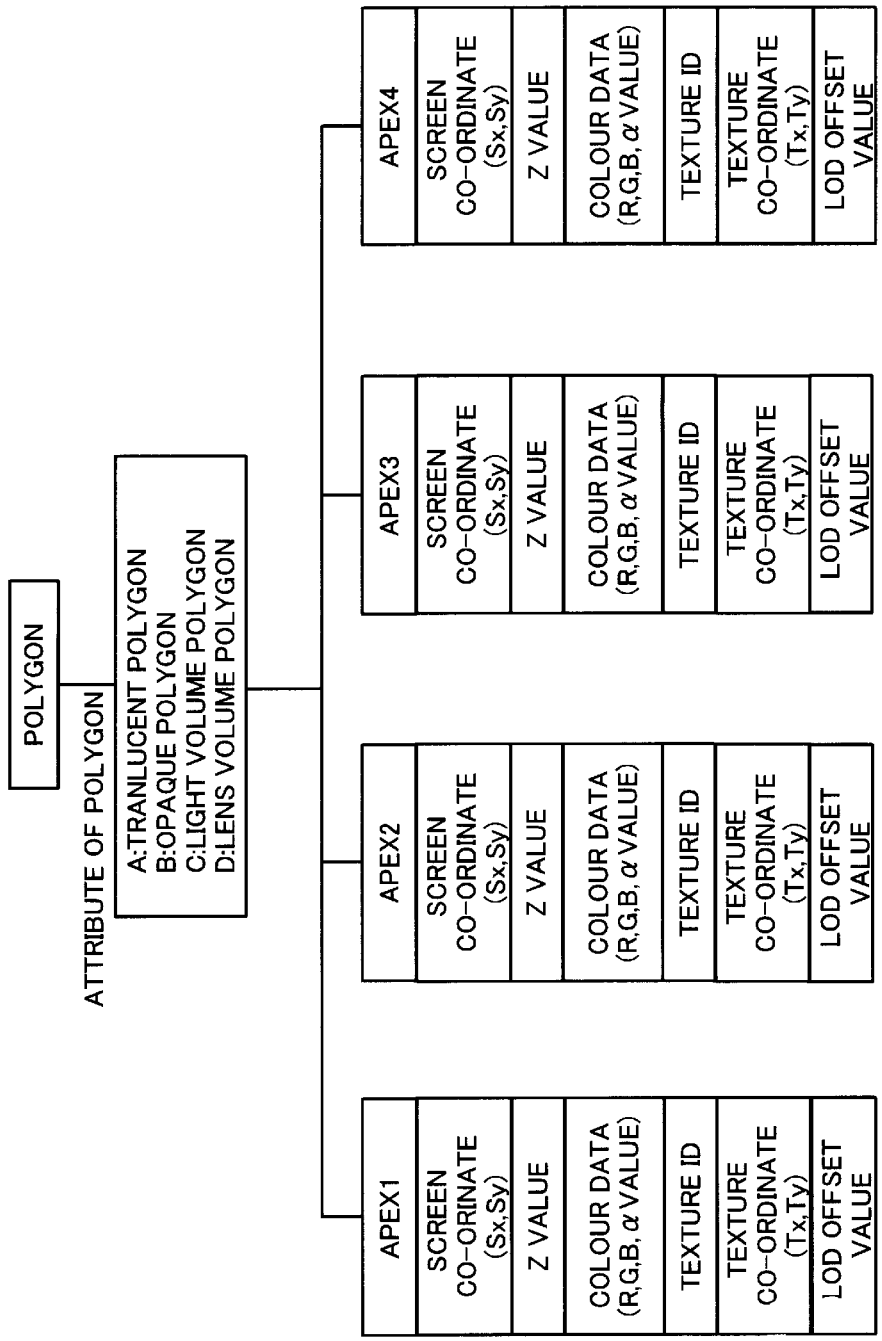
FIG. 11 is a diagram representing one example of polygon data output from the geometry block 63 in FIG. 10.

One example of the polygon data PD2 defined in the screen coordinate system generated by the geometry block 63 is diagrammed in FIG. 11. FIG. 11 represents one example of apex data that configure a polygon ID1. The polygon ID1 has polygon attribute information. By polygon attribute information is meant information for identifying polygon attributes. For example, when the polygon ID1 is an opaque polygon, "A" is entered, when the polygon ID1 is a semitransparent polygon, "B" is written, when the polygon ID1 is a light volume polygon configuring a light volume, a "C" is written, and when the polygon ID1 is a lens volume polygon configuring a lens volume, a "D" is written.

The polygon ID1 is configured by four apex data. Apex 1 data are configured by screen coordinates (Sx, Sy) that indicate positions in the display screen, Z values that indicate depths in the display screen, α values that indicate transparency and R (red), G (green), and B (blue) color information, texture IDs for identifying texture data, texture coordinates (Tx, Ty) that indicate texture data coordinates, and LOD offset values, etc. The data configuration for apex 2, apex 3, and apex 4 data are the same as for apex 1.

Figure 12:
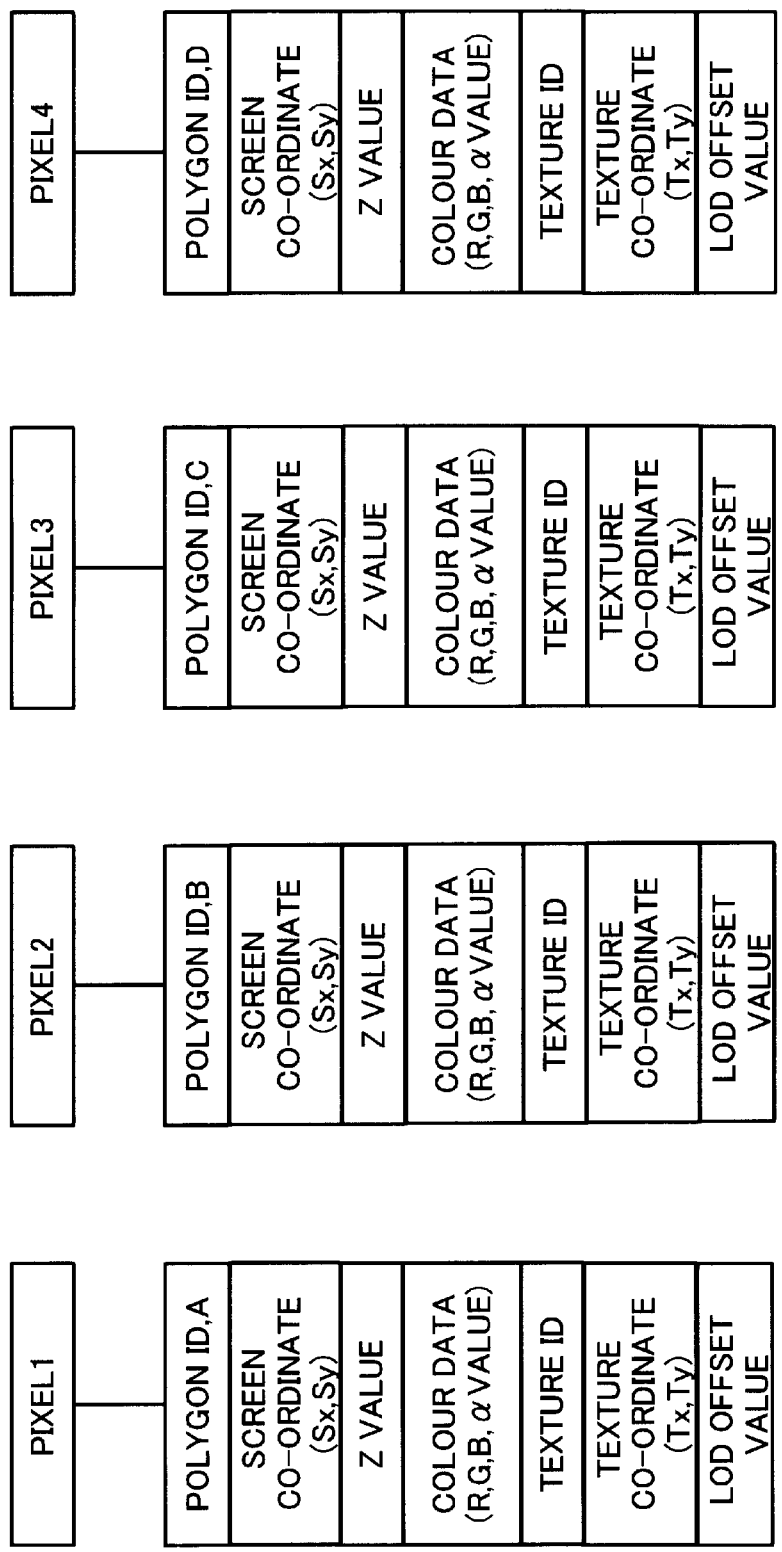
FIG. 12 is a diagram representing one example of pixel data generated by the pixel data generator 64 in FIG. 10.

The pixel data generator 64 converts the polygon data PD2 supplied from the geometry block 63 to pixel data PD3 by either fractal processing or raster scan processing. One example of pixel data PD3 generated by the pixel data generator 64 is diagrammed in FIG. 12. A pixel 1 is configured by a polygon ID and polygon attribute information (A, B, C, or D as described earlier), screen coordinates (Sx, Sy), Z value, color information (R, G, B, α value), texture ID, texture coordinates (Tx, Ty), and LOD offset value. Pixel 2, pixel 3, and pixel 4 data have the same configuration as the pixel 1. These pixel data are generally calculated by subjecting apex data to liner interpolation computations. All of the pixel data PD3 generated by the pixel data generator 64 are stored in Z value order in pixel areas inside a sort buffer 66 having area allotted to each pixel, and are referenced during the rendering processing that is described subsequently.

Figure 13:
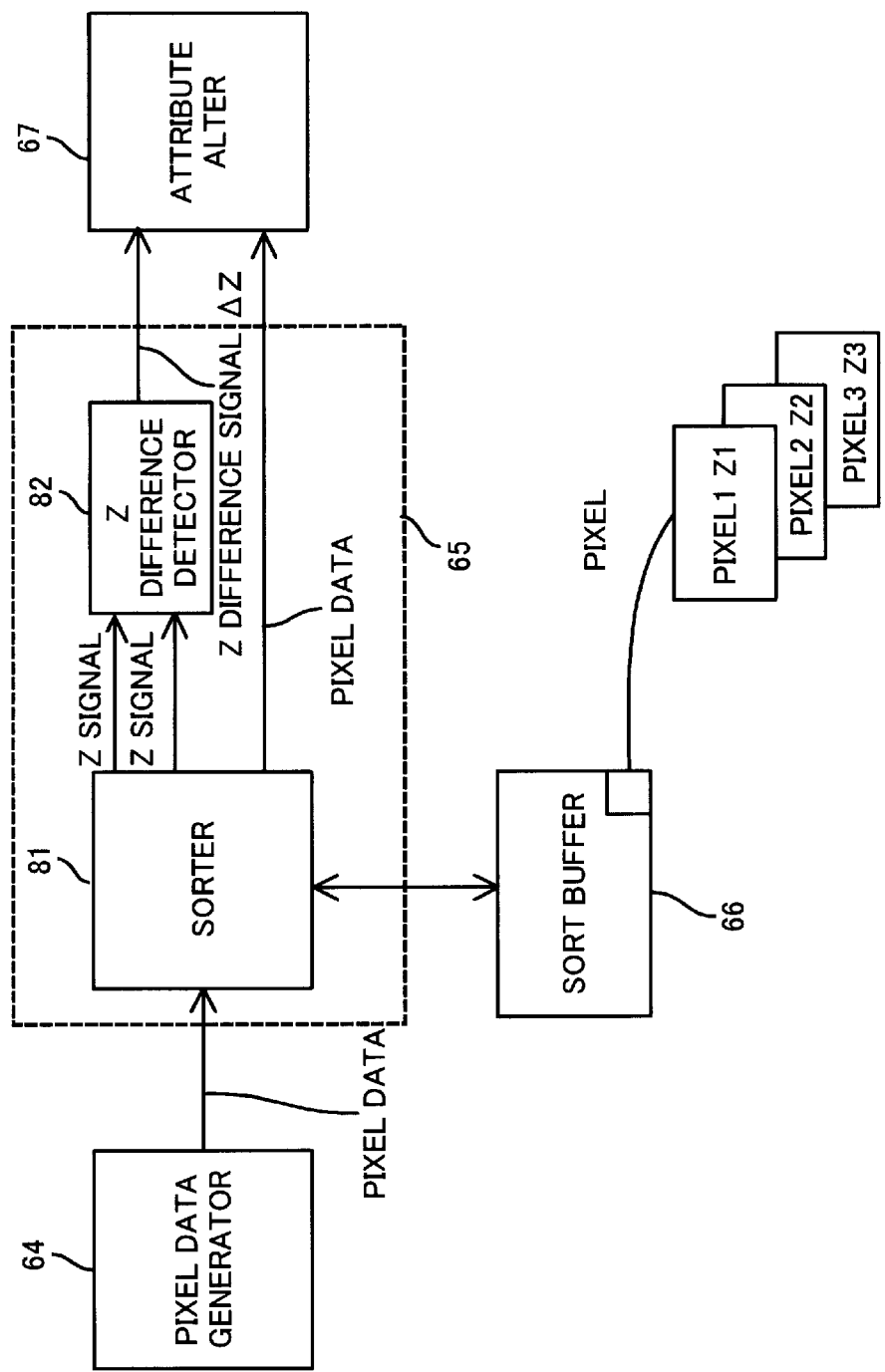
FIG. 13 is a block diagram of an example configuration of the pixel sorter 65 in FIG. 10.

In FIG. 13 is diagrammed an example configuration of a pixel sorter 65. A sort processor 81 subjects the pixel data PD3 supplied from the pixel data generator 64 to sorting based on the Z value, and rearranges the pixel data, pixel by pixel, in Z value order, as diagrammed in FIG. 13. More specifically, the pixel data comprising the polygon ID, polygon attribute information, screen coordinates (Sx, Sy), Z values, color information (R, G, B, a value), texture IDs, texture coordinates (Tx, Ty), and LOD offset values are rearranged, pixel by pixel, in Z value order. The pixel data rearranged in Z value order by the sort processor 81 are stored in the sort buffer 66.

Figure 14:
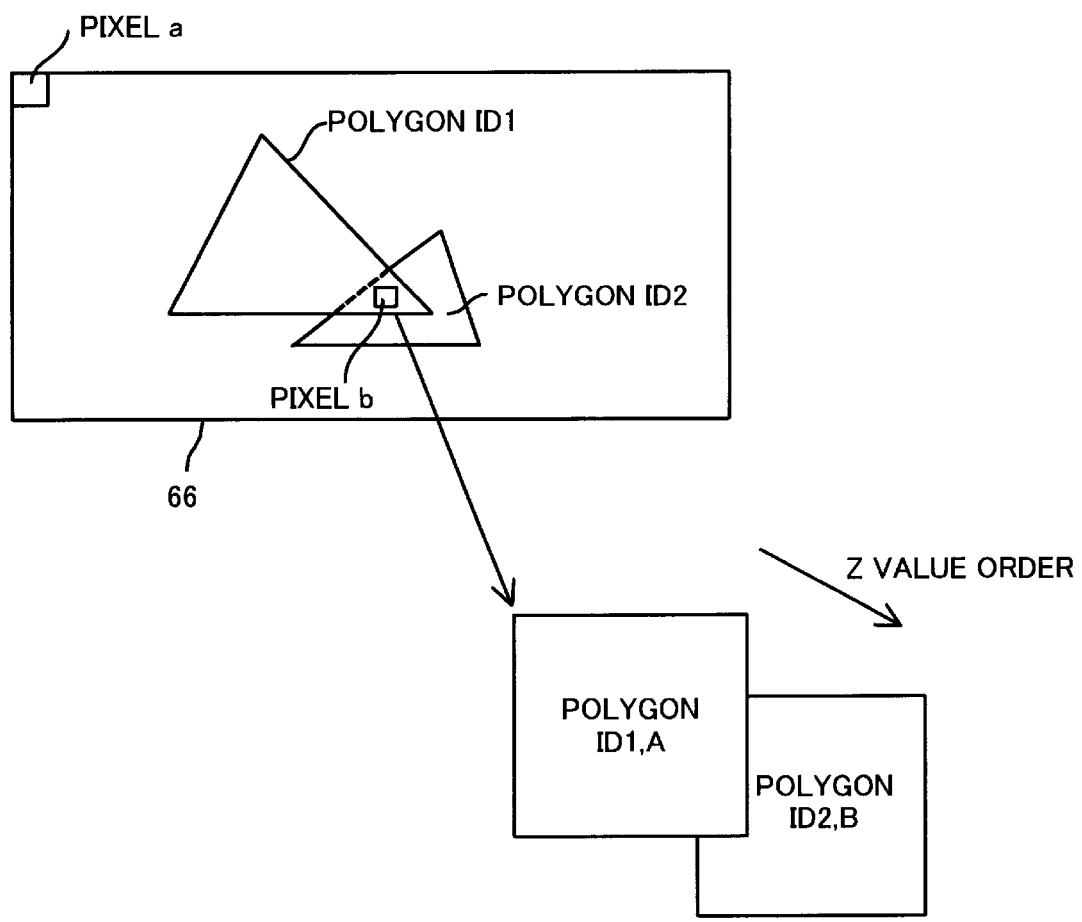
FIG. 14 is a diagram for describing pixel data stored in the sort buffer 66 in FIG. 10.

The pixel data stored in the sort buffer 66 are described now with reference to FIG. 14. In the example diagrammed in FIG. 14, the way in which pixel data for the polygon ID1 and the polygon ID2 are stored in the sort buffer 66 is diagrammed. It is assumed here that the polygon ID1 is positioned in the foreground, and that the polygon ID2 is positioned in back. At pixel b where the polygon ID1 and polygon ID2 overlap, pixel data for the polygon ID1 and pixel data for the polygon ID2 are stored, in Z value order. Thus, inside the sort buffer 66, for all pixels within a prescribed area, pixel data for all of the polygons positioned there are stored such that they are arranged in Z value order. That is, the sort buffer 66 is configured by a 3D register.

Returning to FIG. 13, a Z differential detection unit 82 scans the pixel data for the pixels in the sort buffer 66, detects the presence of light volume and lens volume polygons described earlier, roughly along the line of sight, and detects the Z differential therefor. The Z differential detection unit 82 detects the Z differentials between a semitransparent polygon 32 such as a frosted glass and an ordinary (opaque) polygon 33 therebehind. A Z value differential signal ΔZ detected by the Z differential detection unit 82 is supplied to an attribute alteration unit 67. The sort processor 81 also sends the polygon pixel data PD4 to the attribute alteration unit 67.

Returning to FIG. 10, when a Z difference signal ΔZ for a light volume polygon is supplied from the Z difference detection unit 82, the attribute alteration unit 67 generates semitransparent polygons in the position of that light volume, and sets the α value therefor according to the Z difference signal ΔZ. Alternatively, the light volume polygon is treated as a semitransparent polygon, and the α value therefor is altered according to the Z difference signal ΔZ. The larger the Z difference for a light volume polygon, the larger the a value therefor is made (i.e., the more opaque it is made).

When the Z difference signal ΔZ of a lens volume polygon has been sent from the Z difference detection unit 82, the attribute alteration unit 67 alters the texture coordinates for texture that constitutes a pattern on the surface of that lens volume polygon according to the Z difference signal ΔZ. If the lens volume polygon is a convex lens, the attribute alteration unit 67 shifts the texture coordinates more toward the center of the lens the smaller the supplied Z difference signal ΔZ is than a reference value at the center of the lens. Thus a pattern on the surface of the lens volume polygon can be enlarged.

When the lens volume polygon is a concave lens, the attribute alteration unit 67 shifts the texture coordinates more toward the periphery of the lens the larger the supplied Z difference signal ΔZ is than the reference value at the center of the lens. Thus a pattern on the surface of the lens volume polygon can be reduced. For the lens volume polygon, moreover, texture (a pattern) having a magnification factor of 1 is generated beforehand, according to the polygons or background positioned therebehind, and that is stored in a texture memory 69. Thereupon, texture enlargement or reduction is performed, according to the Z difference signal ΔZ described above, by shifting the texture coordinates therefor.

When a Z differential signal ΔZ for a frosted glass (semitransparent polygon) and delineation subject polygon is supplied from the Z differential detection unit 82, the attribute alteration unit 67, based on that supplied Z differential signal ΔZ, alters the LOD offset values for pixels positioned behind the frosted glass (semitransparent polygon). That is, the attribute alteration unit 67 increases the LOD offset value for pixels positioned behind the frosted glass (semitransparent polygon), as the Z differential signal ΔZ becomes larger. Thus the definition of the texture (pattern) of a delineation subject polygon positioned behind the frosted glass deteriorates as the Z differential signal becomes larger.

The attribute alteration unit 67 also alters the a value for the frosted glass (semitransparent polygon) according to the supplied Z differential signal ΔZ. That is, the attribute alteration unit 67 makes the a value for the frosted glass (semitransparent polygon) larger (making the frosted glass more opaque) as the Z differential becomes larger. Thus the degree of color mixing in the frosted glass increases as the Z differential becomes larger.

Figure 15A:
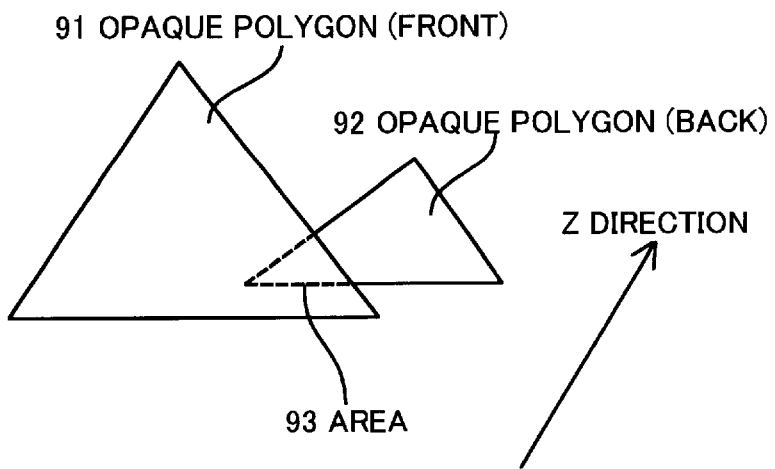
FIGS. 15A and 15B are diagrams for describing delineation processing by the rendering block 68 in FIG. 10.
Figure 15B:
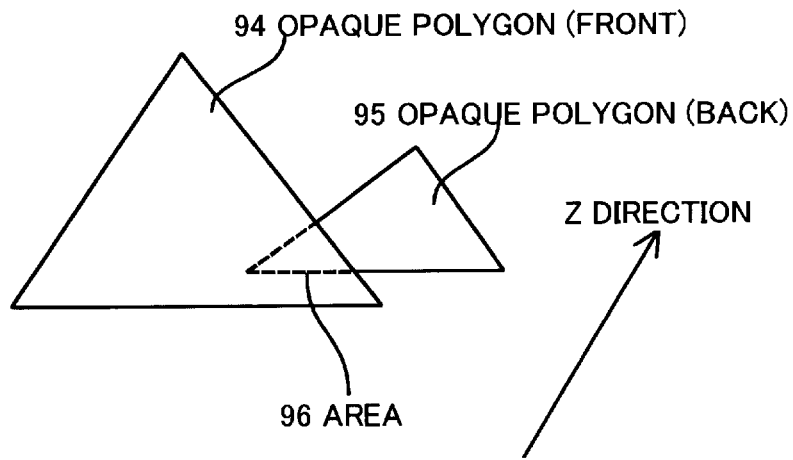

A rendering block 68 subjects pixel data PD5 supplied from the attribute alteration unit 67 to rendering (delineation) processing, pixel by pixel. This rendering processing is now described with reference to FIG. 15A and 15B. FIG. 15A represents a case where two overlapping opaque polygons 91 and 92 are rendered. FIG. 15B represents a case where two overlapping polygons, namely a semitransparent polygon 94 and an opaque polygon 95, are rendered.

As diagrammed in FIG. 15A, when the opaque polygon 91 is positioned in the foreground, the rendering block 68 first delineates that opaque polygon 91. Next, the rendering block 68 delineates the opaque polygon 92 positioned in back. When this is being done, the area 93 of the opaque polygon 92 is not delineated, so that it will not be seen from the view point. Thus rendering processing times can be shortened.

As diagrammed in FIG. 15B, when the semitransparent polygon 94 is positioned in the foreground, and the opaque polygon 95 is positioned therebehind, the rendering block 68 first delineates the opaque polygon 95 in back. Next, the rendering block 68 delineates the semitransparent polygon 94 positioned in the foreground. When this is being done, the rendering block 68 performs color rendering processing on the area 96 where the two polygons overlap, using the α value of the semitransparent polygon 94.

In the case where a light volume polygon exists in the foreground, and a delineation subject polygon exists therebehind, the rendering block 68 performs the same processing described in conjunction with FIG. 15B, using an altered α value. And in the case where a lens volume polygon exists, the texture coordinates will have already been altered by the attribute alteration unit 67, wherefore the rendering block 68 merely performs the same processing on the opaque polygon without alteration, whereupon the pattern in the back is automatically enlarged or reduced. In the case where a frosted glass exists in the foreground and a delineation subject polygon exits therebehind, moreover, the rendering block 68 calculates the LOD for the texture data, and causes the altered LOD offset value to be reflected in the LOD value. Alternatively, fuzzy rendering can be performed for a polygon behind the frosted glass by using the altered α value in performing the same processing described in conjunction with FIG. 15B.

The image data generated by the rendering block 68 are sent to a frame buffer 70 and there temporarily stored. Digitally formatted image data stored in the frame buffer 70 are sent to a digital/analog (D/A) converter 71. The digital/analog converter 71 converts the digitally formatted image data so supplied to analog signals. The analog signals generated by the digital/analog converter 71 are sent to a display unit 53 and displayed on the screen.

Figure 16:
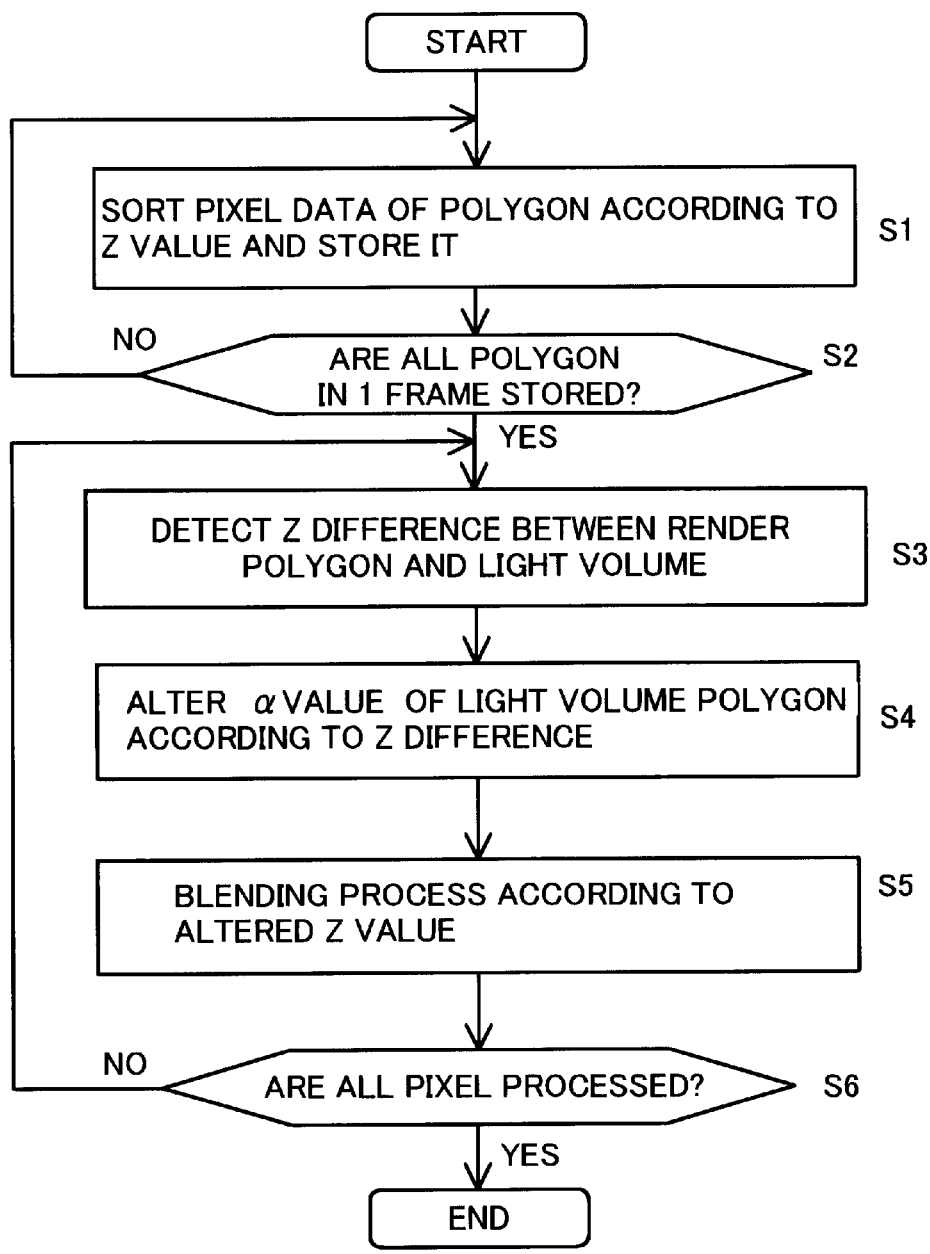
FIG. 16 is a flow chart for describing processing operations for the first embodiment aspect diagrammed in FIG. 1.

The processing operations performed from the pixel sorter 65 to the rendering block 68 are now described with reference to the flow charts in FIGS. 16 to 19. FIG. 16 provides a flow chart for the case of the first embodiment aspect. First, in step S1, when pixel data PD3 are sent from the pixel data generator 64 to the sort processor 81, the sort processor 81 rearranges the polygon pixel data so supplied in order according to the Z value, pixel by pixel, and stores those rearranged data in the sort buffer 66.

In step S2, the sort processor 81 determines whether or not all the polygon pixel data for one frame have been stored in the sort buffer 66. When in step S2 it is determined that all of the polygon pixel data for one frame are not stored in the sort buffer 66, step S1 is returned to, and execution of the sort processing is repeated. When it is determined in step S2 that all of the polygon pixel data for one frame have been stored in the sort buffer 66, step S3 is advanced to.

In step S3, the Z differential detection unit 82 scans the sort buffer 66, detects the depth difference (Z differential) for a light volume polygon existing between a delineation subject polygon and the view point, and sends a Z differential signal ΔZ to the attribute alteration unit 67.

In step S4, the attribute alteration unit 67 alters the transparency (α value) of the light volume polygon, based on the depth difference (Z differential) of the light volume polygon supplied.

In step S5, the rendering block 68 performs rendering processing according to the altered transparency (α value) and color data for the light volume polygon.

In step S6, the rendering block 68 determines whether or not all of the pixels have been delineated. If in step S6 it is determined that all of the pixels have not been delineated, steps S3 is returned to, and execution of the processing from that step on is repeated. If it is determined in step S6 that all of the pixels have been delineated, the processing operations are terminated.

Figure 17:
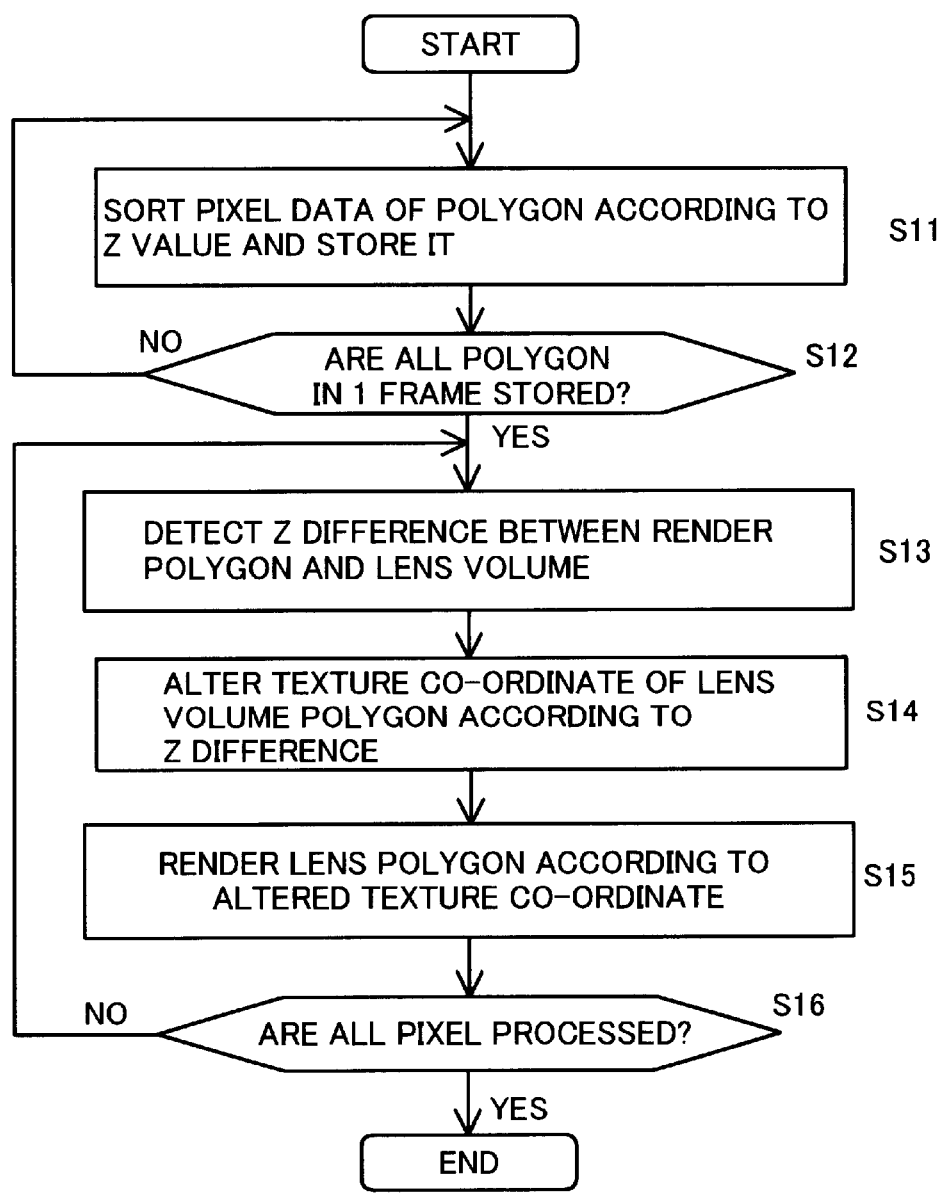
FIG. 17 is a flow chart for describing processing operations for the second embodiment aspect diagrammed in FIG. 3.

FIG. 17 provides a flowchart for the case of the second embodiment aspect. First, in step S11, when pixel data PD3 have been sent from the pixel data generator 64 to the sort processor 81, the sort processor 81 rearranges the polygon pixel data so supplied in order according to the Z value, pixel by pixel, and stores those rearranged data in the sort buffer 66.

In step S12, the sort processor 81 determines whether or not all of the polygon pixel data for one frame have been stored in the sort buffer 66. When in step S12 it is determined that all of the polygon pixel data for one frame are not stored in the sort buffer 66, step S11 is returned to, and execution of the sort processing is repeated. If it is determined in step S12 that all of the polygon pixel data for one frame have been stored in the sort buffer 66, step S13 is advanced to.

In step S13, the Z differential detection unit 82 scans the sort buffer 66, detects the depth difference (Z differential) for a lens volume polygon existing between the delineation subject polygon and the view point, and sends a Z differential signal ΔZ to the attribute alteration unit 67.

In step S14, the attribute alteration unit 67 alters the texture coordinates for the lens volume polygon according to the depth difference (Z differential) of the lens volume polygon supplied.

In step S15, the rendering block 68 fetches texture data for the lens volume polygon according to the altered texture coordinates, and delineates the lens volume polygon.

In step S16, the rendering block 68 determines whether or not all of the pixels have been delineated. If in step S16 it is determined that all of the pixels have not been delineated, step S13 is returned to, and execution of the processing from that step on is repeated. If in step S16 it is determined that all of the pixels have been delineated, the processing operations are terminated.

Figure 18:
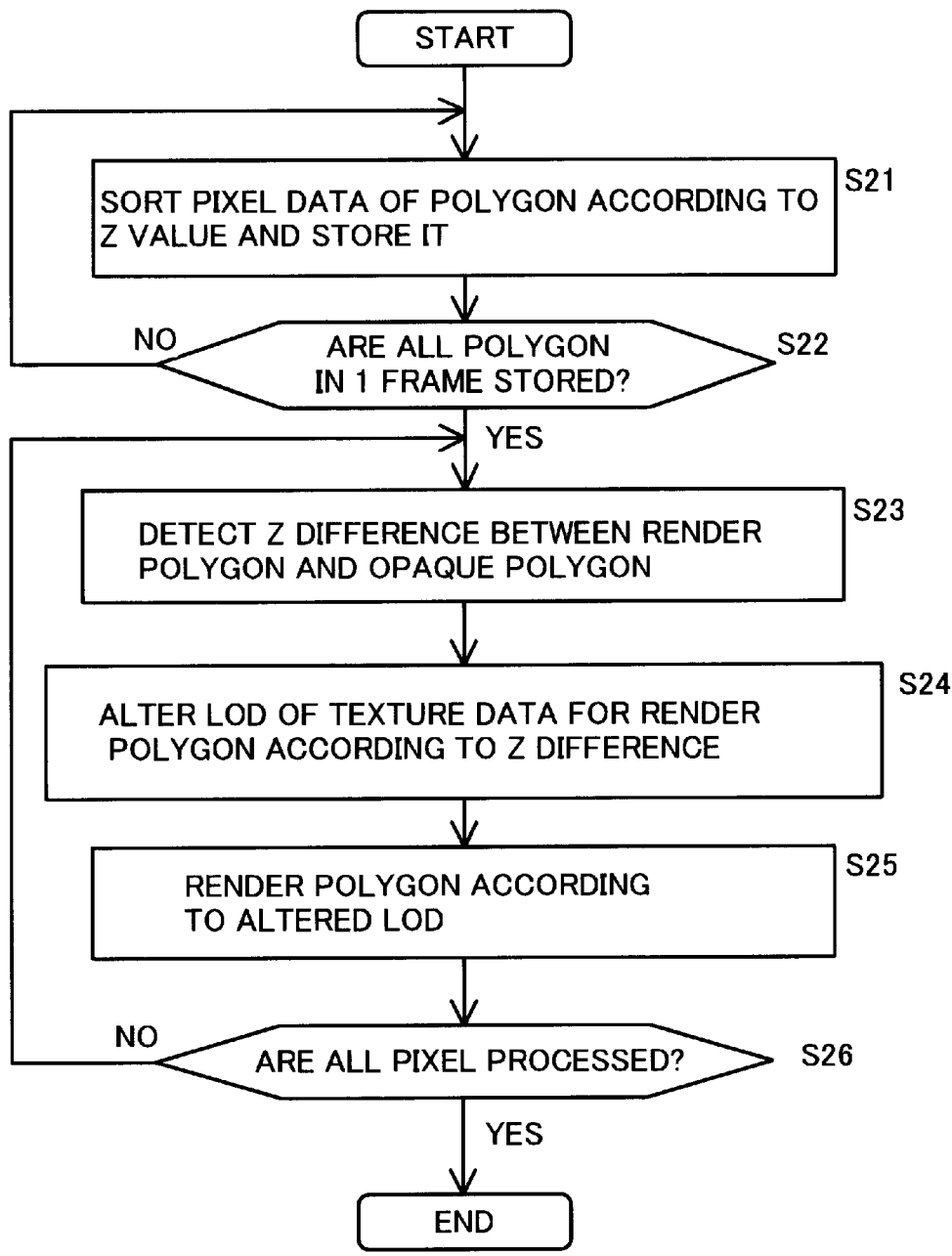
FIG. 18 is a flow chart for describing processing operations for the third embodiment aspect diagrammed in FIG. 6.

FIG. 18 provides a flowchart for the case of the third embodiment aspect. First, in step S21, when pixel data PD3 are sent from the pixel data generator 64 to the sort processor 81, the sort processor 81 rearranges the polygon pixel data supplied in order according to the Z value, pixel by pixel, and stores those rearranged data in the sort buffer 66.

In step S22, the sort processor 81 determines whether or not all of the polygon pixel data for one frame have been stored in the sort buffer 66. If in step S22 it is determined that all of the polygon pixel data for one frame are not stored in the sort buffer, step S21 is returned to, and execution of the sort processing is repeated. If it is determined in step S22 that all of the polygon pixel data for one frame have been stored in the sort buffer 66, step S23 is advanced to.

In step S23, the Z differential detection unit 82 scans the sort buffer 66, detects the depth difference (Z differential) between the delineation subject polygon and frosted glass (semitransparent polygon), and sends a Z differential signal ΔZ to the attribute alteration unit 67.

In step S24, the attribute alteration unit 67 alters the LOD offset value for texture data in the delineation subject polygon according to the depth difference (Z differential) between the delineation subject polygon and frosted glass (semitransparent polygon) supplied.

In step S25, the rendering block 68 delineates the delineation subject polygon according to the altered level of detail.

In step S26, the rendering block 68 determines whether or not all of the pixels have been delineated. If it is determined in step S26 that all of the pixels have not been delineated, step S23 is returned to, and execution of the processing from that step on is repeated. If it is determined in step S26 that all of the pixels have been delineated, the processing operations are terminated.

Figure 19:
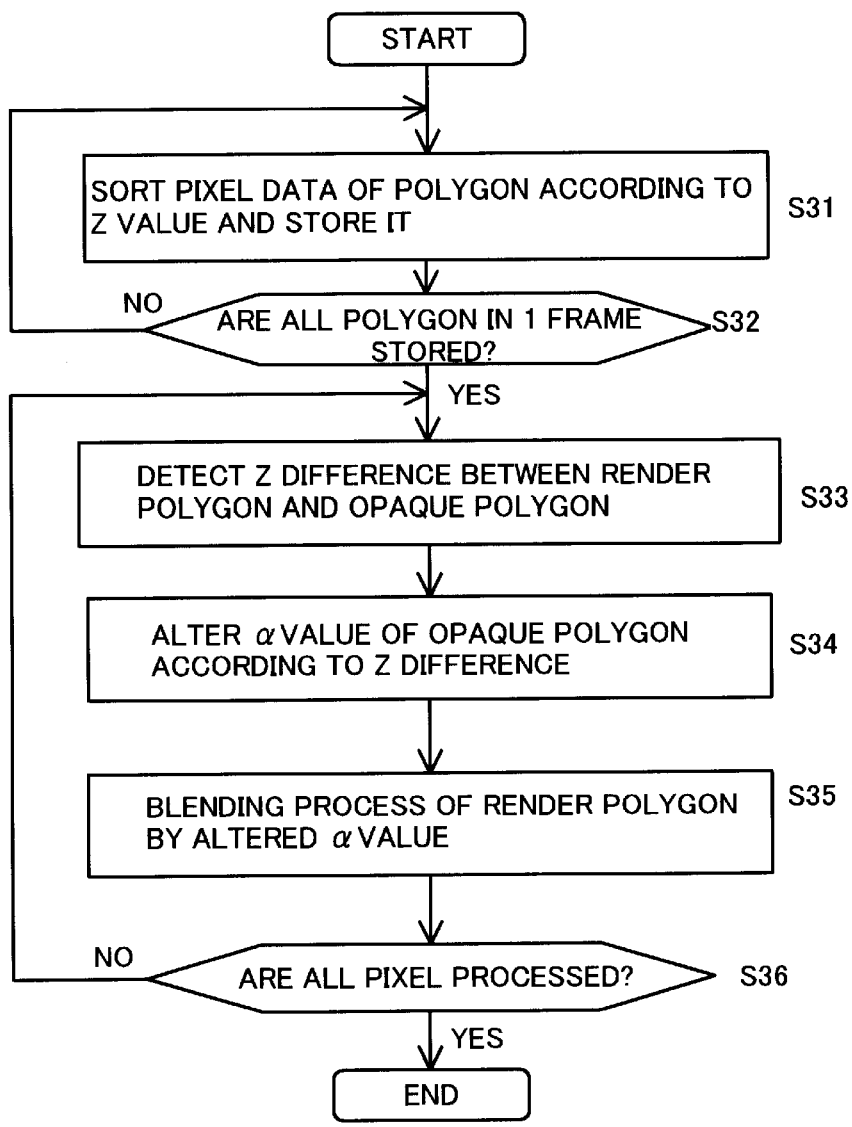
FIG. 19 is a flow chart for describing processing operations for the third embodiment aspect diagrammed in FIG. 6.

FIG. 19 provides a flowchart for the case of the third embodiment aspect. First, in step S31, when pixel data PD3 have been sent from the pixel data generator 64 to the sort processor 81, the sort processor 81 rearranges the polygon pixel data so supplied in order according to the Z value, pixel by pixel, and stores those rearranged data in the sort buffer 66.

In step S32, the sort processor 81 determines whether or not all of the polygon pixel data for one frame have been stored in the sort buffer 66. If it is determined in step S32 that all of the polygon pixel data for one frame are not stored in the sort buffer 66, step S31 is returned to, and execution of sort processing is repeated. If it is determined in step S32 that all of the polygon pixel data for one frame have been stored in the sort buffer 66, step S33 is advanced to.

In step S33, the Z differential detection unit 82 scans the sort buffer 66, detects the depth difference (Z differential) between the delineation subject polygon and the frosted glass (semitransparent polygon), and sends a Z differential signal ΔZ to the attribute alteration unit 67.

In step S34, the attribute alteration unit 67 alters the transparency (α value) for the frosted glass (semitransparent polygon) according to the depth difference (Z differential) between the delineation subject polygon and frosted glass (semitransparent polygon) supplied.

In step S35, the rendering block 68 subjects the delineation subject polygon to blending processing according to the altered transparency (α value) and color data for the semitransparent polygon.

In step S36, the rendering block 68 determines whether or not all of the pixels have been delineated. If in step S36 it is determined that all of the pixels have not been delineated, step S33 is returned to, and execution of processing from that step on is repeated. If it is determined in step S36 that all of the pixels have been delineated, the processing operations are terminated.

Figure 20:
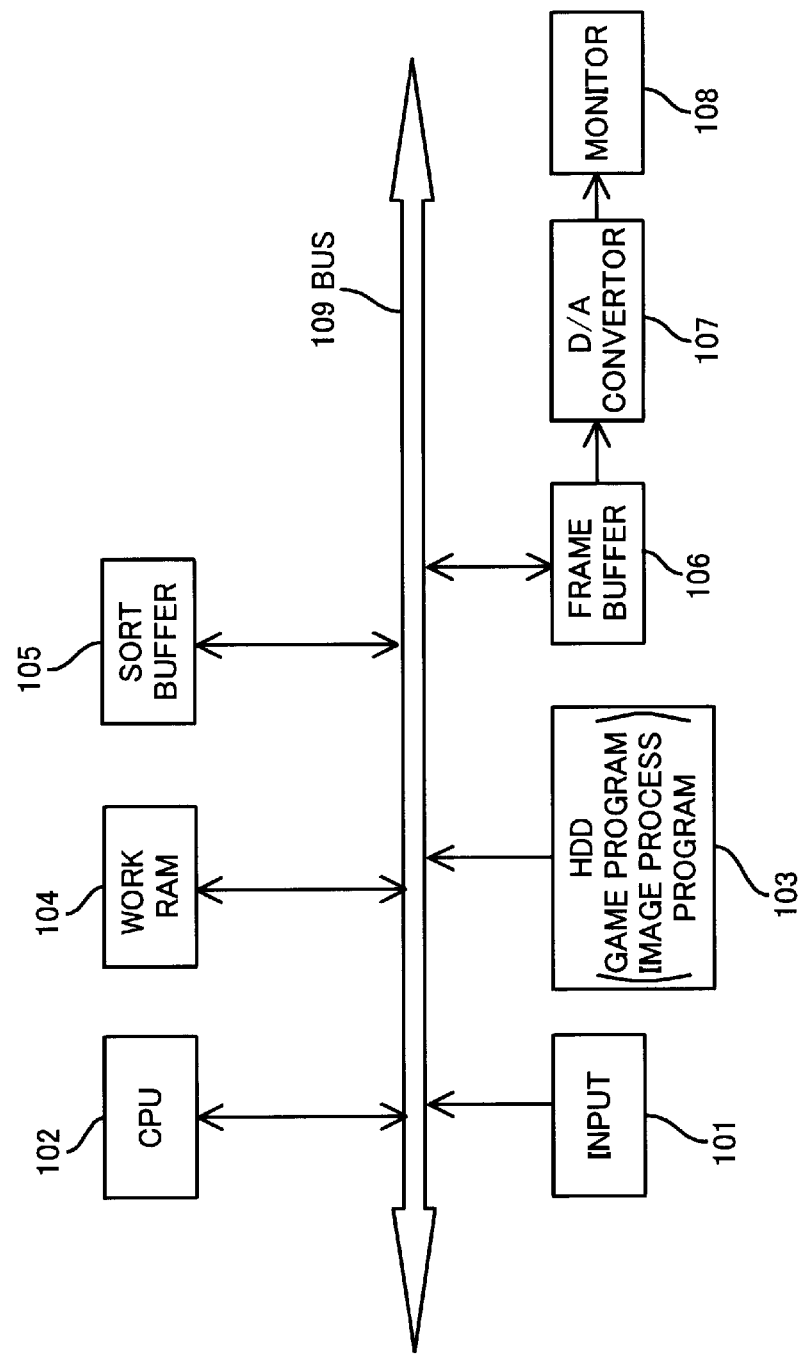
FIG. 20 is a block diagram of the configuration of another embodiment aspect wherein the present invention is applied.

FIG. 20 is a block diagram of the configuration of another embodiment aspect wherein the present invention is applied. The image processing apparatus 52 diagrammed in FIG. 10 employs dedicated hardware to implement the geometry block 63, pixel data generator 64, pixel sorter 65, attribute alteration unit 67, and rendering block 68. In the example diagrammed here in FIG. 20, however, a general purpose computer is used and image processing (geometry processing, pixel data generation processing, pixel sorter processing, attribute alteration processing, and rendering processing) is implemented by a software program or programs.

An input unit 101, CPU 102, hard disk 103, work RAM 104, sort buffer 105, and frame buffer 106 are mutually connected through a bus 109. An operator enters information by manipulating the input unit 101. A game program and an image processing program are stored beforehand on the hard disk 103. The CPU 102 reads out the game program and image processing program from the hard disk 103 and executes them, as appropriate. Data and the like that are necessary when the CPU 102 is executing a program are stored in the work RAM 104 as appropriate.

In the sort buffer 105 are stored pixel data that have been sort-processed in Z value order, pixel by pixel. In the frame buffer 106 are stored the image data that are generated. The image data read out from the frame buffer 106 are sent to a digital/analog (D/A) converter 107. The digital/analog converter (D/A) converter 107 converts the digital data (image data) so supplied to analog signals which are then displayed on a display monitor 108.

The recording media for providing the computer programs for executing the processing described in the foregoing include, in addition to such information recording media as magnetic disks and CD-ROMs, network-based transmission media such as the internet or digital satellites.

Another Image Processing Apparatus

Figure 21:
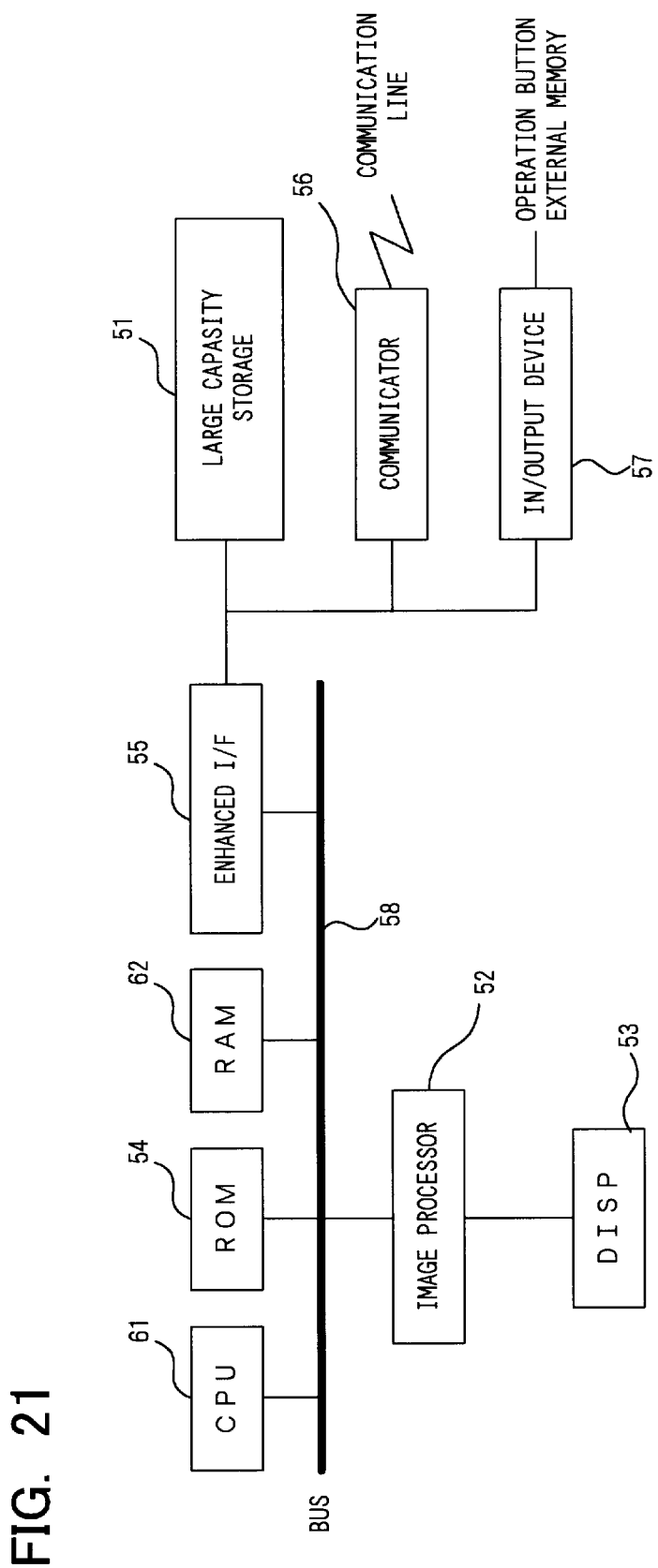
FIG. 21 is a block diagram of the configuration of another computer graphics apparatus wherein the present invention is applied.
Figure 22:
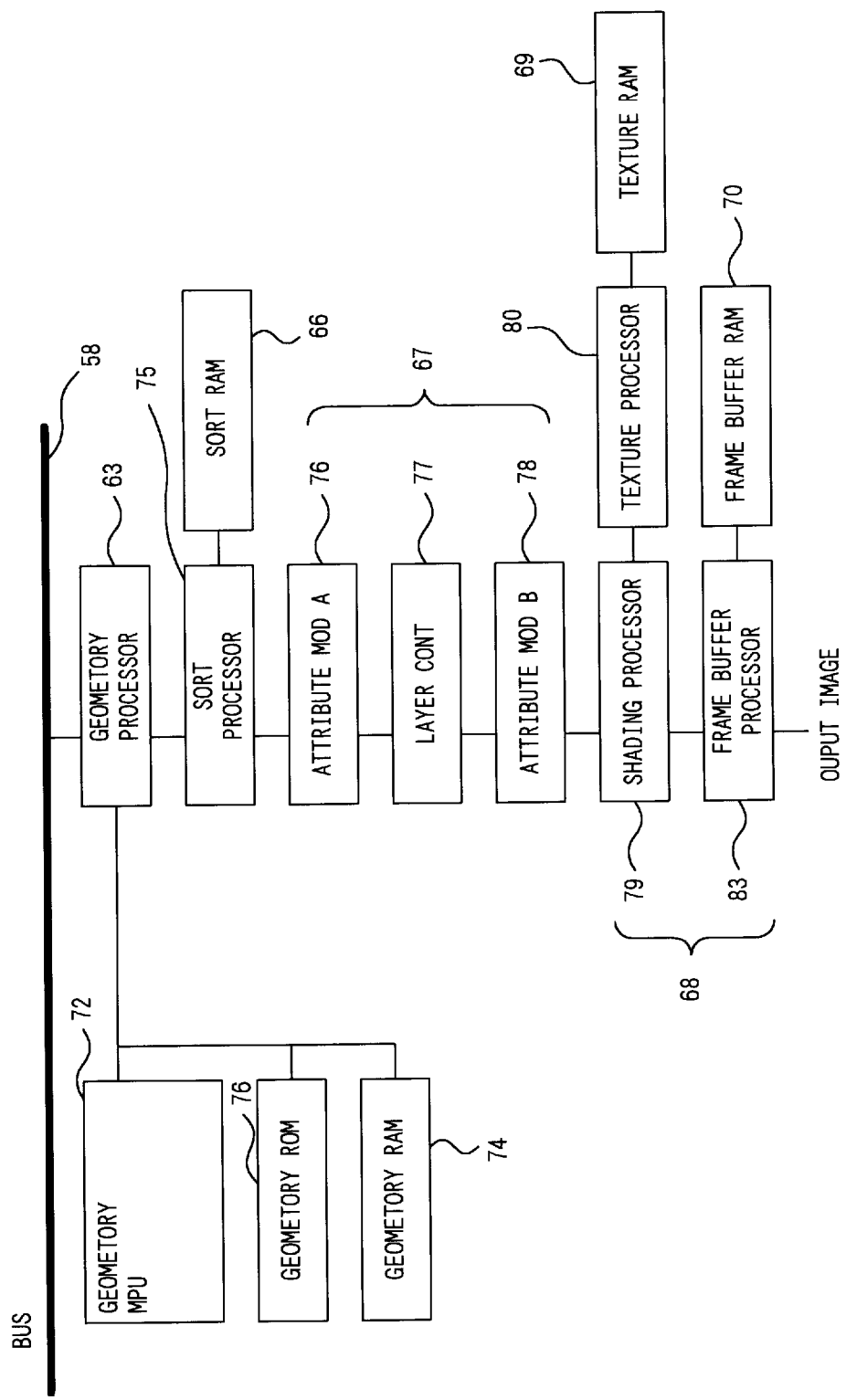
FIG. 22 is a block diagram of the image processing apparatus in FIG. 21.
Figure 23:
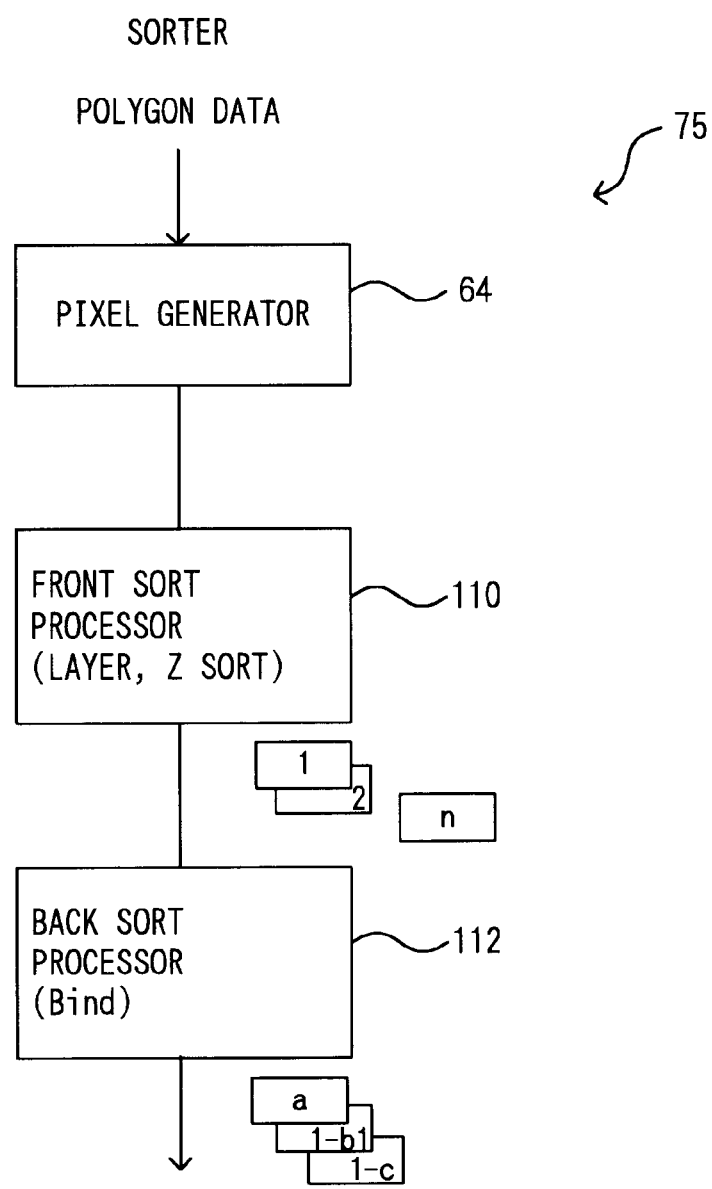
FIG. 23 is a block diagram of the sort processor in FIG. 22.
Figure 24:
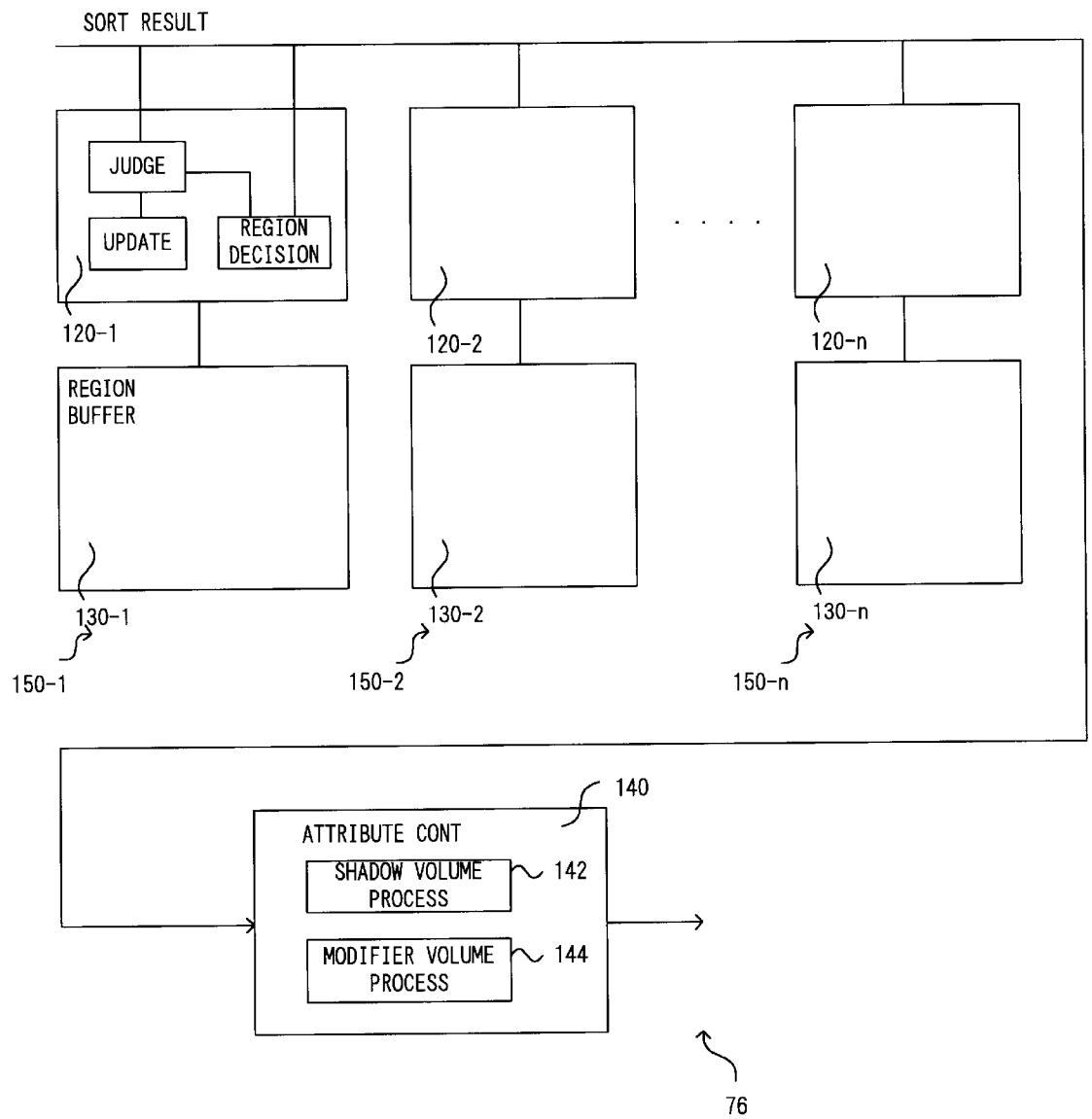
FIG. 24 is a block diagram of the attribute modulator A in FIG. 22.
Figure 25:
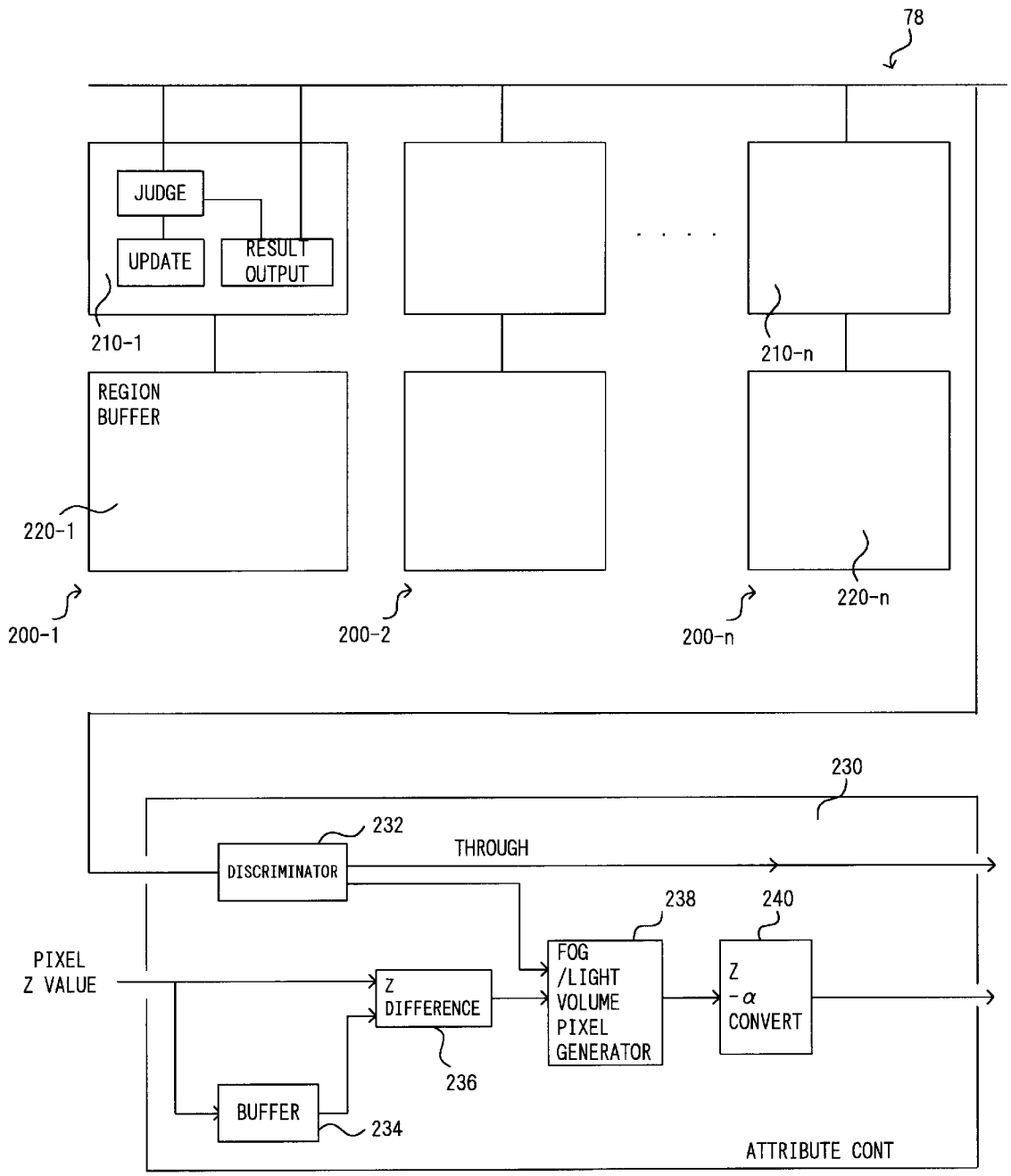
FIG. 25 is a block diagram of the attribute modulator B in FIG. 22.

FIG. 21 is a block diagram of a computer graphics apparatus that implements an image processing apparatus in another embodiment aspect of the present invention; FIG. 22 is a block diagram of that image processing apparatus; FIG. 23 is a block diagram of the sort processor in FIG. 22; FIG. 24 is a block diagram of the attribute alteration unit A in FIG. 22; and FIG. 25 is a block diagram of the attribute alteration unit B in FIG. 22.

The computer graphics apparatus diagrammed in FIG. 21 is configured by a game apparatus, for example. In FIG. 21, items which are the same as those diagrammed in FIG. 10 are indicated by the same symbols. A CPU 61 executes a game program stored beforehand in a work RAM 62, and generates delineation commands. A ROM 54 stores the startup program and other basic software for the CPU 61.

Delineation commands generated by the CPU 61 are stored in the work RAM 62 and read out therefrom, as appropriate. An expanded interface (I/F) 55 is an interface for connecting to an external memory unit or other expanded devices. A high volume memory unit 51 is configured by a ROM, CD, or DVD device, or the like, for storing application programs (game programs and the like). As necessary, texture data read out from an external data memory 51 (a hard disk or the like, for example) are temporarily stored in the work RAM 62.

A communications unit 56 is an interface for communicating with other equipment. An input/output unit 57 is an interface with control buttons, external memory, etc. An image processing apparatus 52 performs image processing on polygon data generated by the CPU 61 in accordance with control inputs and a game program, and outputs display data to a display monitor 53. These components are connected over a bus 58.

The image processing apparatus 52 is now described with reference to FIG. 22. As diagrammed in FIG. 22, a dedicated geometry MPU 72, dedicated geometry ROM 73, and dedicated geometry RAM 74 are connected to the geometry processor 63. The geometry MPU 72 is a processing unit that supplements the operations of the geometry processor 63. The geometry ROM 73 stores a startup program and other basic software for the geometry MPU 72. The geometry RAM 74 provides working memory for the geometry MPU 72 and geometry processor 63, and stores such data as delineation commands.

The geometry processor 63 converts delineation commands (polygon data in an object coordinate system) supplied thereto into data in a three-dimensional world coordinate system, and performs perspective conversion to convert the polygon data converted to the three-dimensional world coordinate system to a two-dimensional screen coordinate system. When this has been done, polygon data defined by the screen coordinate system generated by the geometry processor 63 is supplied to a sort processor 75. The sort processor 75, using a dedicated sort RAM 66, after converting those polygon data to pixel data, rearranges those data in the order of delineation. As will be described subsequently with reference to FIG. 23, sort processing performs processing based on a fragment Z buffer. The delineation commands sent to the geometry processor 63, polygon data output, and sort output from the sort processor 75 are described in detail with reference to FIG. 27 and following.

An attribute alteration unit A76 performs processing for decision volumes such as shadow volumes and modifier volumes. The Dijon volume processing determines whether a subject polygon is inside or outside of a shadow volume polygons or modifier volume polygons, and modulates subject polygon material. A layer controller 77 performs display hierarchy control.

An attribute alteration unit B78 performs processing on render volumes such as light volumes and fog volumes. As was described earlier, with the render volume processing, such attributes as volume polygon transparency and texture coordinates are modulated by the volume thickness (Z value differential).

A shading processor 79 performs such computations as illumination processing, and determines pixel color. A dedicated texture RAM 69 stores the texture data that are used in texture mapping. A texture processor 80 determines texture color data, according to instructions from the shading processor 79, using the texture RAM 69.

A frame buffer processor 83 consolidates the color data determined by the shading processor 79 into separate frames, subjects those data to treatment (blending), and outputs images for one frame. A dedicated frame buffer RAM 70 provides working memory for the frame buffer processor 83 and stores frame data.

Figure 28:
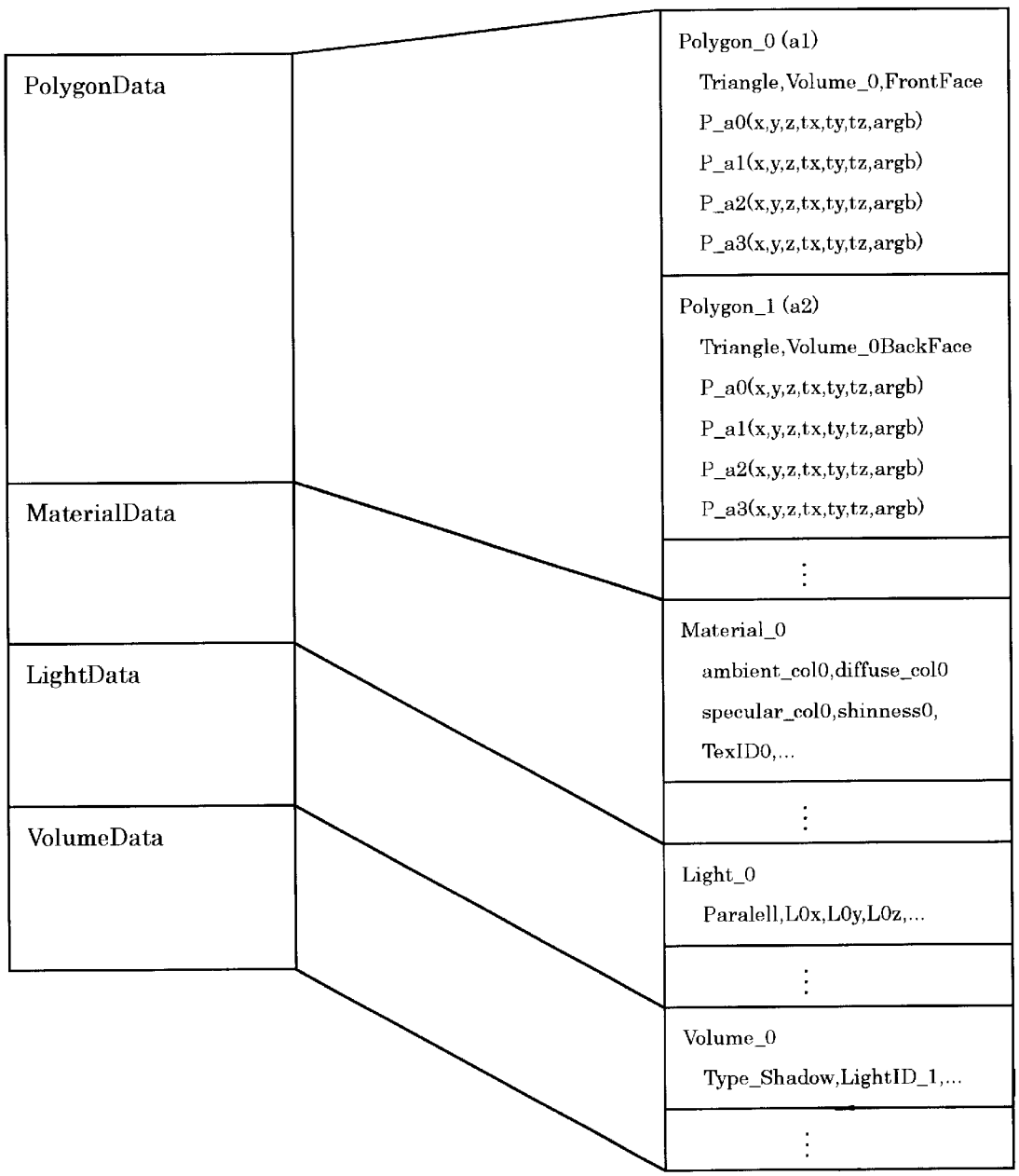
FIG. 28 is an explanatory diagram for polygon data obtained from the delineation commands in FIG. 27.

The sort processor 75 in FIG. 23 is described next. The sort processor 75 comprises pixel data generator 64, sort preprocessor 110, and sort postprocessor 112. The pixel data generator 64 converts the polygon data sent from the geometry block 63 to pixel data by either fractal processing or raster scan processing. Polygon data defined in a view point coordinate system generated by the geometry processor 63 comprise volume IDs and apex data (apex coordinates, texture coordinates, and apex colors), as will be described in detail in conjunction with FIG. 28. Each volume, moreover, is defined by material data, light data, and volume type. The apex data are configured by screen coordinates (x, y) that indicate positions on the display screen, Z values that indicate depths in the display screen, R (red), G (green), and B (blue) color information and transparency indicating α values, texture coordinates (Tx, Ty, Tz) that indicate texture data coordinates, and LOD offset values, etc.

The pixel data generated by the pixel data generator 64 are configured by polygon IDs and polygon attributes (i.e. the volume type mentioned earlier), screen coordinates (Sx, Sy), Z values, color information (R, G, B, α values), texture coordinates (Tx, Ty, Tz), and LOD offset values. These pixel data are generally calculated by subjecting the apex data to linear interpolation computations.

The sort preprocessor 110 sorts the pixel data sent from the pixel data generator 64, according to Z value, and executes fragment Z buffer processing that extracts the polygon ID closest to the front for each pixel, in each layer 1 to n as viewed from the direction of the view point, as will be described in detail in conjunction with FIGS. 29 to 30. The sort postprocessor 112 performs binding on each layer, for each polygon ID, as will be described in detail in conjunction with FIGS. 31 to 35.

The attribute alteration unit A76 is described next with reference to FIG. 24. The attribute alteration unit A76 comprises a plurality of region determining units 150-1 to 150-n, and an attribute controller 140. The region determining units 150-1 to 150-n all have the same configuration, and simultaneously determine a plurality of volumes (regions). The region determining units 150-1 to 150-n comprise region buffer controllers 120-1 to 120-n and region buffers 130-1 to 130-n.

The region buffers 130-1 to 130-n store information (flags) as to whether something is inside or outside a volume (region). The region buffer controllers 120-1 to 120-n determine whether bound layer data input are a volume polygon (shadow volume, modifier volume) or an ordinary polygon. When a volume polygon (shadow volume, modifier volume) has been input, the region buffer controllers 120-1 to 120-n update the region buffers, and when an ordinary polygon has been input, they output region determination results according to the content of the region buffers.

The method adopted for updating the region buffers may be a method wherewith in and out are inverted, in pixel units, every time a volume polygon is input, or a method wherewith in/out information is stored in memory, in pixel units, based on the results of volume polygon front/back determinations, or a method wherewith in/out information is stored in memory by up/downing region buffer values, in pixel units, based on the results of volume polygon front/back determinations, and region overlaps are counted.

The attribute controller 140 has a shadow volume processor 142 and a modifier volume processor 144. The shadow volume processor 142 divides polygons based on region determination results, and invalidates polygon light data inside a volume. The modifier volume processor 144 divides polygons based on region determination results, and alters material data for polygons inside a volume, according to the alteration method linked to that volume. The alteration methods performed are logical sum (or), logical product (and), and exclusive logical sum (xor), using designated values.

The attribute alteration unit B78 is next described with reference to FIG. 25. The attribute alteration unit B78 comprises a plurality of region determining units 200-1 to 200-n and an attribute controller 230. The region determining units 200-1 to 200-n all have the same configuration, and simultaneously determine a plurality of volumes (regions). The region determining units 200-1 to 200-n comprise region buffer controllers 210-1 to 210-n and region buffers 220-1 to 220-n.

The region buffers 220-1 to 220-n store information on whether something is inside or outside a volume (region), pixel by pixel. The region buffer controllers 210-1 to 210-n determine whether bound layer data input are a volume polygon or ordinary polygon. When a volume polygon has been input, the region buffer controllers 210-1 to 210-n update the region buffers, and output the region determination results according to the content of the region buffers, and when an ordinary polygon has been input, perform a through output.

The method adopted for updating the region buffers may be a method wherewith in and out are inverted, in pixel units, every time a volume polygon is input, or a method wherewith in/out information is stored in memory, in pixel units, based on the results of volume polygon front/back determinations, or a method wherewith in/out information is stored in memory by up/downing region buffer values, in pixel units, based on the results of volume polygon front/back determinations, and region overlaps are counted.

The attribute controller 230, in the case of light volume processing, generates pixels corresponding to the inside of the volume, based on the region determination results, adds a blend ratio (α value) found from the depth difference (Z value differential) to the pixels generated, outputs those data so generated, and also outputs pixels for ordinary polygons. The same processing is performed in the case of a fog volume. The difference between the two involves the blending mode; where for a light volume we have Src=α and Dst=1 in open GL, and for a fog volume we have Src=α and Dst=1−α in open GL.

The attribute controller 230 has a results determining unit 232, Z value buffer 234, Z value differential detection unit 236, fog/light volume pixel generator 238, and alpha value conversion table 240. The results determining unit 232 distinguishes between through outputs and region determination results. The Z value buffer 234 stores pixel Z values for each layer prior to the receipt of the region determination results for each such layer. The Z value differential detection unit 236 computes Z value differentials between the layers. The fog/light volume pixel generator 238 generates fog/light volume pixels from the region determination results and Z value differentials. And the alpha value conversion table 240 converts flog/light volume pixel Z value differentials to a values (transparency levels).

The reason for dividing the attribute alteration unit into two units is that the volume of data handled in processing shadow volumes and the like is small, involving only shadow in/out information, wherefore that processing can be done at high speed by implementing parallel processing, whereas with light/fog volumes, attributes are modulated with the volume thickness, and the data handled include depth differences (Z values) and depth differentials (Z differentials), wherefore the number of bits is large, and the size of the circuitry required is also large. The attribute alteration unit may, of course, be configured as a single unit.

Also, because a plurality of region determining units is provided, multiple volume polygon groups can be processed in parallel, making complex representations such as volumes overlapping possible. In addition, the processing for finding blending ratios (α values) from depth differentials makes determinations in which a numerical value conversion table is used and interpolations are made based on depth differentials, thereby making complex attribute variations possible.

Furthermore, with the attribute alteration unit B78, texture coordinates can be modulated or generated based on depth differentials, and texture mapping can be performed. In a light or fog volume, for example, by modulating or generating texture coordinates based on the depth differential, noise levels can be varied according to the volume thickness, and complex noises can be added using procedure textures.

The modulation method used, as with lens volumes, may be an altering method, or a method that takes values obtained from depth differentials using a conversion table and interpolation and adds those to texture coordinates, etc. The method used for generating the texture coordinates may be a method such as one that takes texture coordinates as the three axes (X, Y, Z), and, for the added Z axis, takes values obtained from the depth differentials using a conversion table and interpolation and sets those in the texture coordinates.

Decision on Volume Processing

Figure 26A:
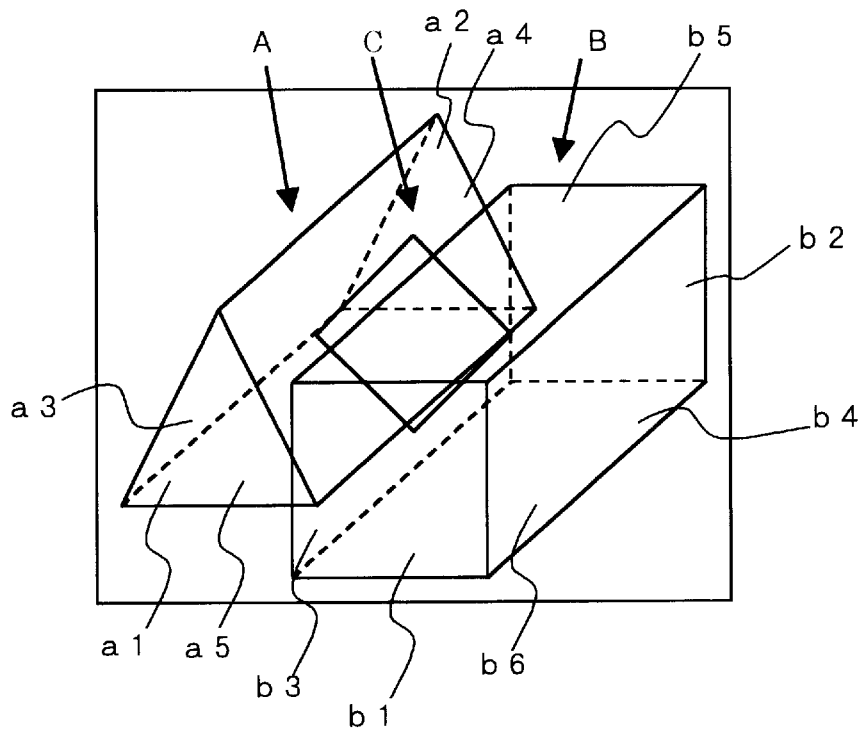
FIGS. 26A to 26C are explanatory diagrams of 3D space for describing the image processing diagrammed in FIG. 22.
Figure 26B:
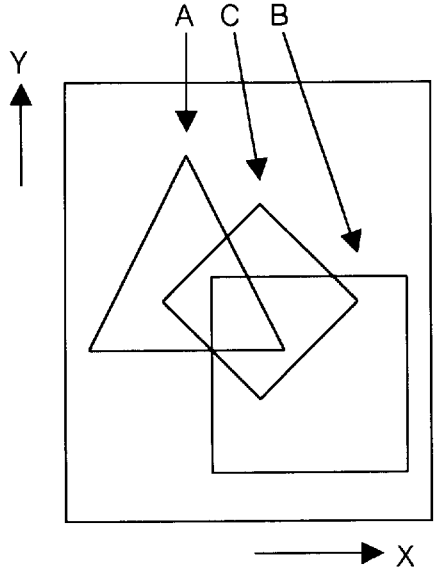
Figure 26C:
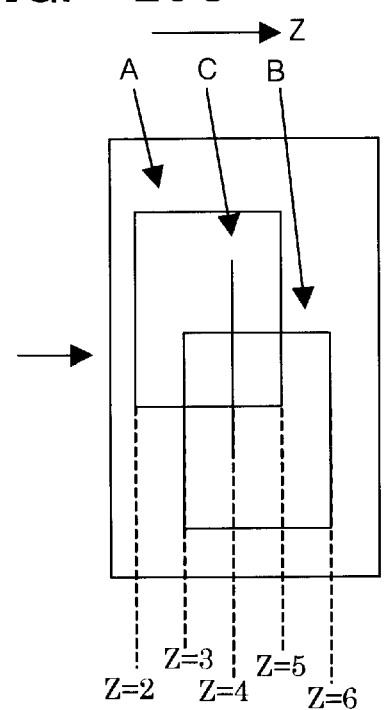

Models are now used in describing decision volume processing. FIG. 26 is a set of diagrams representing examples of figures displayed in 3D space. In FIG. 26A is given a configuration diagram in 3D space of figures that are to be displayed in 3D space. A front elevation therefor is given in FIG. 26B and a side elevation therefor is given in FIG. 26C.

As diagrammed in FIG. 26A, a triangular column a, square column b, and diamond-shaped plane c are combined in 3D space. The triangular column a and square column b are defined by polygons, respectively. The triangular column a is defined by five polygons, namely by a front surface a1, back surface a2, left side surface a3, right side surface a4, and bottom surface a5. The square column b is defined by six polygons, namely by a front surface b1, back surface b2, left side surface b3, right side surface b4, upper surface b5, and bottom surface b6.

As diagrammed in FIG. 26C, the Z values (depth values) for these surfaces are made Z=2 for the a1 surface, Z=3 for the b1 surface, Z=4 for a c surface, Z=5 for the a2 surface, and Z=6 for the b2 surface. To simplify description, moreover, as diagrammed in FIG. 26B, each side surface is oriented in the direction of the line of sight so that the side surfaces cannot be seen.

Using these figures as an example, a shadow volume and modifier volume are now described. In FIG. 26A, the triangular column a is described as an example of a shadow volume, and the square column b as an example of a modifier volume. FIG. 27 is a configuration diagram of delineation commands that are issued by the CPU 61 to the image processing apparatus 52.

First, the attributes for the delineation volumes 0 and 1 are defined. As attributes for the volumes 0 and 1, a volume ID, volume type (shadow or modifier), light ID (shadow volume), and modifier data (modifier volume) are defined.

Next, the attributes of light sources 0 and 1 for the volumes 0 and 1 are defined. For the attributes of the light sources, a light ID, light beam direction (parallel, for example), and light source coordinates (Lx, Ly, Lz) are defined. Attributes for the materials of the delineation subject polygons 0 and 1 are also defined. Next, for the material attributes of the volumes 0 and 1, a material ID, ambitious color, diffusion color, specular color, shineness color, and texture ID are defined.

Next, a coordinate conversion matrix for the object a (here the triangular column a) is determined. Following thereupon, definitions are given for the polygons a1 to a5 configuring the object a. For defining each polygon, a polygon shape, volume ID, side surface, delineation direction, and apex data are defined. Apex data P__nm are configured by apex coordinates (X, Y, Z), texture coordinates (Tx, Ty, Tz), and apex color (α. R, G, B).

Next, a coordinate conversion matrix for the object b (here the square column b) is established. Following thereupon, definitions are given for the polygons b1 to b6 configuring the object b. For defining each polygon, the polygon shape, volume ID, side surface, delineation direction and apex data are defined. Apex data P__nm are configured by apex coordinates (X, Y, Z), texture coordinates (Tx, Ty, Tz), and apex color (α. R, G, B).

Next, commands for the object c (diamond shaped plane c) are defined. That is, the attributes of light sources 0 and 1 for the object c are defined by a light ID 0 and a light ID 1, and, as a material attribute, material ID 0 is defined. A coordinate conversion matrix for the object c is also established. Following thereupon, a definition for the polygon c configuring the object c is given. For defining the polygon, the polygon shape, polygon type (opaque), side surface, delineation direction, and apex data are defined. Apex data P_nm are configured by apex coordinates (X, Y, Z), texture coordinates (Tx, Ty, Tz), and apex color (α. R, G, B).

Such delineation commands as these are sent by the CPU to the geometry processor 63. The geometry processor 63, with an analysis start instruction from the CPU, interprets these commands, executes them (effecting coordinate conversions, attribute determinations, and front/back determinations), and stores the resulting polygon data in the dedicated sort RAM 66. As diagrammed in FIG. 28, polygon data, material data, light source data, and volume data are classified and stored in the sort RAM 66. The polygon data comprise polygon shapes, volume IDs, and apex data. Apex data P_nm are configured by apex coordinates (X, Y, Z), texture coordinates (Tx, Ty, Tz), and apex color (α. R, G, B).

The material data are configured by ambitious colors, diffusion colors, spectral colors, shineness colors, and texture IDs for each material ID. The light data comprise light beam directions and light source vectors for each light ID. And the volume data comprise a volume type and light ID for each volume ID.

Next, with a delineation start instruction from the CPU, the sort processor 75 generates pixel data from the polygon data in the sort RAM 66, and outputs those data in order from the front, pixel by pixel. The sort preprocessor (Z buffer) 110 outputs the polygon ID positioned foremost for each pixel, layer by layer. This is now described with reference to FIGS. 29A to 32B.

Figure 31A:
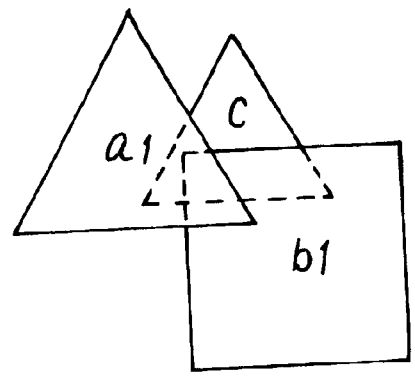
FIGS. 31A to 31C are third explanatory diagrams for describing preprocessing operations of the sort processor in FIG. 23.
Figure 31B:
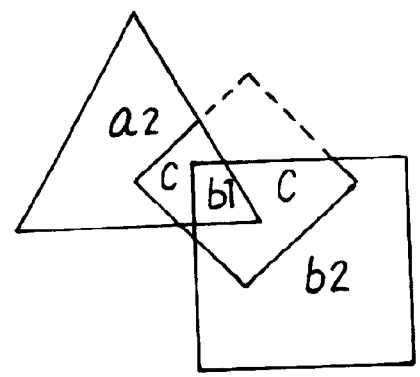
Figure 31C:
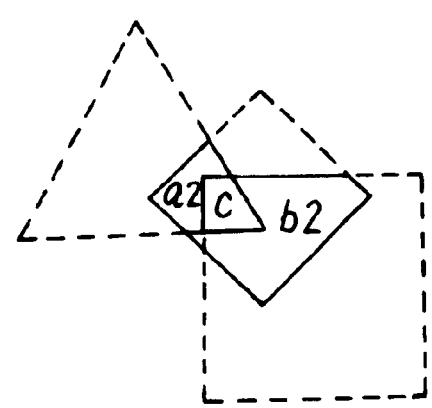
Figure 32A:
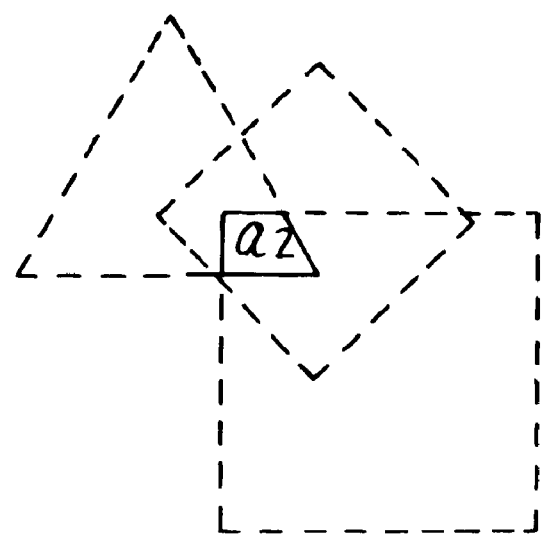
FIGS. 32A and 32B are fourth explanatory diagrams for describing preprocessing operations of the sort processor in FIG. 23.
Figure 32B:
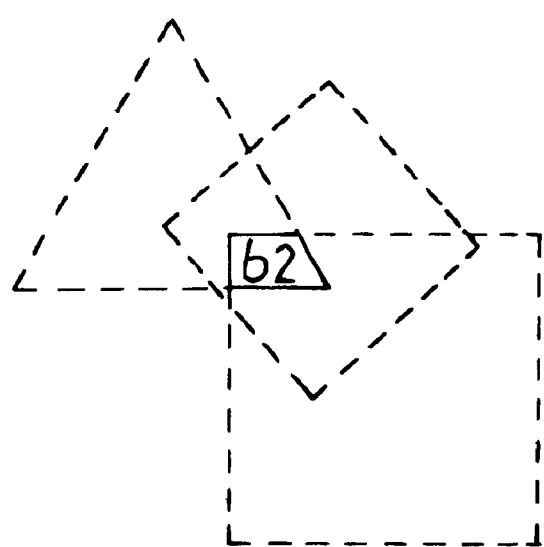

The first layer in FIG. 29A is a screen projection plane as seen from the direction of the view point as indicated by an arrow in FIG. 26C; appearing as diagrammed in FIG. 31A, and constituting first layer projection data in FIG. 29A. The second layer in FIG. 29B is a screen projection plane resulting when the first layer is peeled off; appearing as diagrammed in FIG. 31B, and constituting second layer projection data in FIG. 29B. The third layer in FIG. 30A is a screen projection plane resulting when the second layer is peeled off; appearing as diagrammed in FIG. 31C, and constituting third layer projection data in FIG. 30A. The fourth layer in FIG. 30B is a screen projection plane resulting when the third layer is peeled off; appearing as diagrammed in FIG. 32A, and constituting fourth layer projection data in FIG. 30B. The fifth layer in FIG. 30C is a screen projection layer resulting when the fourth layer is peeled off; appearing as diagrammed in FIG. 32B, and constituting fifth layer projection data in FIG. 30C. A Z value is held for each of the pixels.

The sort preprocessor 112 organizes the output from the preprocessor 110 for each polygon ID and outputs those data in a divided manner, as diagrammed in FIGS. 33 to 36. More specifically, the first layer data in FIG. 29A are organized in the first layer—a1, first layer—b1, and first layer—c, for each polygon, as diagrammed in FIG. 33. The second layer data in FIG. 29B are organized in the second layer—a2, second layer—c, second layer b1, and second layer—b2, for each polygon, as diagrammed in FIG. 34 and FIG. 35. The third layer data in FIG. 30A are organized in the third layer—a2, third layer—c, and third layer—b2, for each polygon, as diagrammed in FIG. 35 and FIG. 36. The fourth and fifth layer data in FIG. 30B and FIG. 30C are organized in the fourth layer—a2 and fifth layer—b2, for each polygon, as diagrammed in FIG. 36. By binding polygon by polygon in this manner, region determination is made simple.

Next, the operations of the attribute alteration unit A76 are described with reference to FIG. 37A to FIG.45. The operations of the region determining units 150-1 to 150-n are first described with reference to FIGS. 37A to 41. As diagrammed in FIG. 37A, the first layer—a1 (volume ID_0; front surface) is received and the region buffer 130-1 in the region determining unit A1 is updated. As diagrammed in FIG. 37B, the first layer—b1 (volume ID_1; front surface) is received and the region buffer 130-2 in the region determining unit A2 is updated.

As diagrammed in FIG. 37C, when the first layer—c (opaque) is received, the logical product of the pixel data (region data) in the region buffers 130-1 and 130-2 is taken and the region determination results are output. In this case, the 3 pixels in the first layer—c do not belong to any region, wherefore "no region found" is output.

Next, as diagrammed in FIG. 38A, the second layer—a2 (volume ID_0; back surface) is received, and the region buffer 130-1 in the region determining unit A1 is updated. As diagrammed in FIG. 38B, when the second layer—c (opaque) is received, the logical product of the pixel data (region data) in the region buffers 130-1 and 130-2 is taken, and the region determination results are output. In this case, the region determination results are that the region is inside volume ID_0 and inside volume ID_1.

Next, as diagrammed in FIG. 39A, the second layer—b1 (volume ID_1; front surface) is received, and the region buffer 130-2 in the region determining unit A2 is updated. As diagrammed in FIG. 39B, the second layer—b2 (volume ID_1; back surface) is received, and the region buffer 130-2 in the region determining unit A2 is updated.

Next, as diagrammed in FIG. 39C, the third layer—a2 (volume ID_0; back surface) is received, and the region buffer 130-1 in the region determining unit A1 is updated. As diagrammed in FIG. 40A, when the third layer—c (opaque) is received, the logical product of the pixel data (region data) in the region buffers 130-1 and 130-2 is taken, and the region determination results are output. In this case, the region determination results are that the region is inside volume ID_0 and inside volume ID_1.

Next, as diagrammed in FIG. 40B, the third layer—b2 (volume ID_1; back surface) is received, and the region buffer 130-2 in the region determining unit A2 is updated. As diagrammed in FIG. 40C, the fourth layer—a2 (volume ID_0; back surface) is received, and the region buffer 130-1 in the region determining unit A1 is updated. As diagrammed in FIG. 41, the fifth layer—b2 (volume ID_1; back surface) is received, and the region buffer 130-2 in the region determining unit A2 is updated.

Next, the operations of the attribute controller 140 are described with reference to FIGS. 42A to 44. As diagrammed in FIG. 42A, the region determination results for the first layer—c (opaque) in FIG. 37C are received. Since there is no such region, the polygon c is output without updating the attributes.

As diagrammed in FIG. 42B, the region determination results for the second layer—c (opaque) in FIG. 38B are received. Because this region is inside volume ID_0, the light ID_1 for the relevant pixel(s) is invalidated, based on the volume data type shadow, and output is effected.

As diagrammed in FIG. 42C, the region determination results for the second layer—c (opaque) in FIG. 38B are received. Because this region is inside volume ID_1, based on the volume data type modifier, the material ID_0 designated for the polygon is XORed with the modifier data, and output is effected as a new material ID_1.

Figures 43, 44:
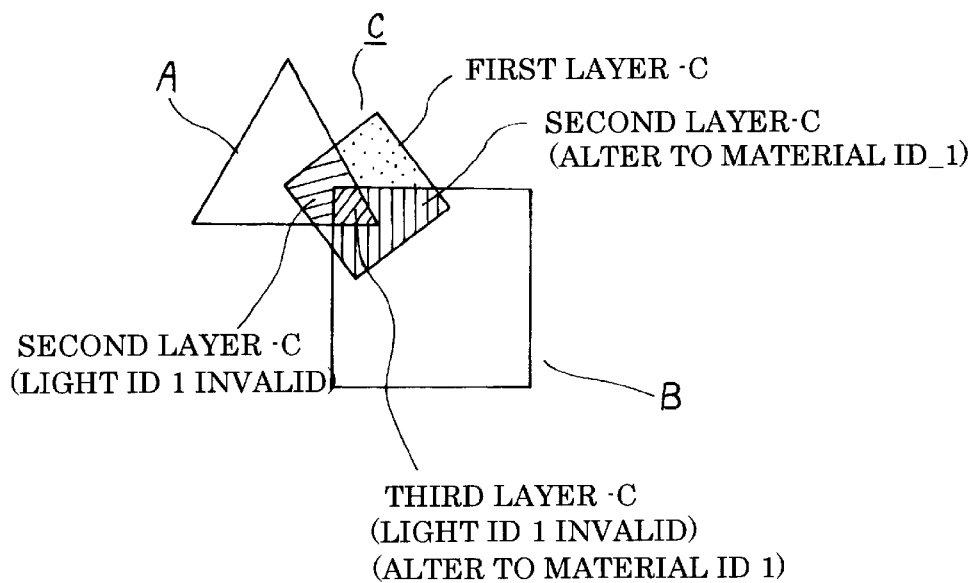
FIG. 43 is a second explanatory diagram for describing modulation processing operations of the attribute modulator in FIG. 24.
FIG. 44 is a third explanatory diagram for describing modulation processing operations of the attribute modulator in FIG. 24.

As diagrammed in FIG. 43, the region determination results for the third layer—c (opaque) in FIG. 40A are received. Because the region is inside volume ID_0, based on the volume data type shadow, the light ID_1 for the relevant pixel(s) is invalidated, and, because the region is inside volume ID_1, based on the volume data type modifier, the material ID_0 designated for the polygon is XORed with the modifier data, and output is effected as a new at ID_1.

FIG. 44 diagrams the relationship between the attribute modulation results for each layer in the polygon C and the volume polygons A and B. FIG. 45 represents the pixel delineation results based thereon. The pixel data for the polygon c described earlier pass through a layer controller 77 and attribute modulator 78, and a pixel delineation such as diagrammed in FIG. 45 is made by the shading processor 79, texture processor 80, and frame processor 83. In the diagram, c represents that polygon c is not modulated, c' is the polygon c for which the light ID has been invalidated, C is the polygon c for which the material ID has been altered, and C' is the polygon c for which the light ID has been invalidated and the material ID has been altered.

Render Volume Processing

Render volume processing is described next, using the example figure representation in 3D space diagrammed in FIG. 26. In FIG. 26A, the triangular column 'a' is described as an example of a fog volume, and the square column 'b' is described as an example of a light volume. FIG. 46 is a configuration diagram of delineation commands issued by the CPU 61 to the image processing apparatus 52.

First, the attributes of the delineation volumes 0 and 1 are defined. For defining each of the volumes 0 and 1, a volume ID, volume type (fog or light), volume color, and density are defined.

Next, the attributes of light sources 0 and 1 for the volumes 0 and 1 are defined. The attributes defined for the light sources 0 and 1 are light ID, light beam direction (parallel, for example), and light source vector coordinates (Lx, Ly, Lz). The attributes of material 0 for the delineation volume 0 are defined. The material attributes of the volume 0 that are defined are material ID, ambitious color, diffusion color, specular color, shineness color, and texture ID.

Next, a coordinate conversion matrix is established for the object 'a' (here the triangular column 'a'). Following thereupon, definitions for the polygons a1 to a5 configuring the object 'a' are given. For defining each polygon, polygon shape, volume ID, side surface, delineation direction, and apex data are defined. Apex data P_nm are configured by apex coordinates (X, Y, Z), texture coordinates (Tx, Ty, Tz), and apex color (α. R, G, B).

Next, a coordinate conversion matrix is established for the object 'b' (here the square column 'b'). Following thereupon, definitions for the polygons b1 to b6 configuring the object 'b' are given. For defining each polygon, polygon shape, volume ID, side surface, delineation direction, and apex data are defined. Apex data P_nm are configured by apex coordinates (X, Y, Z), texture coordinates (Tx, Ty, Tz), and apex color (α. R, G, B).

Next, commands are defined for the object 'c' (here the diamond shaped plane 'c'). Specifically, the attributes of the light sources 0 and 1 for the object 'c' are defined with a light ID 0 and light ID 1, and a material ID 0 is defined as the material attribute. A coordinate conversion matrix is also established for the object 'c'. Following thereupon, a definition is given for the polygon 'c' configuring the object 'c'. For defining the polygon, polygon shape, polygon type (opaque), side surface, delineation direction, and apex data are defined. Apex data P_nm are configured by apex coordinates (X, Y, Z), texture coordinates (Tx, Ty, Tz), and apex color (α. R, G, B).

Figure 47:
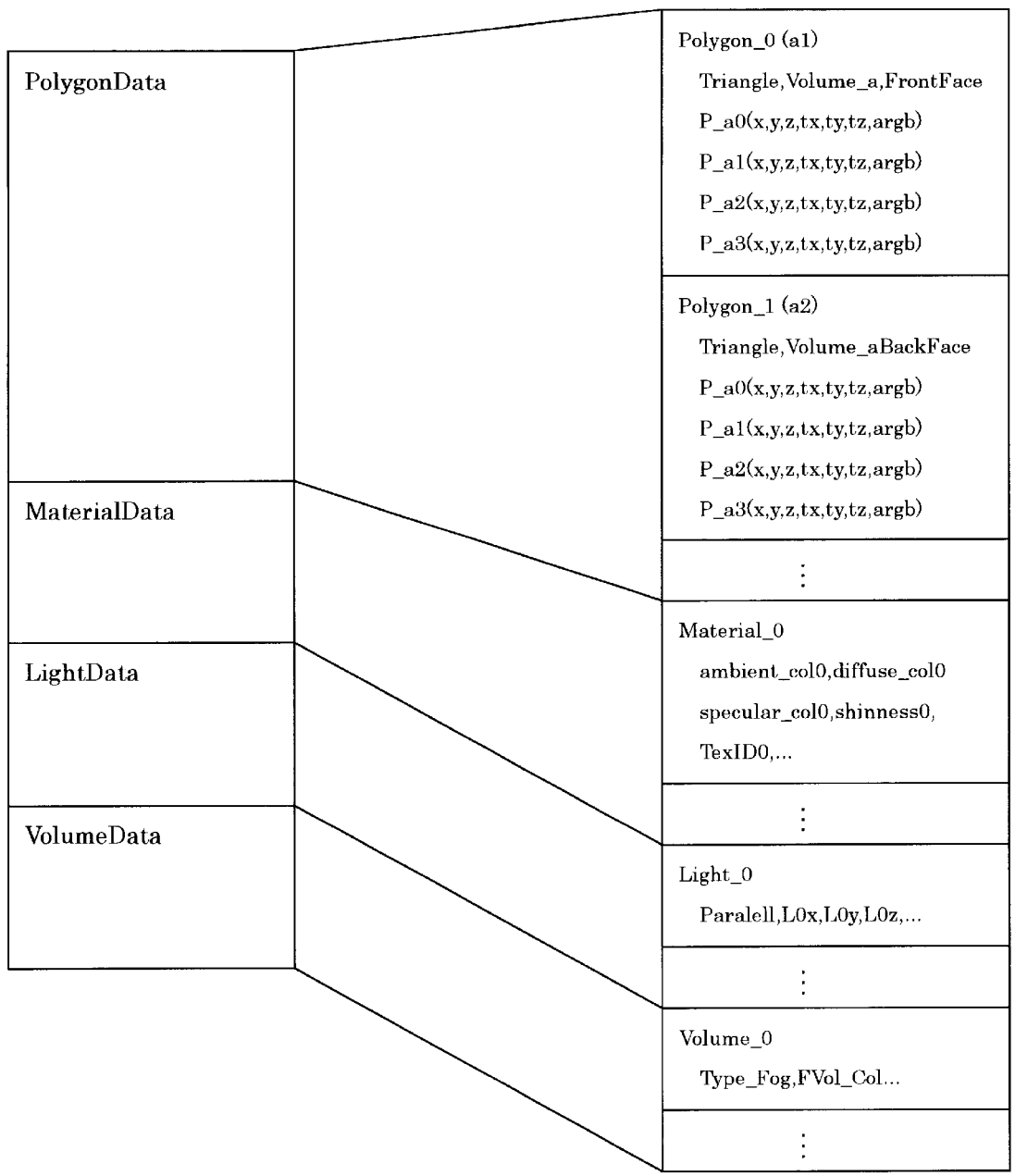
FIG. 47 is an explanatory diagram for polygon data obtained from the delineation commands of FIG. 46.
Figure 60:
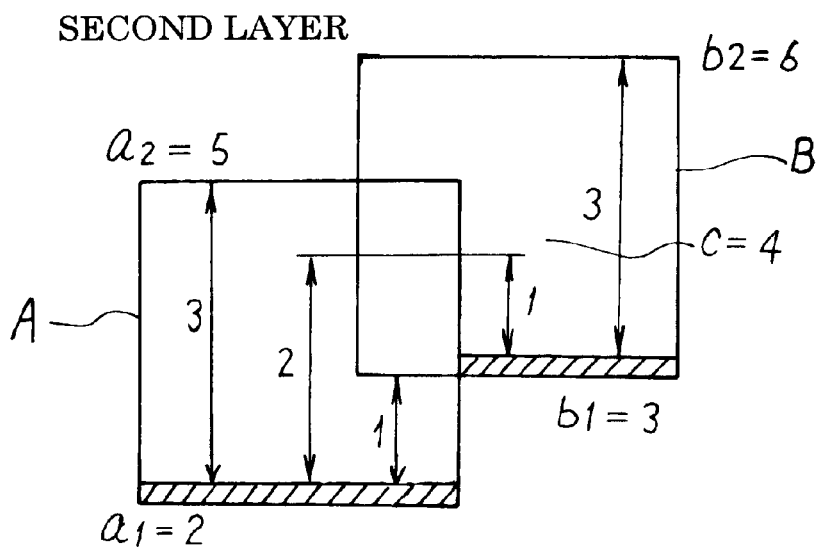
FIG. 60 is a first operation explanatory diagram for describing the processing operations of the attribute modulator in FIG. 25.
Figure 61:
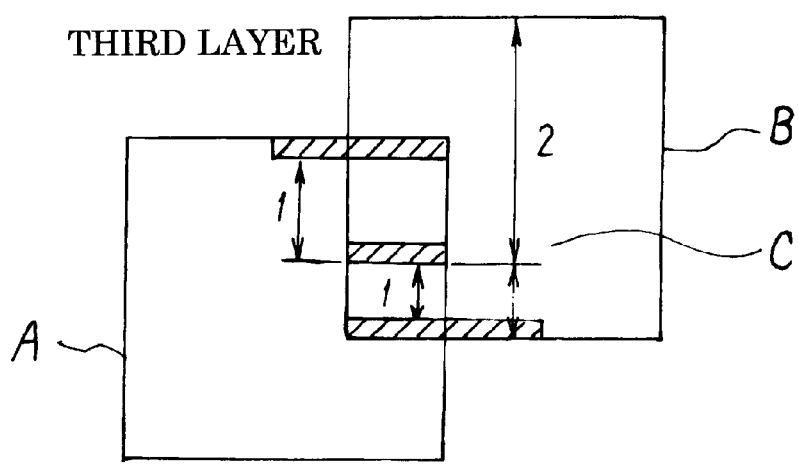
FIG. 61 is a second operation explanatory diagram for describing the processing operations of the attribute modulator in FIG. 25.
Figure 62:
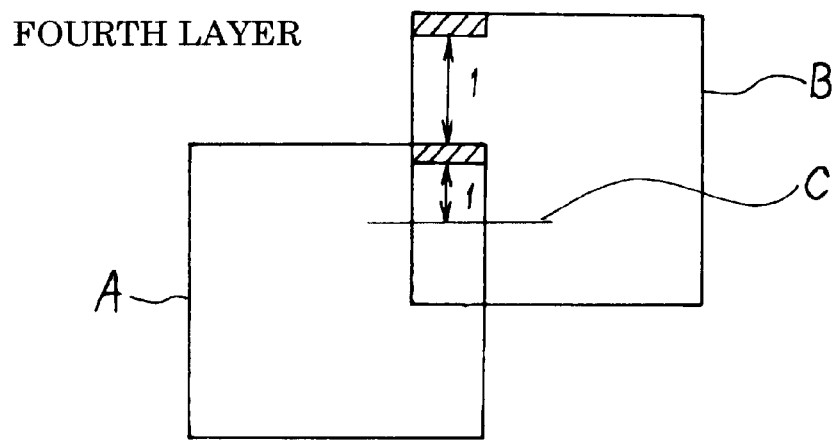
FIG. 62 is a third operation explanatory diagram for describing the processing operations of the attribute modulator in FIG. 25.
Figure 63:
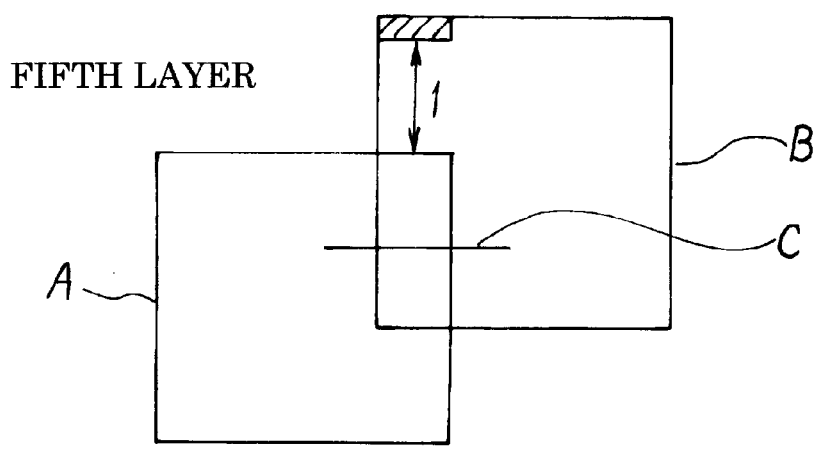
FIG. 63 is a fourth operation explanatory diagram for describing the processing operations of the attribute modulator in FIG. 25.

Delineation commands such as these are sent from the CPU to the geometry processor 63. The geometry processor 63, with an analysis start instruction from the CPU, interprets these commands, executes them (effecting coordinate conversions, attribute determinations, and front/back determinations), and stores the resulting polygon data in the dedicated sort RAM 66. As diagrammed in FIG. 47, polygon data, material data, light source data, and volume data are classified and stored in the sort RAM 66. The polygon data comprise polygon shapes, volume IDs, and apex data. Apex data P_nm are configured by apex coordinates (X, Y, Z), texture coordinates (Tx, Ty, Tz), and apex color (α. R, G, B).

The material data are configured by ambitious colors, diffusion colors, spectral colors, shineness colors, and texture IDs for each material ID. The light data comprise light beam directions and light source vectors for each light ID. And the volume data comprise a volume type and volume color for each volume ID.

Next, with a delineation start instruction from the CPU, the sort processor 75 generates pixel data from the polygon data in the sort RAM 66, and outputs those data in order from the front, pixel by pixel. The sort preprocessor (Z buffer) 110, executing the same processing as described earlier in conjunction with FIGS. 29 to 32, outputs the polygon ID positioned foremost for each pixel, layer by layer. The sort postprocessor 112, as described earlier with reference to FIGS. 33 to 36, organizes the output from the preprocessor 110 for each polygon ID and outputs in a divided fashion.

Next, the operations of the attribute alteration unit B78 are described with reference to FIGS. 48A to 63. First, the operations of the region determining units 200-1 to 200-n are described with reference to FIGS. 48A to 54. As diagrammed in FIG. 48A, the first layer—a1 (volume ID_0; front surface) is received, and the region buffer 220-1 in the region determining unit B1 is updated. As diagrammed in FIG. 48B, the first layer—b1 (volume ID_1; front surface) is received, and the region buffer 220-2 in the region determining unit B2 is updated.

As diagrammed in FIG. 49A, the first layer—c (opaque) is received, and through output is effected. As diagrammed in FIG. 49B, the content of the region buffers 220-1 and 220-2 are output as region determination results prior to the receipt of the second layer pixel data.

Next, as diagrammed in FIG. 50A, the second layer—a2 (volume ID_0; back surface) is received, and the region buffer 220-1 in the region determining unit B1 is updated. As diagrammed in FIG. 50B, when the second layer—c (opaque) is received, through output is effected.

Next, as diagrammed in FIG. 50C, the second layer b1 (volume ID_1; front surface) is received, and the region buffer 220-2 in the region determining unit B2 is updated. As diagrammed in FIG. 51A, the second layer—b2 (volume ID_1; back surface) is received, and the region buffer 220-2 in the region determining unit B2 is updated. As diagrammed in FIG. 51B, the content of the region buffers 220-1 and 220-2 are output as region determination results prior to the receipt of the third layer pixel data.

Next, as diagrammed in FIG. 52C, the third layer—a2 (volume ID_0; back surface) is received, and the region buffer 220-1 in the region determining unit B1 is updated. As diagrammed in FIG. 52B, when the third layer—c (opaque) is received, through output is effected.

Next, as diagrammed in FIG. 52C, the third layer—b2 (volume ID_1; back surface) is received, and the region buffer 220-2 in the region determining unit B2 is updated. As diagrammed in FIG. 53A, the content of the region buffers 220-1 and 220-2 are output as region determination results prior to the receipt of the fourth layer pixel data.

As diagrammed in FIG. 53B, the fourth layer—a2 (volume ID_0; back surface) is received, and the region buffer 220-1 in the region determining unit B1 is updated. As diagrammed in FIG. 54A, the content of the region buffer 220-2 are output as region determination results prior to the receipt of the fifth layer pixel data. The region buffer 220-1 does not hold any valid data, and therefore does not output. As diagrammed in FIG. 54B, the fifth layer—b2 (volume ID_1; back surface) is received, and the region buffer 220-2 in the region determining unit B2 is updated.

Next, the operations of the attribute controller 230 are described with reference to FIGS. 55A to 63. As diagrammed in FIG. 55A, the pixel Z value for the first layer is received prior to receiving the first layer. The Z value differential is invalid because there is no surface in front. As diagrammed in FIG. 55B, the first layer—c (opaque) in FIG. 49A is received, and through output is effected. As diagrammed in FIG. 55C, prior to receiving the second layer, the pixel Z value for the second layer is received, and the Z value differential with the pixel Z value for the first layer is computed.

As diagrammed in FIG. 56A, fog volume pixels are output from the Z value differential and the determination results from the region buffer B1 (220-1) for the second layer. Similarly, as diagrammed in FIG. 56B, light volume pixels are output from the Z value differential and the determination results from the region buffer B2 (220-2) for the second layer.

As diagrammed in FIG. 56C, the second layer—c (opaque) in FIG. 50B is received and through output is effected. As diagrammed in FIG. 57A, prior to the receipt of the third layer, the pixel Z value for the third layer is received, and the Z value differential with the pixel Z value for the second layer is computed. As diagrammed in FIG. 57B, fog volume pixels are output from the Z value differential and the determination results from the region buffer B1 (220-1) for the third layer. Similarly, as diagrammed in FIG. 57C, light volume pixels are output from the Z value differential and the determination results from the region buffer B2 (220-2) for the third layer.

As diagrammed in FIG. 58A, the third layer—c (opaque) in FIG. 52B is received and through output is effected. As diagrammed in FIG. 58B, prior to the receipt of the fourth layer, the pixel Z value for the fourth layer is received, and the Z value differential with the pixel Z value for the third layer is computed. As diagrammed in FIG. 58C, fog volume pixels are output from the Z value differential and the determination results from the region buffer B1 (220-1) for the fourth layer. Similarly, as diagrammed in FIG. 59A, light volume pixels are output from the Z value differential and the determination results from the region buffer B2 (220-2) for the fourth layer.

As diagrammed in FIG. 59B, prior to the receipt of the fifth layer, the pixel Z value for the fifth layer is received, and the Z value differential with the pixel Z value for the fourth layer is computed. As diagrammed in FIG. 59C, light volume pixels are output from the Z value differential and the determination results from the region buffer B2 (220-2) for the fifth layer.

Figure 64:
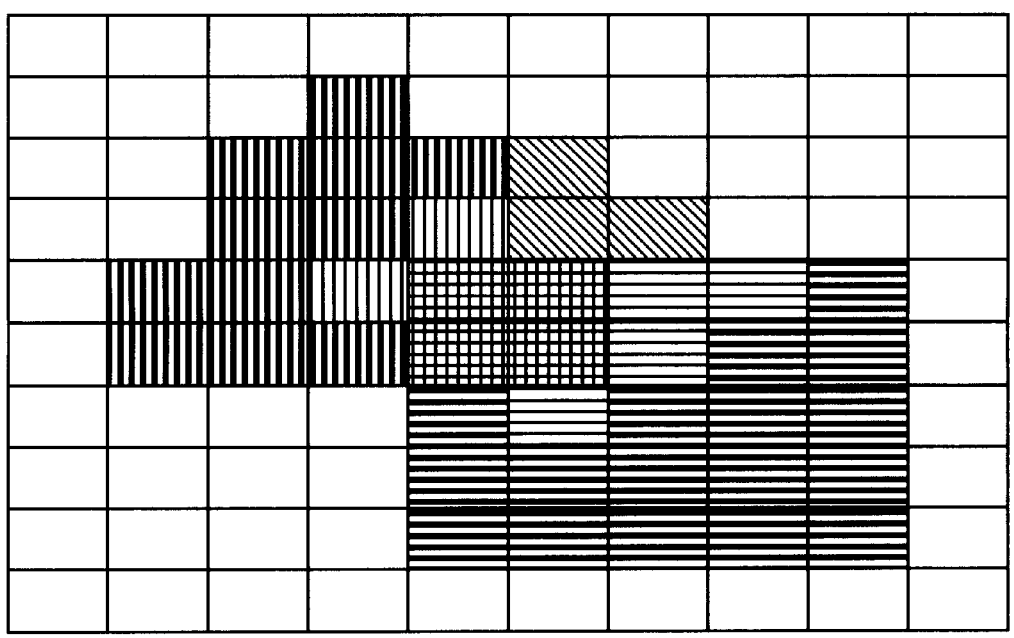
FIG. 64 is an explanatory diagram of delineation results for describing the processing operations of the attribute modulator in FIG. 25.

FIGS. 60 to 63 diagram the relationships between fog volume polygons and light volume polygons in each layer (second layer, third layer, fourth layer, and fifth layer), on the one hand, and volumes A and B and polygon C, on the other. In FIG. 64 are diagrammed the pixel delineation results based thereon. The polygon pixel data described earlier are subjected to processing by the shading processor 79, texture processor 80, and frame buffer processor 83, and thereby pixel delineation like that diagrammed in FIG. 64 is effected. In the drawings, a triangular column, a square column, and a diamond figure blocking both are delineated, having different density according to the space thickness.

Based on the present invention, as described in the foregoing, polygon attribute information is altered on the basis of Z differentials between polygons, and the polygons are delineated on the basis of that altered attribute information, wherefore it is possible to represent such special effects, on a screen, as the effect of fog or dust deployed in space, or the effect of an object viewed through a lens or of frosted glass.

What is claimed is:

1. An imaging processing method for generating image data, from a plurality of polygon data, for each pixel on a display screen, comprising the steps of receiving:

receiving a delineation subject polygon and a volume polygon for representing a volume, and detecting depth difference between said volume polygon and said delineation subject polygon;

modulating attributes of said volume polygon with said depth difference; and generating image data for each pixel from said modulated polygon and said delineation subject polygon;

wherein said volume polygon represents to form an outline of said volume, and wherein said depth detection comprises the steps of:

determining a region where said volume polygon and said delineation subject polygon overlap; and detecting depth difference between the said volume polygon and said delineation subject polygon in said overlapping region.

2. The image processing method according to claim 1, wherein said modulation step comprises a step for converting said detected depth difference to a blend value using a conversion table.

3. The image processing method according to claim 1, wherein said modulation step comprises a step for modulating texture coordinates with said detected depth difference.

4. The image processing method according to claim 1, wherein said determination step comprises a step for determining overlapping regions between a plurality of volume polygons and said delineation subject polygon.

5. The image processing method according to claim 1, wherein: said modulation step is configured with a step for altering transparency of said volume polygon, based on depth difference of said volume polygon existing between viewpoint and delineation subject polygon being processed; and said generation step is configured with a rendering step for subjecting said delineation subject polygon to rendering processing according to said altered transparency and color data for said volume polygon.

6. The image processing method according to claim 1, wherein: said modulation step comprises a step for altering texture coordinates of said volume polygon, based on depth difference of said volume polygon existing between view point and delineation subject polygon being processed; and said generation step comprises a rendering process step for fetching texture data for said volume polygon, according to said altered texture coordinates, and performing delineation of said volume polygon.

7. The image processing method according to claim 6, wherein said alteration step has, for cases where said volume polygon is a convex lens (or concave lens), a step for altering said texture coordinates so that said coordinates are shifted toward lens center (or shifted toward lens periphery) as said depth difference becomes smaller (or larger).

8. The image processing method according to claim 1, wherein: said modulation step comprises a step for altering level of detail of texture data in said delineation subject polygon, based on depth difference between said delineation subject polygon and a semitransparent polygon; and said generation step has a rendering process step for delineating said delineation subject polygon according to texture data corresponding to said altered level of detail.

9. The image processing method according to claim 1, wherein: said modulation step comprises a step for altering transparency of a semitransparent polygon based on depth difference between said delineation subject polygon and said semitransparent polygon; and said generation step has a rendering process step for subjecting said delineation subject polygon to rendering processing according to said altered transparency and color data for said semitransparent polygon.

10. The image processing method according to claim 1, further comprising: a process step for converting said polygon data to pixel data for each pixel in said polygon; and a sort processing step for rearranging said pixel data in depth order, for each pixel on said display screen; wherein said process step for detecting depth difference has a process step for detecting said depth difference by referencing said sort-processed pixel data.

11. An image processing apparatus for generating image data from a plurality of polygon data for each pixel on a display screen, comprising:

a modulation unit for receiving a delineation subject polygon, and volume polygon for representing a volume, detecting depth difference between said volume polygon and said delineation subject polygon, and modulating attributes of said volume polygon with said depth difference; and a generator for generating image data from said modulated polygon and said delineation subject polygon;

wherein said volume polygon represents to form an outline of said volume, and wherein said modulation unit determines overlapping region between said volume polygon and said delineation subject polygon overlap, and detects depth difference between said volume polygon and said delineation subject polygon in said overlapping region.

12. The image processing apparatus according to claim 11, wherein said modulation unit converts said detected depth difference to a blend value using a conversion table.

13. The image processing apparatus according to claim 11, wherein said modulation unit modulates texture coordinates with said detected depth difference.

14. The image processing apparatus according to claim 15, wherein said modulation unit determines overlapping regions between a plurality of volume polygons and said delineation subject polygon.

15. The image processing apparatus according to claim 11, wherein: said modulation unit alters transparency of said volume polygon, based on depth difference for said volume polygon existing between view point and delineation subject polygon being processed; and said generator subjects said delineation subject polygon to rendering processing according to said altered transparency and color data for said volume polygon.

16. The image processing apparatus according to claim 11, wherein: said modulation unit alters texture coordinates of said volume polygon, based on depth difference for said volume polygon existing between view point and delineation subject polygon being processed; and said generator fetches texture data for said volume polygon, according to said altered texture coordinates, and performs rendering processing for delineating said volume polygon.

* * * * *